US006496741B1

(12) United States Patent
Whiffen

(10) Patent No.: US 6,496,741 B1
(45) Date of Patent: Dec. 17, 2002

(54) STATIC/DYNAMIC CONTROL FOR OPTIMIZING A USEFUL OBJECTIVE

(76) Inventor: Gregory J. Whiffen, 4 Albany Ave., Round Lake, NY (US) 12151

(*) Notice: Subject to any disclaimer, the term of this patent is extended or adjusted under 35 U.S.C. 154(b) by 0 days.

(21) Appl. No.: 09/276,619

(22) Filed: Mar. 25, 1999

(51) Int. Cl.[7] .............................................. G05B 13/02
(52) U.S. Cl. ........................ 700/28; 700/29; 700/30; 700/31; 700/90; 700/88; 700/262; 318/561; 318/563; 318/565; 318/566; 244/159; 244/160; 244/161; 244/164; 244/174; 244/176
(58) Field of Search ..................... 700/28, 29, 30–32, 700/39, 44–46, 89–90, 64–66, 262–264; 318/561, 563, 565, 566; 244/159, 160, 161, 164, 169, 174, 166, 176

(56) References Cited

U.S. PATENT DOCUMENTS

| | | |
|---|---|---|
| 3,624,367 A | 11/1971 | Hamilton ..................... 701/13 |
| 4,758,957 A | 7/1988 | Hubert et al. ................. 701/13 |
| 4,825,647 A | 5/1989 | Cann ......................... 60/203.1 |
| 5,209,437 A | 5/1993 | Fantar ........................ 244/164 |
| 5,396,428 A | 3/1995 | Tichborne et al. ............ 701/13 |
| 5,511,748 A | 4/1996 | Scott .......................... 244/161 |
| 5,598,355 A | 1/1997 | Derou et al. ................. 342/159 |
| 5,602,968 A | 2/1997 | Volpe ......................... 700/262 |
| 5,610,820 A | 3/1997 | Shankar et al. .............. 701/13 |
| 5,623,413 A | 4/1997 | Matheson et al. ........... 701/117 |
| 5,704,011 A | * 12/1997 | Hansen et al. ............... 700/44 |
| 5,713,541 A | 2/1998 | Schmitz et al. ......... 246/187 A |
| 5,745,869 A | 4/1998 | van Bezooijen ............ 701/222 |
| 5,781,398 A | 7/1998 | Fenske et al. ............... 361/171 |
| 5,787,368 A | 7/1998 | Gamble et al. .............. 701/13 |
| 5,788,188 A | 8/1998 | Damilano ................... 244/165 |
| 5,788,189 A | 8/1998 | Iida ........................... 244/166 |
| 5,794,172 A | 8/1998 | Matheson et al. ........... 701/117 |

(List continued on next page.)

OTHER PUBLICATIONS

Interactive method for planning fuel–efficient proximity operations using visual optimization aids; Grunwald et al.; Iee 1995, vol. 3; pp. 2318–2323.*
Decentralized slew maneuver control of large flexible spacecrafts; Kakad et al.; Ieee, vol. 1; pp. 114–118.*
Fuel–optimal trajectories for aeroassisted coplanar orbital transfer problem; Naidu et al.; IEEE, vol. 26, Issue–2, pp. 374–381.*

Primary Examiner—Ramesh Patel
(74) Attorney, Agent, or Firm—Schmeiser, Olsen & Watts

(57) ABSTRACT

A method, computer system, and program product for optimizing a useful objective function with respect to a dynamic parameter vector and a static parameter vector. The method, called the static/dynamic control (MDC) method, either minimizes or maximizes the useful objective function subject to a state equation, initial conditions, terminal conditions, constraints, and dynamic limitations. The SDC method includes an algorithm having two formulations: a period formulation and a fully continuous formulation. With the period formulation, the dynamic optimization variables associated with the dynamic limitations are permitted to be discontinuous, parametric functions of time. With the fully continuous formulation, the dynamic optimization variables are permitted to be continuous, non-parametric functions of time. The SDC method is computer implementable and employs an iterative process including an inner loop and an outer loop. The inner loop terminates when the objective function has changed by a satisfactory amount during a fixed outer-loop iteration. The outer loop terminates when the SDC procedure converges. The SDC method may be used to optimize a spacecraft trajectory objective and a spacecraft design objective simultaneously. Optimizing spacecraft objectives via SDC does not require approximating the physics or dynamics of space flight. Thus, any number of gravitating bodies, gravitational harmonics, radiation pressure, atmospheric drag, and general relativistic corrections can be accounted for when using the SDC method. The SDC method does not require prespecification of a planetary flyby sequence for space flight and is capable of identifying optimal flyby sequences.

28 Claims, 12 Drawing Sheets

U.S. PATENT DOCUMENTS

| | | | |
|---|---|---|---|
| 5,806,802 A | 9/1998 | Scott | 244/161 |
| 5,806,804 A | 9/1998 | Goodzeit et al. | 244/169 |
| 5,810,297 A | 9/1998 | Basuthakur et al. | 244/176 |
| 5,815,394 A | 9/1998 | Adeli et al. | 700/97 |
| 5,908,176 A * | 6/1999 | Gilyard | 244/130 |
| 6,029,095 A * | 2/2000 | Boissy et al. | 360/69 |
| 6,112,125 A * | 8/2000 | Sandusky | 700/28 |
| 6,253,113 B1 * | 6/2001 | Lu | 700/28 |
| 6,349,236 B1 * | 2/2002 | Hansen et al. | 700/28 |

* cited by examiner

STATIC/DYNAMIC CONTROL FOR OPTIMIZING A USEFUL OBJECTIVE

BACKGROUND OF THE INVENTION

1. Technical Field

The present invention relates to a method, computer system, and program product for optimizing a useful objective function with respect to a dynamic parameter vector and a static parameter vector, and more particularly, to optimizing a spacecraft objective such as a spacecraft trajectory objective and a spacecraft design objective.

2. Related Art

A goal of spacecraft trajectory optimization is to obtain the best trajectory. Spacecraft trajectory optimization is a dynamic problem. A dynamic problem involves a sequence of decisions made over time. For example, the thrust direction for a spacecraft engine must be selected on day one of a space flight. Then a new thrust direction must be selected for day two, and so on. Each previous decision affects all future decisions. A complete set of decisions for the total flight time is necessary to define a trajectory.

A goal of spacecraft design optimization is to obtain the best design. Spacecraft design optimization is a not a dynamic problem. Design decisions are not linked to a time sequence. For example, the decisions of how large a solar array to build, how much fuel to carry, and when to launch a spacecraft are static or non-dynamic decisions.

The overall performance of a spacecraft is a function of both the spacecraft trajectory and the spacecraft design. Further, the spacecraft design will impact the spacecraft trajectory and vice versa. Since spacecraft design and spacecraft trajectory are not independent, the most efficient spacecraft design and the most efficient spacecraft trajectory cannot be determined independently.

Current methods for optimization are constructed to solve either dynamic problems or static problems. Related art optimization methods cannot solve problems which have both a static part and a dynamic part without approximation. Related art methods for optimization can be divided into two categories. The first category is non-dynamic or static optimization methods known as "parameter optimization". The second category is dynamic optimization methods known as "optimal control."

Parameter optimization was originally developed to solve static problems. Parameter optimization is directly applicable to static problems, such as spacecraft design. However, parameter optimization is not easily or accurately applicable to dynamic problems such as space flight trajectories. Parameter optimization can only be applied to dynamic problems when the true dynamic nature of the problem is approximated or removed entirely. Since parameter optimization cannot solve general dynamic problems without approximation, parameter optimization cannot solve the combined static and dynamic problem of spacecraft design and trajectory without approximation.

Optimal control was developed for exclusively dynamic problems. Optimal control is applicable to dynamic problems such as spacecraft trajectory optimization. However, optimal control is not suited to static problems such as spacecraft design.

The related art uses either parameter optimization or optimal control to design deep space missions. The related art cannot achieve the combined benefits of both parameter optimization and optimal control simultaneously. The following two subsections describe the parameter optimization and the optimal control methods presently in use.

A. Parameter Optimization Methods

The related art applies parameter optimization to the dynamic problem of spacecraft trajectory optimization by making several significant approximations. The physics of the trajectory problem is approximated by instantaneous impulses followed by ballistic coasts. The instantaneous impulses are intended to represent the effect of thrust on a spacecraft. A sequence of impulses and coasts can roughly approximate a continuously running engine. The ballistic coasts usually only account for the gravitational influence of a single central object (usually the sun.) All long range planetary gravitational effects are ignored. Since planetary gravitation is ignored, the ballistic coasts are perfect conic sections whose shape is always time independent. The time independence of the shape is a necessary assumption for the non-dynamic parameter optimization method.

Of particular interest is the ion propulsion engine. Ion propulsion engines are far more efficient than ordinary traditional chemical engines. Ion propulsion engines are expected to replace many applications of chemical engines in the near future. Ion propulsion engines have significantly different operating characteristics than chemical engines. In particular, ion engines typically operate continuously for days or even years at low thrust intensities. The impulse/ballistic coast approximation required by parameter optimization is a particularly poor approximation when applied to ion engines.

The parameter optimization method used in the related art requires prespecification of the sequence of planets that the spacecraft will pass by closely ("planetary flyby sequence"). Thus, the planetary flyby sequence is not susceptible to parameter optimization. Individual planetary flybys are prespecified by fixed constraints. Prespecification of flybys greatly reduces the likelihood of discovering the most efficient flyby sequence.

Parameter optimization typically requires the physics of planetary flybys to be approximated as a collision at a single point in space. The spacecraft trajectory is propagated to the center of the flyby body without accounting for the gravity of the body. Flybys are then modeled as an instantaneous change in velocity without a change in the spacecraft position. With parameter optimization, the true extended spatial and dynamic nature of flybys is not correctly represented. This approximation significantly reduces the precision of parameter optimization solutions.

Related art parameter optimization methods do not optimize spacecraft thrust sequences directly. Instead, related art methods optimize instantaneous changes to spacecraft velocity. Optimizing velocity changes neglects or only approximates the effect of the dynamic nature of the spacecraft mass. The spacecraft mass is a decreasing function of time because fuel is burned. Neglecting this fact reduces the precision of parameter optimization solutions.

B. Optimal Control Methods

The related art uses an optimal control method to calculate or fine tune navigation paths or trajectories for spacecraft. The optimal control method is known as the calculus of variations ("COV."). The COV method is not capable of calculating optimal trajectories for spacecraft from scratch. An efficient trajectory and/or a prespecified flyby sequence must be supplied as input. The input trajectory, or trajectory associated with a prescribed flyby sequence, is not derived from a precise optimization procedure and is therefore not necessarily optimal. Similarly, the prespecified flyby sequence is not necessarily optimal.

Related art COV methods typically make several approximations similar to the approximations made by related art parameter optimization methods. For example, thrust is approximated as a sequence of impulses, spacecraft propagation only takes into account the Sun's gravity, and planetary flybys are treated as an instantaneous change in spacecraft velocity. As a result, the COV method is limited in precision in the same way that the parameter optimization method is limited in precision.

The COV method also suffers from extreme sensitivity to flyby parameters. The extreme sensitivity of COV results in a substantial reduction in the improvement that COV can potentially achieve when flybys are involved. The sensitivity problem limits the COV method to consider trajectories with only a small number of flybys.

The main advantage of the COV method is that it is a dynamic method. The dynamic aspect of the COV method could, in theory, permit the correct representation of the dynamics of space flight. Unfortunately, the COV method is not robust enough to solve the trajectory problem without relying on significant approximations or requiring the pre-specification of the flyby sequence.

Application of the preexisting general optimization methods, known as neural networks, genetic algorithms, and simulated annealing to static/dynamic problems, may produce inferior results that do not converge to optimal solutions. These optimization methods are heuristic or approximate methods involving various types of random searches to find good solutions. Heuristic methods often fail to find the best or optimal solutions.

An accurate method is needed to simultaneously optimize both dynamic and static variables collaboratively, such as by simultaneously taking into account the effect of navigation on spacecraft design, and vice-versa.

SUMMARY OF THE INVENTION

The present invention of static/dynamic control ("SDC") provides a method for optimizing a useful objective, comprising the steps of:
providing a computer system having:
  a memory device;
  a code located on the memory device;
  a processor for executing the code; and
  a useful objective function J coupled to the code, wherein the code includes a static/dynamic control program for optimizing J with respect to a dynamic control vector v(t) and a static parameter vector w, and wherein t denotes time;
providing input data for the static/dynamic control program, wherein the input data is coupled to the code;
optimizing J with respect to v(t) and w, by executing the static/dynamic control program and using the input data; and
outputting a computed result from the optimizing step to an output device within the computer system.

The present invention provides a first computer system for optimizing a useful objective, comprising:
  a memory device,
  a computer code located on the memory device;
  a computer processor for executing the computer code;
  a useful objective function J coupled to the computer code, wherein the computer code includes a static/dynamic control program for performing an optimization of J with respect to a dynamic control vector v(t) and a static parameter vector w, and wherein t denotes time; input data for the static/dynamic control program; and an output device for receiving a result from the static/dynamic control program.

The present invention provides a second computer system for optimizing a useful objective, comprising:
  a memory means for storing data on a memory device;
  a computer code, located on the memory device, for optimizing a useful objective function J with respect to a dynamic control vector v(t) and a static parameter vector w, wherein t denotes time;
  a processor means for executing the computer code;
  an input means for transferring input data to the static/dynamic control program; and
  an output means for receiving a result from the static/dynamic control program.

The present invention provides a computer program product, comprising:
  a recordable medium; and
  a computer code recorded on the recordable medium. wherein the computer code includes a static/dynamic control program.

By optimizing a useful objective, the present invention produces a useful, concrete, and tangible result. In particular, the useful objective may include a spacecraft objective, a groundwater decontamination objective, or a chemical reactor objective.

The present invention has the advantage of solving problems having both a static and a dynamic aspect. In the related art, optimization algorithms are designed for either static problems or dynamic problems, but not both.

The present invention has the advantage of solving a generalized state equation. The state equation include such equations as Newton's equations of motion, general relativistic equations of motion, Darcy's law of potential flow for groundwater movement, computational fluid dynamics equations for air flow over an aircraft, and transient equations for the transport of neutrons, radiation, heat, electric current, etc.

The present invention has the advantage of accommodating generalized physical constraints such as requiring: a minimum distance between a spacecraft and the sun so as to protect the spacecraft from overheating, a maximum feasible thrust magnitude for a spacecraft, or a maximum allowed temperature during operation of a chemical reactor in a chemical processing system.

The present invention has the advantage of allowing the initial or the terminal condition of the state of the system to be a variable. Related art optimal control methods require the initial state of the system to be given and fixed.

The present invention has the advantage of including an algorithm having two formulations: a period formulation and a fully continuous formulation. With the period formulation, the dynamic control is permitted to be a discontinuous, parametric function of time. The usefulness of the period formulation is illustrated by the capability of changing engine throttle once every fixed number of days, such as once per ten days. With the fully continuous formulation, the dynamic control is permitted to be non-parametric and continuous in time. Illustrative of the usefulness of the fully continuous formulation is the capability of satisfying a generally recognized need to optimize solar sail and light propulsion spacecraft, which are expected to be deployed in the next few years.

The present invention has the advantage of solving spacecraft optimization problems without approximation to the physics or dynamics involved. Among the effects susceptible of inclusion by SDC are general relativistic corrections, radiation pressure, continuous thrust, planetary harmonics, dynamic interaction between spacecraft and planetary flybys, gravitational influence of any number of solar system objects, and planetary drag on spacecraft traversing a planetary atmosphere. Related art methods require simplifying assumptions for compatibility with related art algorithms.

The present invention has the advantage of satisfying a generally recognized and existing need to optimize both ion propulsion spacecraft and combination chemical and ion propulsion spacecraft designs and trajectories. Related art methods perform particularly poorly for ion propulsion and general low thrust spacecraft.

The present invention has the advantage of enabling mathematical derivatives to be computed exactly. Exact derivatives result in a more robust process and faster convergence. The related art typically uses approximate derivatives.

The present invention has the advantage of employing a fully second order optimization algorithm which cannot converge to false minima or saddle points. Both the COV and parameter optimization methods currently in use can converge to false minima or saddle points.

The present invention has the advantage of converging only to optimal solutions which satisfy both the necessary and sufficient conditions of optimality. Existing heuristic optimization methods (neural networks, genetic algorithms, simulated annealing) often fail to converge to optimal solutions, since they are not designed to find optimal solutions.

DETAILED DESCRIPTION OF THE INVENTION

1. Overview

Figure 1:
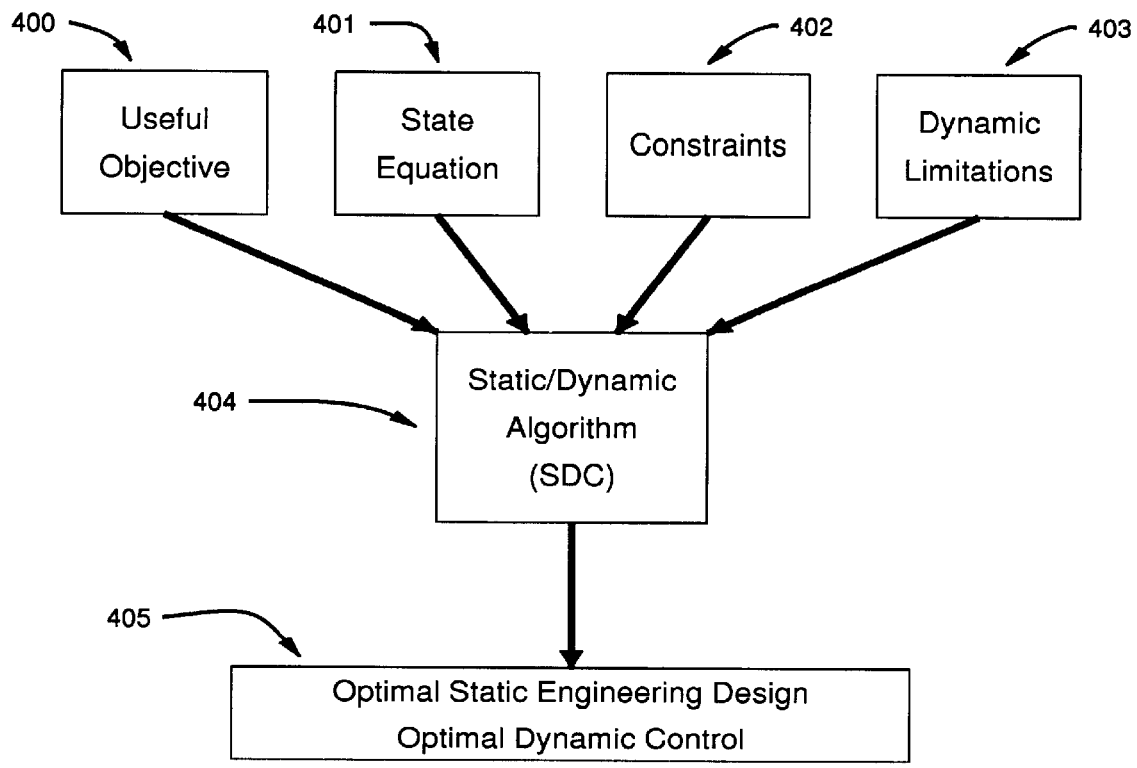
FIG. 1 depicts a flow chart of the SDC method, in accordance with a preferred embodiment of the present invention.

This section presents the form and theoretical basis for a novel process called the Static/Dynamic Control (SDC) process which solves useful physical problems. The general physical problem's form arid the SDC process which solves these problems was initially invented to address spacecraft design and trajectory optimization problems. However, the SDC process is applicable to a broad class of physical problems in addition to spacecraft design and trajectory optimization, including groundwater decontamination system design and operation, oil extraction system design and operation, chemical reactor design and operation, economic decision modeling, aircraft design and operation, automobile design, reservoir system design and operation, agricultural crop yield maximization, agricultural pest minimization, and manufacturing process design.

The SDC process optimizes a useful objective. A useful objective is a state or condition expressing a magnitude or quantity associated with a practical application. An example of a useful objective is the volumetric size of an automobile engine. Another example of a useful objective is the mass of fuel utilized in a spacecraft mission. A useful objective is mathematically represented by a useful objective function J, such as the function J defined in Equation (2) infra. J is a function of optimization parameters. Optimizing the useful objective, or optimizing the useful objective function J, is accomplished by either maximizing or minimizing J with respect to the optimization parameters. A value of J is defined as the computed value of J when J is evaluated at particular values of the optimization parameters.

The SDC process includes an algorithm having two formulations: a period formulation and a fully continuous formulation. With the period formulation, the dynamic optimization variables are permitted to be discontinuous in time, and are alternatively permitted to be continuous in time. With the fully continuous formulation, the functions serving as the dynamic optimization variables are represented only as continuous in time.

Utilization of the SDC process includes the following steps. First, a physical problem is posed in a form which is analogous to the SDC period formulations of subsections 4 and 6, or the fully continuous formulation of Appendix B, subsection 2. Second, the problem is solved using the SDC algorithm steps specified in subsection 5 for the period formulation or in Appendix B, subsection 3 for the fully continuous formulation. Third, the physical design produced by the SDC algorithm is implemented.

Part of the SDC process is the SDC algorithm. The SDC algorithm addresses situations when it is desirable to optimize a set of time-varying variables, and a set of fixed-in-time variables simultaneously with the added complexity of letting the state at either the start or the end of time be a function of control variables. In addition, the algorithm described here is capable of optimizing the time-duration and start-time for general physical problems. When the SDC process is applied to spacecraft, the spacecraft design, launch date, launch energy, flight-time and trajectory can be optimized simultaneously.

Figure 12:
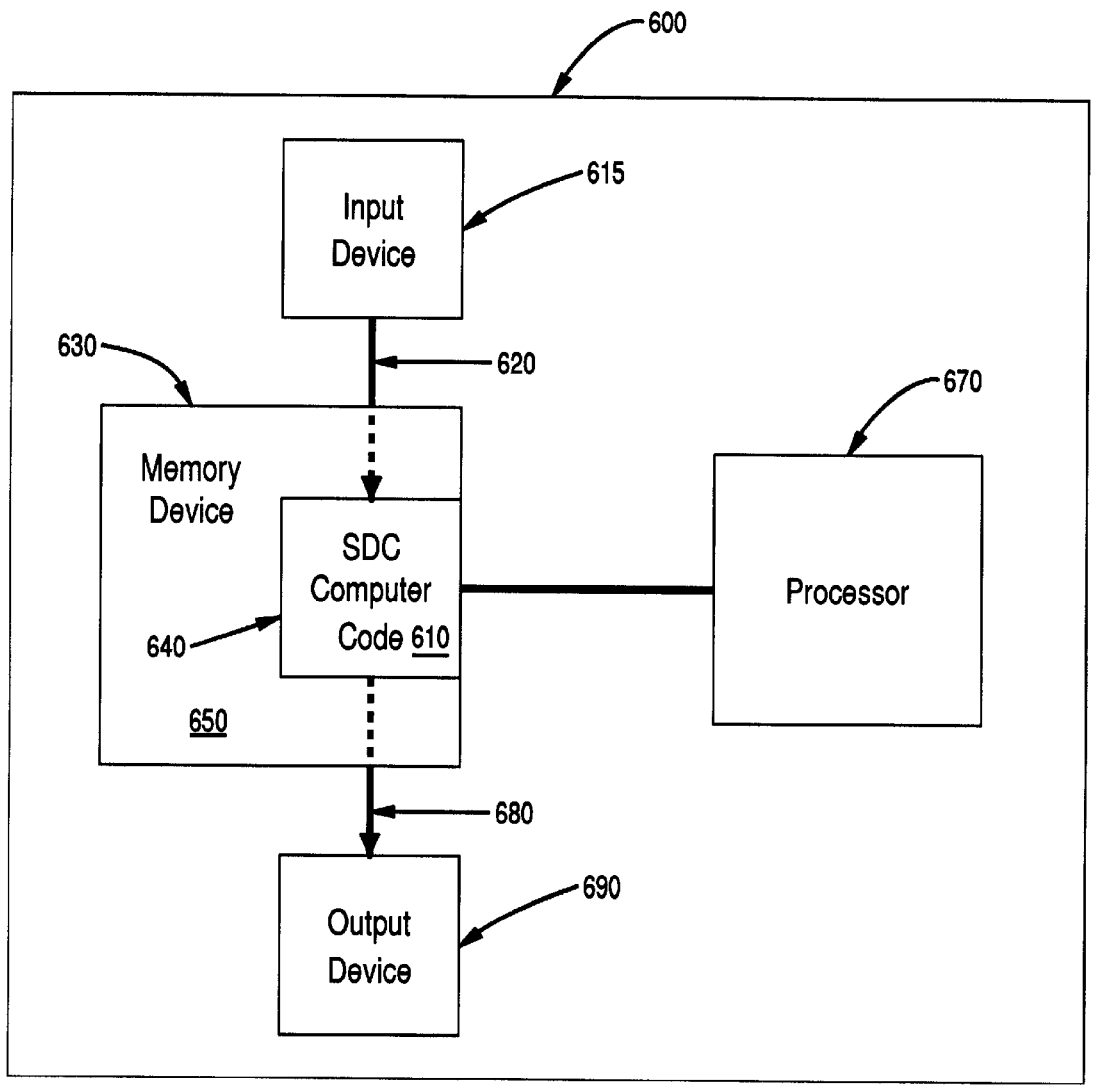
FIG. 12 depicts a flow chart of a computer system showing the data coupling associated with computer implementation of the SDC method, in accordance with a preferred embodiment of the present invention.

While the SDC method can be implemented analytically for simple problems, practical problems typically require computer implementation. The data coupling associated with computer implementation for computer system 600 is illustrated in FIG. 12. Input data 620 is coupled to SDC computer code 610. An optimization of a useful objective function J, which is defined and discussed in subsection 3 infra, is accomplished by execution of the SDC computer code 610, using the algorithm of the SDC method. The SDC computer code 610 may be located within a first portion 640 of a memory device 630 of the computer system 600. The computer system 600 includes a processor 670 for executing the SDC computer code 610. As a result of the execution of the SDC computer code 610, output data 680 is generated. The memory device 630 may include, inter alia, read-only memory (ROM), random-access memory (RAM), or both. The computer code 610 could be hard wired into ROM or loaded into RAM, of the memory device 630, as needed. The coupling of the input data 620 to the SDC computer code 610 can be accomplished many different ways. One way is to have some or all of the input data 620 hard wired into the SDC computer code 610. Another way is to have the input data 620 stored a second portion 650 of the memory device 630. The coupling of the input data 620 to the SDC computer code 610 can also be accomplished by transfer of the input data 620 from an input device 615 to the SDC computer code 610. The input device 615 could be any input device, such as a computer keyboard, a removable or nonremoveable hard disk drive, a floppy disk drive, a Bernoulli drive, or a magnetic tape drive. The output data 680 may include any data available to the SDC computer code 610, such as a computed result by the SDC computer code 610. The output data 680 could be transferred from the computer code 610 to any output device 690, such as a printer, a plotter, a removable or nonremovable hard disk drive, a floppy disk drive, a Bernoulli drive, a magnetic tape drive, or the screen of a computer monitor. The SDC computer code 610 could be recorded on any recordable medium, such as the memory device 630, a disk, or a magnetic tape.

The various components, such as the memory device 630, processor 670, input device 615, and the output device 690, within the computer system 600 may each be physically located at any distance with respect to one another. For example, the memory device 630 and processor 670 may be located in Chicago, the input device 615 may be located in Denver, and output devices 690 may be located in both Denver and Boston.

The useful objective function J may be coupled to the SDC computer code 610 in any practical manner. For example, the useful objective function J may be hard wired into the SDC computer code 610. As another example, a plurality of useful objective functions J may be included in SDC computer code 610, with the user of the SDC computer code 610 selecting his or her desired J by means of user input data 620. A third example is having the useful objective function J formed by a code module that is external to the SDC computer code 610 and is executable by the SDC computer code 610. A fourth example is having the SDC computer code 610 choose one of several available useful objective functions J as a function of the result of an auxiliary calculation by the SDC computer code 610. For example with a spacecraft application involving Mars as a flyby, the SDC computer code 610 could choose to minimize the amount of fuel spent, or to maximize the time during which the spacecraft is within a given distance from the surface of Mars, as a function of the computed distance between Mars and the Sun when the spacecraft is within the gravitational environment of Mars. Numerical parameters associated with a useful objective function J may be coupled to the computer system 600 in various ways, such as by being hard wired into the SDC computer code 610, stored on an auxiliary storage device such as a hard disk, or supplied by user input such as by user keyboard input.

An applicable computer system 600 includes any mainframe computer or desktop computer, inasmuch as the computations for many applications can be performed in a practical amount of time with a personal computer. For the Example 2 discussed infra in subsection 3, part C, the SDC calculations comprising 1941 iterations were performed in only 128.5 minutes on a SUN Ultra Sparc workstation.

Subsection 2 presents the notation conventions used in the description and theoretical basis of the SDC algorithm. A formulation of SDC applied to general engineering problems is given in subsection 3, part A. Subsection 3, part B presents an example of how the period formulation of SDC is applied to spacecraft design and trajectory problems. Two numerical examples of spacecraft optimization are given in subsection 3, part C. A detailed description of the SDC algorithm for the period formulation, applicable to general engineering problems. is presented in subsections 4 through 6. The theoretical basis of the SDC period formulation is presented in subsections 7 and 8. Appendix B describes the fully continuous formulation of the SDC algorithm. The algorithm steps and theoretical basis in Appendix B apply to general engineering problems which have time-continuous controls (i.e. period functions or dynamic limitations are unnecessary.)

2. Notation

The following notation convention is used. A general variable or function may be either upper or lower case letter. A variable or function may be scaler, vector, matrix, or rank 3 valued. The dimensions of a variable or function are determined by the definition and context. A complete list of definitions is included as appendix A.

The following general rules apply when a variable or function is referenced. Round brackets always enclose arguments for functions. For example, g(2) is the value of the function g evaluated with the argument 2. Square brackets enclose element indices for variables or functions of rank greater than zero. For example T[j] is the $j^{th}$ component of the vector T. Square and round brackets can be combined. For example, T(x, v, w, t)[i] is the $i^{th}$ component of the vector fiction T evaluated using the arguments x, v, w, and t.

Superscripts denote ordinary powers for rank zero objects. A superscript "t" on rank one and two objects indicates the transpose operation. Row and column vectors are distinguished. A vector referenced without a superscript t is assumed to be a column vector. A superscript of "−1" on rank two objects indicates the matrix inverse operation.

Subscripts involving x, v, u, w and/or t imply the object is a function and has been differentiated. For example $$a_{ux} = \frac{\partial^2 a}{\partial u \partial x}.$$

The order of a differentiated function's elemental indices (in square brackets) is first undifferentiated function indices followed by indices resulting from differentiation. For example suppose T is a vector function. A rank three object is obtained by differentiating T with respect to the two vectors w and x. A single element of the rank three object is:

$$T_{wx}(x, v, w, t)[i, j, k] \stackrel{.}{=} \frac{\partial^2 T[i]}{\partial w[j] \partial x[k]}. \tag{1}$$

An element index of ":" indicates this index is free. For example, a rank two object (matrix) based on Equation (1) is $$T_{wx}(x, v, w, t)[i, :, :] \stackrel{.}{=} \nabla_w(\nabla_x T[i]))$$

A specific part of an object can be specified using the colon notation. For example, x(t)[4:6] is a vector with three components consisting of the fourth, fifth, and sixth components of the vector x(t). Similarly, $T_{wx}$(x, v, w, t)[i, 1:2, 1:3] is a two by three matrix consisting of the upper two by three block of the matrix $T_{wx}$(x, v, w, t)[i, :, :].

Ordinary scaler, vector, and matrix multiplication is implied when rank zero, one and two objects are multiplied. For example, suppose a is a scaler function and T is a vector function of vectors x, u, and w, then the [i, j] component of the product $a_{ux}T_w$ is interpreted as:

$$\text{product}[i, j] = \sum_{k=1}^{n} \frac{\partial^2 a}{\partial u[i] \partial x[k]} \cdot \frac{\partial T[k]}{\partial w[j]}$$

Similarly, the [i, j] component of the product $a_{ux}T_w^t$ is interpreted as:

$$\text{product}[i, j] = \sum_{k=1}^{n} \frac{\partial^2 a}{\partial u[i] \partial x[k]} \cdot \frac{\partial T[j]}{\partial w[k]}$$

Multiplication involving rank three objects is indicated with explicit summations to avoid ambigtuity.

The symbol R represents the set of all real numbers. The symbol R is used to indicate the dimension of the value of all functions and variables. For example, the statement "u∈$R^m$" indicates u is a vector with m components or is m-dimensional. The statement "β∈$R^{m \times n}$" indicates β is a matrix with m rows and n columns. Expressions of the form $0^{m \times n}$ represent a matrix of all zeros with m rows and n columns.

Integer subscripts i, j, or 1, 2, etc. are interpreted as part of a variable's name. Integer subscripts do not indicate differentiation. Subscripts of this type only appear as part of the names of the variables $u_i$, $t_i$, $\alpha_i$, $\beta_i$, and $\gamma_i$ (to be defined later.) For instance, $\beta_2$ is a matrix variable ∈$R^{m \times n}$. The $j^{th}$ column of $\beta_2$ is represented by $\beta_2$[:, j] which is ∈$R^m$. Subscripts of integer type are not used as part of function names.

The symbol "$\stackrel{.}{=}$" is read "is defined to be" to distinguish between definitions and ordinary "=" assignment or equality statements. A "bar" over a function (for example $\bar{J}_{uu}$) indicates the function is evaluated at a given or "nominal" point. A function with a bar over it is at most only a function of time because the dependence on all other variables has been eliminated. The "Hessian" of a scaler function is defined to be the second derivative of the scaler function with respect to a vector. In general, a Hessian is a rank two object. The expression "H.O.T." stands for "Higher Order Terms." A complete list of variable and function definitions is included as Appendix A.

3. The Method of Static/Dynamic Control (SDC) and Its Applications

Either the period formulation or the fully continuous formulation of the SDC method of the present invention can be applied to any physical problem in which static and dynamic parameters are to be simultaneously optimized. Examples of engineering problems to which SDC can be applied are groundwater decontamination system design and operation, oil exploration system design and operation, spacecraft design and operation, chemical reactor design and operation, economic decision modeling, and aircraft design and operation. In particular, the SDC process can be applied to any engineering problem which can be described by three general equations, such as Equations (2), (3), and (4) infra.

A. General Discussion of SDC

FIG. 1 shows a flow diagram of the SDC method for both the period formulation and the fully continuous formulation. FIG. 1 illustrates how SDC is applied to a general engineering problem such as a static design and dynamic control problem. A useful objective 400 for the period formulation is represented by the following useful objective function J:

$$J = \int_{t_o}^{t_N} F(x(t), v(t), w, t) dt + \sum_{i=1}^{N} G(x(t_i), v(t_i), w, t_i, i), \tag{2}$$

or a mathematical equivalent. Both $t_0 < t_N$ and $t_0 > t_N$ are within the scope of the SDC period formulation. Note that the fully continuous formulation permits an analogous scope of time ordering ($t_0 < t_f$ and $t_0 > t_f$, as discussed in Appendix B). Any mathematical equivalent can be used in place of Equation (2). The analogous expression for J in the fully continuous formulation is Equation (182) in Appendix B. The goal of SDC is to optimize J by choosing the optimal or "best" dynamic control vector v(t) and optimal or "best" static parameter vector w. The useful objective J can be either minimized or maximized in value. The functions F and G in Equation (2) (or Equation (182) in the fully continuous formulation) are selected by the user of the invention to best represent the design and control objectives, Examples of optimizing useful objectives include minimizing spacecraft fuel usage, minimizing the contamination remaining in the ground for environmental decontamination problems, or maximizing useful products from a chemical reactor.

In the period formulation of SDC, the functions F and G can depend on the state vector x(t), the dynamic control vector v(t), the static parameter vector w, and time t. In the fully continuous formulation of SDC, F has the same dependencies as in the period formulation. and C can depend on w, x($t_f$), v($t_f$), and $t_f$. The time $t_f$ is a "final," or terminal, value of t if $t_0 < t_f$. However, $t_f$ is an "initial" value of t if $t_0 > t_f$.

The state vector x(t) represents the physical state of the engineering system at time t. The state vector encompasses variables not under the direct control of the engineer. Examples of x(t) include temperature, velocity, and chemical disequilibrium. In general, the engineer has indirect control over state variables x(t), such as temperature. For example, the engineer can change temperature by adjusting a thermostat. However, temperature can not be changed instantaneotusly, since temperature varies continuously according to the equations of transient heat transfer. The dynamic control vector v(t) represents the dynamic parameters which are under direct control by the engineer. Examples of v(t) include a thermostat setting, rocket thrust magnitude, and chemical inflow rate in a chemical reactor. The dynamic control vector v(t) represents decisions which may change continuously or discontinuously in time. Like v(t), the static parameter vector w represents parameters which are under direct control of the engineer. Unlike v(t), however, the static parameter vector w is associated with engineering design decisions which are not functions of time. Examples of uw include the size of a tank to build for a chemical reactor, the size of a pipe to use, or the launch date for a spacecraft. In general, the user of the invention defines v(t) and w to be the dynamic and static parameters for which optimal values are desired.

The second equation of the SDC process, in either the period formulation or fully continuous formulation, is the system state equation 401. The state equation includes the general form, $$\frac{dx(t)}{dt} = T(x(t), v(t), w, t) \quad x(t=t_0) = \Gamma(w), \tag{3}$$

or a mathematical equivalent. The vector function T is selected by the user of the invention to best represent the time evolution of the state vector x(t) under the influence of the current state, the current dynamic control vector v(t), and the static parameter vector w. In both the period formulation and the fully continuous formulation, the vector function T may be a discontinuous function of time. The vector function $\Gamma(w)$ represents an initial condition on x(t) if $t_0 < t_f$ and a terminal condition on x(t) if $t_0 > t_f$. The condition of the system can be optimized because it is allowed to be a function of the static parameter vector w. Examples of system state equations include: the heat equation, chemical equilibrium equations, groundwater contamination transport equations, dynamic equilibrium equations, equations describing the flow of electricity, and Newton's laws of motion under the influence of forces.

The third equation of the SDC process is the constraint equation 402. Use of the constraint equation 402 is optional, since the SDC formulation works with or without the constraints 402. The constraint equation 402 represents any physical or practical engineering constraints that may exist for a particular problem. Such engineering constraints are written in the general form, $$L(x(t), v(t), w, t) \geq 0 \text{ and/or } K(x(t), v(t), w, t)=0, \tag{4}$$

or a mathematical equivalent. Equation (4) applies to either the period formulation or the fully continuous formulation. The linear or nonlinear vector functions L and K are selected by the user of the invention to represent practical or physical constraints on the engineering problem. Examples of constraints include a maximum temperature for a chemical reactor, a maximum allowed level of residual contamination for environmental decontamination problems, or a minimum allowed distance between the sun and a spacecraft to avoid spacecraft overheating.

The fourth equation is used only by the period formulation of the SDC process and is the dynamic limitations equation 403. The dynamic limitations equation 403 is optional, since the SDC formulation works with or without dynamic limitations. The fully continuous formulation of the SDC process does not use the dynamic limitations equation 403. The dynamic limitation equation 403 represents any physical or practical engineering constraints on the time evolution of the dynamic control vector v(t) that may exist for a particular problem. The period formulation of the SDC process requires that the dynamic limitations be written in the general form, $$v(t) = \begin{vmatrix} f(u_1, w, t, 1) & \text{for } t = t_0 \text{ to } t_1 \\ f(u_2, w, t, 2) & \text{for } t = t_1 \text{ to } t_2 \\ \vdots & \vdots \\ f(u_N, w, t, N) & \text{for } t = t_{N-1} \text{ to } t_N. \end{vmatrix} \tag{5}$$

Figure 3:
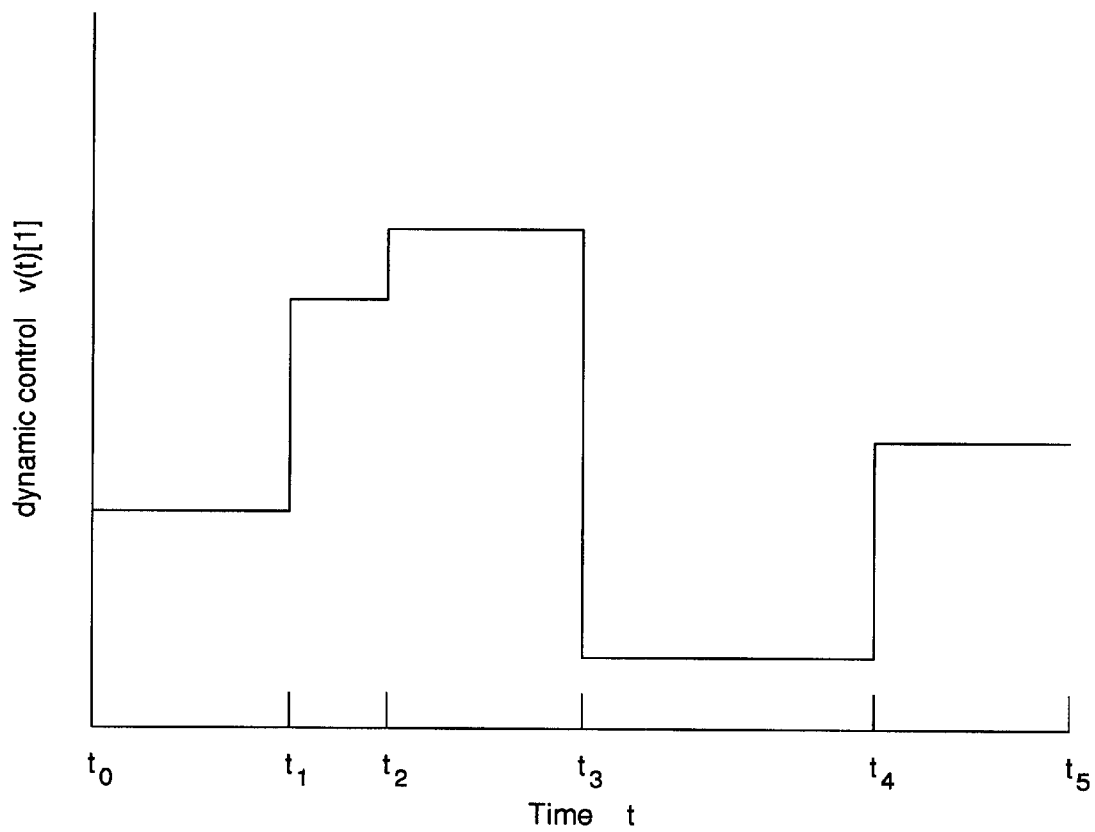
FIG. 3 depicts an example of a single component of the dynamic control vector v(t) that is constant within each of several time periods, in accordance with the period formulation of FIG. 2.

The vector functions $f(u_i, w, t, i)$ are selected by the user of the invention to properly represent any mechanical or practical limitations on the time evolution of v(t). The number of periods N may be chosen arbitrarily. The functions $f$ are parameterized by the dynamic parameter vector $u_i$, the static parameter vector w, and time t. The functions $f$ can be used to effectively limit or constrain the SDC algorithm to consider only solutions v(t) which are of the form of Equation (5). The time intervals $t_i$ to $t_{i+1}$ are called "periods." The dynamic parameter vector $u_i$ is constant within each period i, i=1, 2, . . . , N. For example, the simplest useful set of functions $f$ is $f(u_i, w, t, i)=u_i$. The dynamic control vector v(t) may be optimized such that v(t) is constant over each period, allowing changes only at period interfaces $t_i$. Alternatively, v(t) may be subject to a dynamic limitation that allows v(t) to vary within each period, either continuously or discontinuously. An example of a single component of v(t) for the special case when v(t) is required to be constant within each period is plotted in FIG. 3. The example in FIG. 3 corresponds to a situation where it is impractical or infeasible to adjust a dynamic control continuously in time. An example is when v(t) is spacecraft thrust and commands to change spacecraft thrust can only be transmitted once every day. An example of incorporating constraints 402 into the useful objective 400 and incorporating dynamic limitations 403 into "period" functions $f$ is given in the subsection 3, part C.

Once the user of the invention has selected a useful objective function 400, a state equation 401, (optionally) a constraint equation 402, and a dynamic limitation equation 403, the static/dynamic algorithm 404 can be used. The static/dynamic (SDC) algorithm 404 generates the optimal values for v(t) and w such that the useful objective 400 is optimized while obeying the state equation 401, and any constraints 402 and dynamic limitations 403. The optimum values of v(t) and w are used in step 405 for obtaining an optimum static engineering design and/or an optimum dynamic control.

Figure 2:
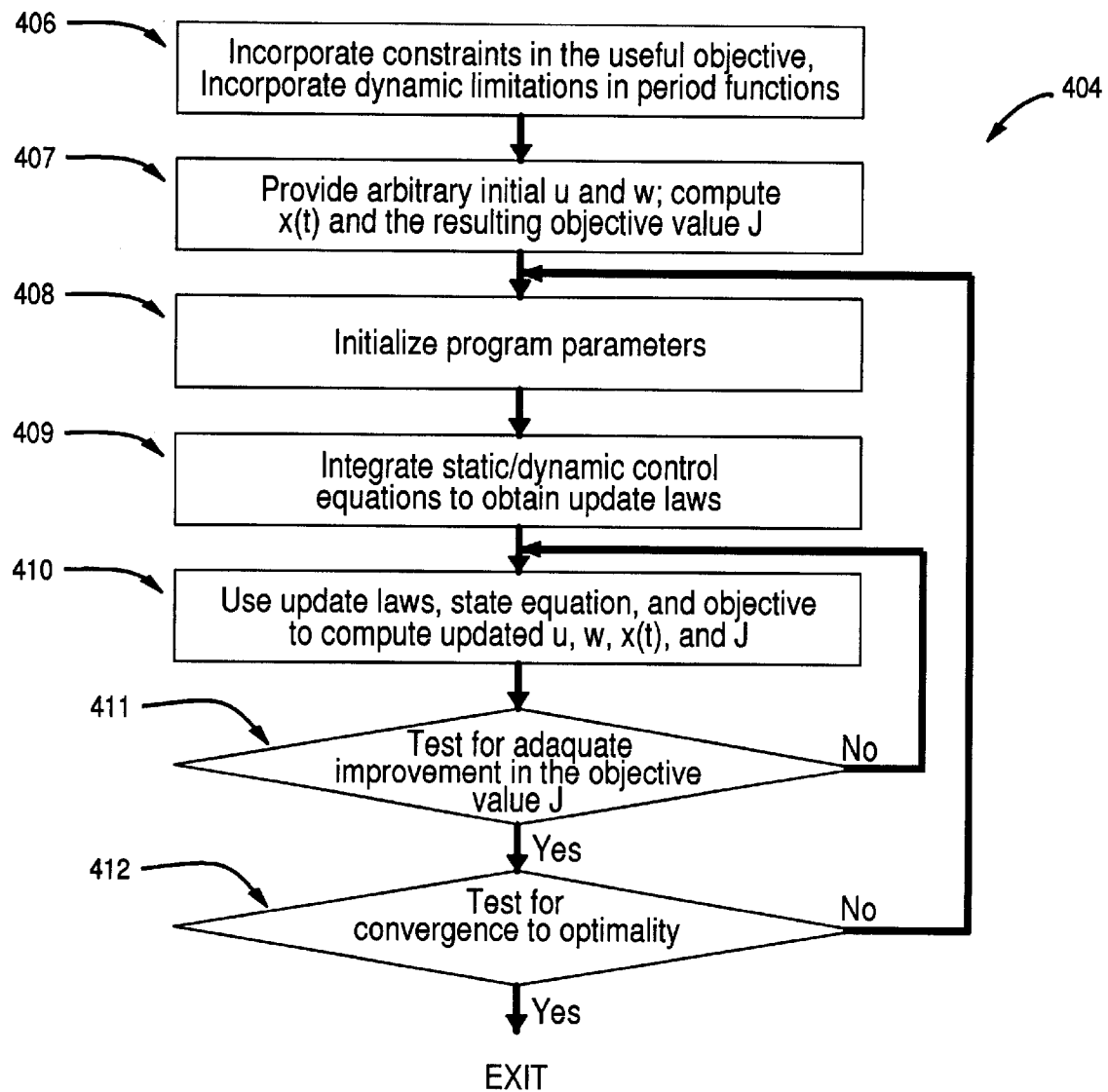
FIG. 2 depicts the SDC algorithm of FIG. 1 for the period formulation.

FIG. 2 is a flow chart describing the period formulation of the SDC algorithm 404 in greater detail. The SDC algorithm for the period formulation 404 is an iterative procedure which includes an inner loop terminating in an adequacy of improvement test 411, and an outer loop terminating in a convergence test 412. The step 406 in the period formulation of the SDC algorithm 404 incorporates the constraints 402 into the useful objective 400 and/or incorporates dynamic limitations 403 into "period" functions $f$ (see FIG. 1 for useful objective 400, constraints 402, dynamic limitations 403, and SDC algorithm 404). Note that incorporation of dynamic limitations 403 into period functions $f$ is implemented only if the SDC application includes a dynamic limitation.

The step 407 in FIG. 2 of the period formulation of the SDC algorithm 404 provides arbitrary initial approximations for v(t) and w, and then uses the initial approximations of v(t) and w and the state equation 401 to compute x(t). The state x(t) is obtained by integrating Equation (3) using any known method for integrating a differential equation subject to a single time condition. Once x(t) is obtained, the value of the useful objective function J is calculated using the useful objective 400 as represented by Equation (2).

The step 408 of the period formulation of the SDC algorithm 404 initializes program parameters such as P, Q, R, S, Y, W, and c as discussed in subsection 5 infra.

The step 409 in the SDC algorithm 404 integrates the static/dynamic control equations, i.e., Equations (32)–(40) infra, to obtain an update law. An update law is a prescription for updating values of v(t), w, and x(t), such as equations of update (50)–(52), which are discussed in subsection 5 infra. Obtaining an update law includes calculating parameters, such as $\alpha_i$, $\beta_i$, and $\gamma_i$ (i=1, 2, ..., N), for use in equations of update.

The step 410 in FIG. 2 of the period formulation of the SDC algorithm 404 uses the update law obtained from the step 409 and the state equation 401 to compute updated values for v(t), w, and x(t). Once updated values for v(t), w, and x(t) are obtained, an updated value of J is calculated using the useful objective 400 as represented by Equation (2).

The step 411 in FIG. 2 of the SDC algorithm 404 tests for adequate improvement in the values of J. An improvement is adequate if the updated value of J has changed sufficiently from the value of J at the previous iteration. The adequacy of improvement test is mathematically articulated in Equation (53) infra. If the improvement is adequate, then the step 412, the convergence test as stated in subsection 5 infra, is executed. If the improvement is not adequate, then step 410 is repeated with an increasingly damped update law. The update laws are damped by decreasing the value of the parameter $\epsilon$ as described in subsection 5 infra.

The step 412 in FIG. 2 of the SDC algorithm 404 tests for convergence to the optimal values of v(t) and w. If convergence is obtained, then the procedure stops. If convergence is not obtained, then the values of v(t), w, and x(t) are replaced with the improved values obtained in the steps 410 and 411, followed by a return to the step 408.

By optimizing the useful objective function J, the SDC method of the present invention produces a useful, concrete, and tangible result. In particular, the useful objective may include a spacecraft objective, such as a spacecraft trajectory objective and a spacecraft design objective. Optimizing a spacecraft trajectory objective provides spacecraft design and control of a spacecraft trajectory, including a capability of optimizing such parameters as flyby sequence, launch date, flight duration, and spacecraft, velocity. Optimizing a spacecraft design objective facilitates design of such parameters as engine efficiency, engine size, propellant tank size, and electric battery size.

A useful objective may also include an objective related to groundwater or soil decontamination. An example of a useful objective function J is a measure of the contamination remaining in the ground after a certain period of time. The SDC process can be used to design and control a decontamination system to minimize the contamination present in the ground. The static parameter vector w may include the location and size of groundwater extraction wells and clean water injection wells, and treatment plant size. The dynamic control vector v(t) may include dynamic pumping schedules for all wells. Other remediation system design parameters which can be optimized include the size and location of vapor extraction equipment, bioremediation equipment, horizontal wells, and slurry walls.

Another application involving a useful objective includes stabilizing vibrations in structures. For example, a useful objective function J includes a measure of the amplitude of the vibrations. The SDC process can be used to design and control structures to minimize the amplitude of destructive vibrations. The dynamic control vector v(t) may include the effect of mechanical actuators to damp vibrations. The static parameter vector w may include the size and location of various fixed elements of the structure such as beams and trusses.

Another useful objective includes maximizing the value of a portfolio. For example, a useful objective function J includes the dollar value of a portfolio after a specified period of time. The SDC process can be used to design trading laws to maximize return to risk ratios. The dynamic control vector v(t) may include the effect of decisions to buy or sell equities. The static parameter vector w may include the fraction of the portfolio to be exposed to different levels of risk.

Another application relating to a useful objective includes electric circuit design. For example, a useful objective function J includes the circuit response time. The SDC process can be used to design and operate an electric circuit to minimize circuit response tine. The dynamic control vector v(t) may include the parameters associated with the circuit controller. The static parameter vector w may include maximum voltage and current tolerances, and bandwidth for various components of the circuit.

Another application relating to a useful objective includes the design and operation of a chemical reactor. For example, a useful objective function J includes the weight of the useful chemical products. The SDC process can be used to design and operate a chemical reactor in order to maximize the weight of the useful chemical products produced in the reactor. The dynamic control vector v(t) may include the inflow rate of raw chemicals into the reactor, thermostat settings, and pressure levels. The static parameter vector w may include the size of the reactor's chambers and the length of time the reactor is operated.

Another application relating to a useful objective includes the design and operation of a water reservoir system. For example, a useful objective function J includes the amount of hydroelectric power which can be generated by the release of reservoir water. The SDC process can be used to design and operate a system of reservoirs in order to maximize the amount of hydroelectric power produced by the reservoir system. The dynamic control vector v(t) may include the flow rate of water into and out of the reservoirs in the system. The static parameter vector w may include the size of hydroelectric generators to build and the capacity or dam height for each reservoir in the system.

B. Application of the Period Formulation of SDC to Spacecraft Optimization

To enable the present invention to be better understood, this subsection describes an application of the present invention directed to optimizing spacecraft design and trajectory. The spacecraft design and trajectory problem is merely illustrative of the types of spacecraft and general engineering problems to which Static/Dynamic Control can be applied.

A manner of applying the period formulation of the SDC process to spacecraft design and trajectory optimization involves choosing a useful objective 400 represented as:

$$J = \int_{w[1]}^{w[1]+w[2]} F(x(t), v(t), w, t)\,dt + \sum_{i=1}^{N} G(x(t_i), u_i, w, t_i, i), \quad (6)$$

where the scaler functions F and G are selected by the user of the invention to represent the spacecraft trajectory and design objectives. The system state vector x(t) contains at least six elements corresponding to the current spacecraft position and velocity. More state variables can be added if desired. An example of an additional state variable which may be appropriate is the current mass $x(t)[7]=M_s(t)$ of the spacecraft. The dynamic control vector $v(t)$ contains three components, one for each of the current x, y, and z components of thrust intensity or the extent and angular orientation of a solar sail. Defining $v(t)$ in this way allows the spacecraft propulsion and trajectory to be optimized. Additional components of the dynamic control vector $v(t)$ can be assigned to solar panel angle, spacecraft power consumption, etc. The static parameter vector w typically contains two components. The first, w[1], is the launch time or time $t_0$ when the trajectory to be optimized is started. The second component, w[2], is the trajectory time duration or flight time. These definitions of w[1] and w[2] result in optimizing both launch date and flight time. Additional components of the static parameter vector w may include, engine performance parameters, solar panel size, launch energy, etc.

Figure 4:
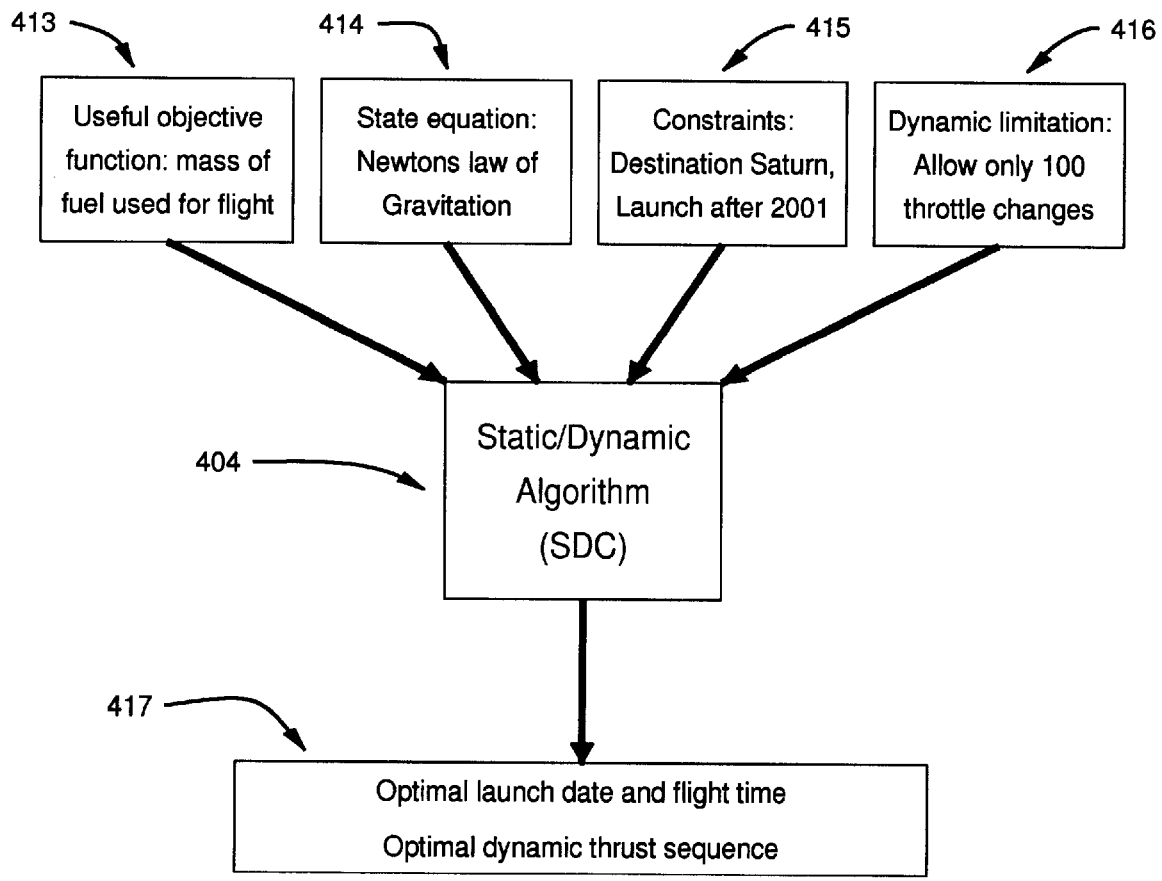
FIG. 4 depicts the period formulation of FIG. 2 applied to an example of spacecraft design and trajectory optimization.

FIG. 4 shows the flow chart of FIG. 1 for an example of how SDC can be applied to spacecraft design and trajectory optimization. In the example illustrated by FIG. 4, the useful objective 413 is the mass of fuel used for the mission. Minimizing the mass of fuel used maximizes the payload of the spacecraft. The useful objective function J for this example can be written $$J = \int_{w[1]}^{w[1]+w[2]} \frac{dM_s(t)}{dt} dt. \tag{7}$$

In this case, $$F = \frac{dM_s(t)}{dt}$$

is the mass of fuel consumed per time and G is set to zero (i.e. G is not used.) The integral of F is the total mass of fuel consumed. Thus, by minimizing J, the total mass of fuel consumed is minimized.

The user of the invention may elect to limit the candidate spacecraft designs and trajectories by listing linear or non-linear constraints 415 of the form of Equation (4). General examples of constraints 415 include a limit on how close a spacecraft is allowed to get to a planet or the sun, a maximum possible thrust intensity, a final destination, an intermediate destination, a maximum allowed flight time, an acceptable launch date range, a solar electric propulsion constraint, and a launch vehicle performance curve. For the example indicated by FIG. 4, the constraints 415 can be written, $$x(w[1]+w[2])[1:3]-r_{Saturn}(w[1]+w[2])=0 \tag{8}$$

$$w[1]-2001 \geq 0 \tag{9}$$

where $r_{Saturn}(t)$ is the position of a target, such as Saturn, at time t and x(t)[1:3] (the first three components of x(t)) is the position of the spacecraft at time t. In this case, the function $K=x(w[1]+w[2])[1:3]-r_{Saturn}(w[1]+w[2])$ and the function $L=w[1]-2001$ in Equation (4).

In addition to providing a useful objective function 413 and constraints 415, a state equation 414 must be provided by the user of the invention in the form of Equation (3). The user of the invention must select appropriate vector functions T and $\Gamma$ to properly represent the physics of the spacecraft problem. For the example indicated by FIG. 4, the user of the invention could define the state vector x(t) and the dynamic control vector v(t) as follows:

$$x = \begin{bmatrix} x[1] \\ x[2] \\ x[3] \\ x[4] \\ x[5] \\ x[6] \\ x[7] \end{bmatrix} = \begin{bmatrix} x \text{ coordinate of spacecraft} \\ y \text{ coordinate of spacecraft} \\ z \text{ coordinate of spacecraft} \\ x \text{ velocity of spacecraft} \\ y \text{ velocity of spacecraft} \\ z \text{ velocity of spacecraft} \\ M_s \text{ mass of the spacecraft} \end{bmatrix} \tag{10}$$

$$v = \begin{bmatrix} v[1] \\ v[2] \\ v[3] \end{bmatrix} = \begin{bmatrix} x \text{ component of thrust} \\ y \text{ component of thrust} \\ z \text{ component of thrust} \end{bmatrix} \tag{11}$$

The state equation 414 for the example indicated by FIG. 4 is Newton's law of gravitation for $m_p$ gravitating bodies. Thus the state equation 414 in the form of Equation (3) is $$\frac{dx}{dt} = T(x, v, w, t) = \begin{bmatrix} x[4] \\ x[5] \\ x[6] \\ \frac{v[1]}{x[7]} + U_G \sum_{i=1}^{m_p} \frac{M(i)r(i)[1]}{\|r(i)\|^3} \\ \frac{v[2]}{x[7]} + U_G \sum_{i=1}^{m_p} \frac{M(i)r(i)[2]}{\|r(i)\|^3} \\ \frac{v[3]}{x[7]} + U_G \sum_{i=1}^{m_p} \frac{M(i)r(i)[3]}{\|r(i)\|^3} \\ \frac{\|v\|}{gI_{sp}} \end{bmatrix} = \tag{12}$$

$$\begin{bmatrix} x \text{ velocity of spacecraft} \\ y \text{ velocity of spacecraft} \\ z \text{ velocity of spacecraft} \\ x \text{ acceleration of spacecraft} \\ y \text{ acceleration of spacecraft} \\ z \text{ acceleration of spacecraft} \\ \text{rate fuel is used} \end{bmatrix},$$

where $U_G$ is the universal gravitational constant, M(i) is the mass of the $i^{th}$ gravitating object or planet, r(i) is the x, y, and z components of the distance between the spacecraft and the $i^{th}$ gravitating object or planet, g is the acceleration of gravity at the Earth's surface, and $I_{sp}$ is the specific impulse of the spacecraft's engine. The product $gI_{sp}$ is the exhaust velocity of the rocket engine.

The state equation (3) allows for the possibility that the initial (or alternately the terminal) state $x(t=t_0)$ may be a function of the static parameter vector w. FIG. 4 provides an example when the initial state is a function of w. In this example, w[1] is defined to be the launch date from Earth. Thus, the initial spacecraft position and velocity is a function of where the Earth is in it's orbit around the Sun at the launch date w[1].

The user selected function T is not required to be continuous in time. This freedom allows the exact representation of different engine stages. An example is when an electric propulsion engine stage follows a chemical propulsion stage on a single spacecraft. In the example indicated by Equation (12), different engine stages could be represented by making $I_{sp}$ a discontinuous function of time. Each engine type has a characteristic value of $I_{sp}$.

In addition to providing the useful objective function 413, the state equation 414, and the constraints 415; the user of the invention may elect to include dynamic limitations 416 in the form of Equation (5). An example of a dynamic limitation is the time spacing between which navigational commands can be sent to control a spacecraft. For example, it may be possible to communicate with a spacecraft only once every ten days. Thus, the spacecraft thrust can only be changed once every ten days. For the example indicated by FIG. 4, the dynamic limitation 416 can be written, $$v(t) = \begin{vmatrix} u_1 & \text{for } t = t_0 \text{ to } t_1 \\ u_2 & \text{for } t = t_1 \text{ to } t_2 \\ \vdots & \vdots \\ u_N & \text{for } t = t_{N-1} \text{ to } t_N, \end{vmatrix} \quad (13)$$

where the period functions $f(u_i, w, t) = u_i$.

Once a useful objective function, a state equation, and any constraints and/or dynamic limitations are provided. the SDC algorithm 404 generates the optimal spacecraft trajectory, spacecraft navigation command sequence, and/or spacecraft design parameters. For the example indicated by FIG. 4, the output 417 of the SDC process is an optimal launch date w[1], an optimal flight time w[2], and an optimal thrust sequence v(t) to reach a target such that the fuel use is minimized and the launch date is after the new year of 2001.

C. Numerical Examples of Spacecraft Optimization Using the Period Formulation To provide further understanding of the present invention, two numerical examples of the SDC process applied to a simple spacecraft trajectory optimization problem are given in this subsection. The numerical examples are refinements of the example outlined in FIG. 4 discussed supra. Relatively simple examples are presented for clarity. Application of the SDC process is not limited to simple engineering problems.

The goal in both numerical examples is to generate optimal spacecraft launch dates, flight times, and thrust sequences to arrive at a target near the orbit of the planet Saturn. The objective is to minimize the amount of fuel required for the trip. The optimal launch date, flight time, and thrust sequence are defined to be those which require the least fuel. In the first example, the spacecraft is assumed to have a nuclear electric propulsion (NEP) engine. NEP engines are ion propulsion engines which operate on electricity produced by a nuclear fission reactor. In the second example, the spacecraft is assumed to have a solar electric propulsion (SEP) engine. SEP engines are ion propulsion engines which operate on electricity produced by solar cell arrays. Unlike NEP engines, SEP engines can only operate near the sun where solar cell arrays are efficient. SEP engines typically only operate out to about 25% of the distance from the sun to Saturn. SEP spacecraft must coast and additionally use the gravitational fields of planets during flybys to be accelerated to higher velocities to reach outer solar system destinations like Saturn.

In both numerical examples, the state vector x(t) is defined by Equation (10), the dynamic control vector v(t) by Equation (11), and the state equation by Equation (12). The x-axis is defined to be the line between the Sun and Earth at the instant of the launch. The y-axis lies in the ecliptic plane. The z-axis points in the direction of the solar system north pole completing a right handed rectangular coordinate system. The net gravitational effect of the sun and all nine planets in the solar system is accounted for. The spacecraft is assumed to have a single ion propulsion engine with a specific impulse (measure of engine efficiency) of $I_{sp}=3300$ seconds. The static parameter vector w is defined as, $$w = \begin{bmatrix} w[1] \\ w[2] \end{bmatrix} = \begin{bmatrix} \text{launch date (year)} \\ \text{total flight time (year)} \end{bmatrix}. \quad (14)$$

The "launch" or start of the space flight will occur from a near Earth solar orbit. The useful objective function defined by Equation (7) is used in both examples. The seventh component T[7] of the state equation (12) is the rate fuel is burned. Thus $$T[7] = \frac{dM_s(t)}{dt},$$

and the useful objective function (7) becomes $$J = \int_{w[1]}^{w[1]+w[2]} \frac{\|v\|}{g I_{sp}} dt. \quad (15)$$

This form of the useful objective function explicitly indicates the dependence of F on the thrust vector v.

The constraints $$K = x(w[1]+w[2])[1:3] - r_{Saturn}(w[1]+w[2]) = 0 \quad (16)$$

$$L = w[1] - 2001 \geq 0 \quad (17)$$

are used to require the spacecraft to reach a point 1 astronomical unit past Saturn by the end of the trajectory and to require the launch date to be after midnight Dec. 31, 2000.

In addition, the thrust magnitude is dynamically limited to be steady, allowing changes at N=100 evenly spaced intervals during the space flight. This dynamic limitation avoids calculated optimal thrust sequences v(t) which change continuously in time. This limitation reflects practical and mechanical constraints often present in spacecraft engines and control systems. Specifically $$v(t) = \begin{vmatrix} u_1 & \text{for } t = w[1] \text{ to } t_1 \\ u_2 & \text{for } t = t_1 \text{ to } t_2 \\ \vdots & \vdots \\ u_N & \text{for } t = t_{N-1} \text{ to } w[1]+w[2], \end{vmatrix} \quad (18)$$

where the dynamic parameter vectors $u_i \epsilon R^3$ are optimized by the period formulation of the SDC process. No limitation or constraints are placed on the spacecraft trajectory that require the spacecraft to use any preprescribed flyby sequence to get to Saturn. The SDC process is allowed to select any flyby sequence.

EXAMPLE 1

Nuclear Electric Propulsion

Equations (15), (12), (16)–(17), and (18) provide the useful objective function 413, the state equation 414, the constraints 415, and the dynamic limitations 416 respectively for the NEP example. The period formulation of the Static/dynamic algorithm 404 is used to generate the optimal NEP launch date, flight time, and spacecraft trajectory.

The first step 406 in FIG. 2 of the Static/dynamic algorithm 404 incorporates the constraint equations (16)–(17) into the useful objective function J and incorporates the dynamic limitation equation (18) into the period functions $f$. The dynamic limitation equation (18) can be incorporated in period functions $f$ by defining, $$f(u_i, w, t, i) = u_i \text{ for } i=1, 2, \ldots, N. \tag{19}$$

The constraint equations (16) and (17) can be incorporated into the objective J using twice differentiable penalty functions. For example, the function G in the general objective equation (2) can be defined, $$G(x(t_N), u_N, w, t_N, N) = \begin{Bmatrix} c_l L^t \cdot L & \text{when } L < 0 \\ 0 & \text{when } L \geq 0 \end{Bmatrix} + c_d K^t \cdot K \tag{20}$$

$$G(x(t_N), u_N, w, t_N, i) = 0 \quad i \neq N \tag{21}$$

where $c_l$ and $c_d$ are scaler, positive penalty function weights. The penalty weights $c_l$ and $c_d$ are increased and the problem is resolved until no significant change in the optimal trajectory occurs with increasing values for $c_l$ and $c_d$. Note that any standard method for handling constraints can be used. The penalty function method is probably the simplest, and is often adequate. The useful objective with the constraints incorporated is $$J = \int_{w[1]}^{w[1]+w[2]} \frac{\|v\|}{g I_{sp}} dt + \begin{Bmatrix} c_l L^t \cdot L & \text{when } L < 0 \\ 0 & \text{when } L \geq 0 \end{Bmatrix} + c_d K^t \cdot K \tag{22}$$

The second step 407 in the SDC algorithm 404 in FIG. 2 is to provide arbitrary initial approximations for v(t) and w. The initial approximations of v(t) and w are used with the state equation (12) to compute x(t). Once x(t) is obtained, the useful objective value of J is calculated using the objective equation (22). To demonstrate the robustness of the SDC algorithm, the initial approximation of v(t) was set to zero for all times, $$v(t) = \begin{Bmatrix} 0 \\ 0 \\ 0 \end{Bmatrix} \text{ for } t = w[1] \text{ to } w[1] + w[2]. \tag{23}$$

Figure 5:
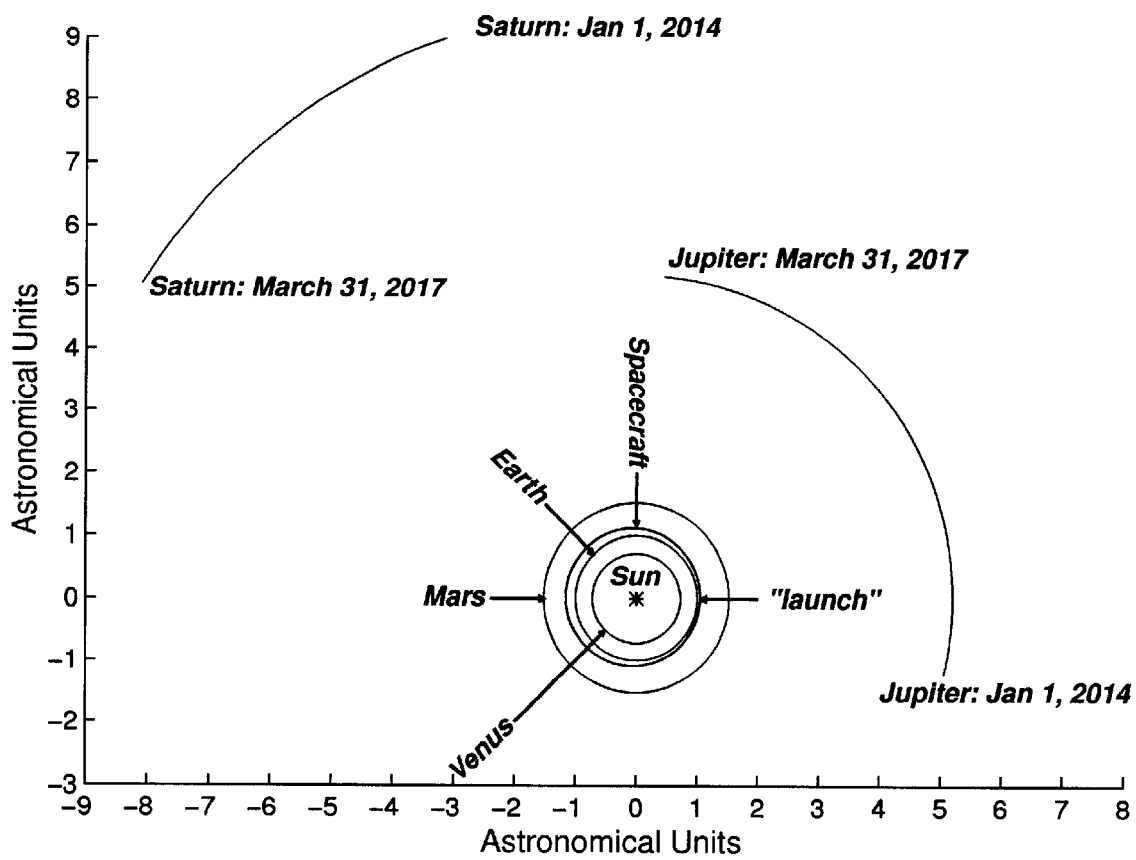
FIG. 5 depicts the first-iteration spacecraft trajectory for the example in FIG. 4 with the initial iteration values of: spacecraft travel for 3.25 years beginning Jan. 1, 2014 with zero spacecraft thrust for the entire flight.

The initial iteration values for the launch date w[1] and flight time w[2] were arbitrarily chosen to be 12:00 am Jan. 1, 2014 and 3.25 years respectively. The initial values for v(t) and w result in the spacecraft never leaving the Earth's vicinity in its three year "flight" (the spacecraft never reaches Saturn!) The thrust sequence, Equation (23), is obviously quite poor. This example demonstrates that the SDC process is highly robust because it can be started with very poor first iteration values for v(t) and w. FIG. 5 is a plot of the first iteration spacecraft trajectory resulting from the first iteration values of v(t) and w.

The remainder of step 407 and steps 408 through 412 of the SDC algorithm 404 in FIG. 2 were implemented using SDC software on a desktop workstation. The precise algorithmic steps followed by the computer are given in subsection 5 entitled "The Steps of the SDC Algorithm For the Period Formulation." The normalized time substitution was used which is described in detail in subsection 6 entitled "The Normalized Time Substitution." The required number of iterations of the loop terminating in step 412 of FIG. 2 was 1589.

Figure 6:
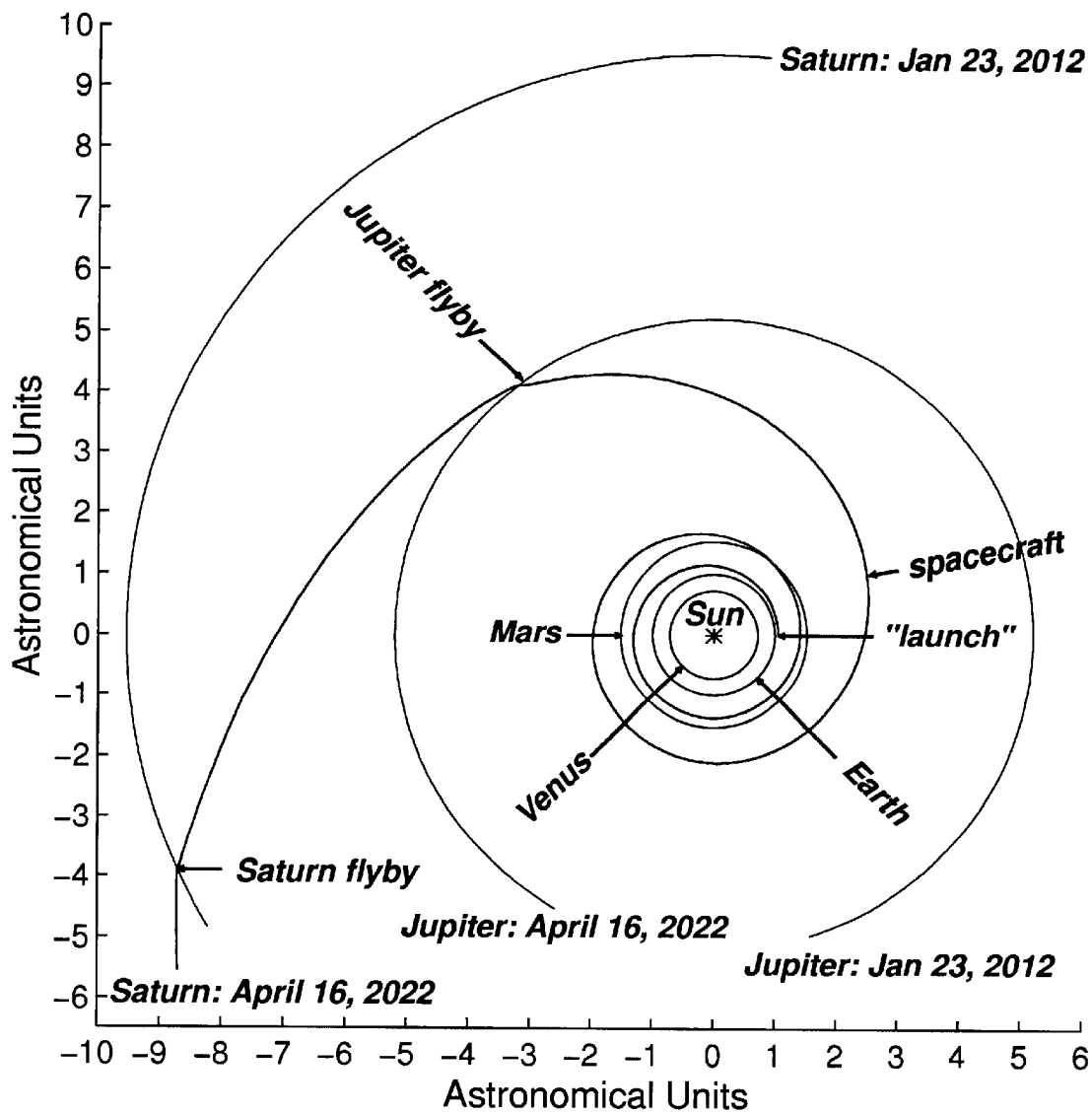
FIG. 6 depicts the optimal converged spacecraft trajectory for the example of FIGS. 4–5, using nuclear electric propulsion (NEP).

FIG. 6 is a plot of the optimal NEP trajectory obtained after convergence. FIG. 6 demonstrates a novel aspect of the present invention: the SDC process can identify and optimize spacecraft flybys without having the flybys prespecified. No other method for optimizing spacecraft trajectories is presently capable of doing this. As shown in FIG. 6, the SDC process identified and optimized two flybys. The first is a flyby of the planet Jupiter, which imparts kinetic energy to the spacecraft to accelerate the spacecraft toward the orbit of Saturn, thereby saving fuel. The second flyby is of the planet Saturn. The converged closest approach to Jupiter is $2.632 \times 10^6$ km. The converged closest approach to Saturn is $1.463 \times 10^6$ km. The optimal launch date (w[1]) is at 17:47:24 on Jan. 23 of the year 2012. The optimal flight time (w[2]) is 10.296 years.

Figure 7:
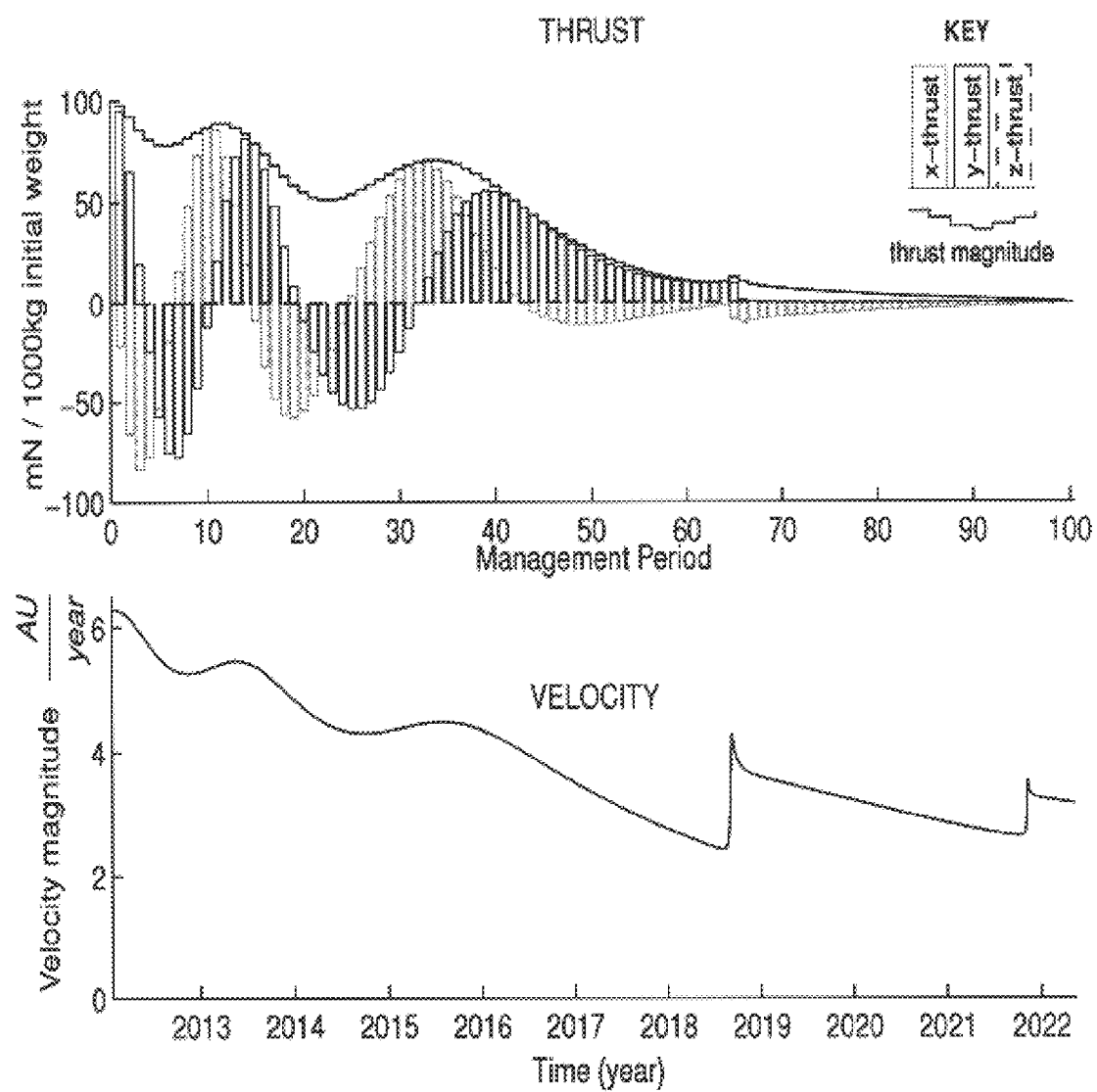
FIG. 7 depicts the time dependence of the converged optimal thrust sequence and velocity magnitude for the example of FIG. 6.

FIG. 7 is a plot of the optimal thrust sequence and the velocity magnitude corresponding to the trajectory plotted in FIG. 6. The plot of thrust is given as a bar plot to emphasize that the thrust is fixed during each of the 100 periods conforming to the dynamic limitation equation (18). The thrust in the z direction does not rise substantially above zero milli-newtons on the scale of the thrust plot in FIG. 7. The magnitude of the vector sum of the x, y, and z thrusts is plotted as a staircase like line in the upper half of the thrust graph. The optimal payload fraction for this example is 64.213%. Thus 35.787% of the initial spacecraft mass must be fuel. The payload result can be scaled to any size spacecraft. The velocity magnitude plot in FIG. 7 shows the velocity gains from the Jupiter flyby around the end of year 2018 and from the Saturn flyby near year 2022. These velocity gains result in substantially less fuel being required for the trip. The calculations for Example 1, comprising 1589 iterations, were performed in 113.5 minutes on a SUN Ultra workstation.

EXAMPLE 2

Solar Electric Propulsion

For simplicity, Example 2 will consider the same basic problem as for the NEP case of Example 1, except that SEP engines are used instead of EP engines. Unlike NEP engines, SEP engines cannot operate beyond about 2.6 astronomical units from the sun. The target is at about 10.4 astronomical units. In order to fly SEP spacecraft beyond 2.6 astronomical units, enough kinetic energy has to be transferred to the spacecraft inside of the 2.6 astronomical unit limit. In addition, flyby assists are necessary to increase speed outside the 2.6 astronomical unit limit. This problem is significantly more difficult to solve than the NEP problem in Example 1.

Figure 8:
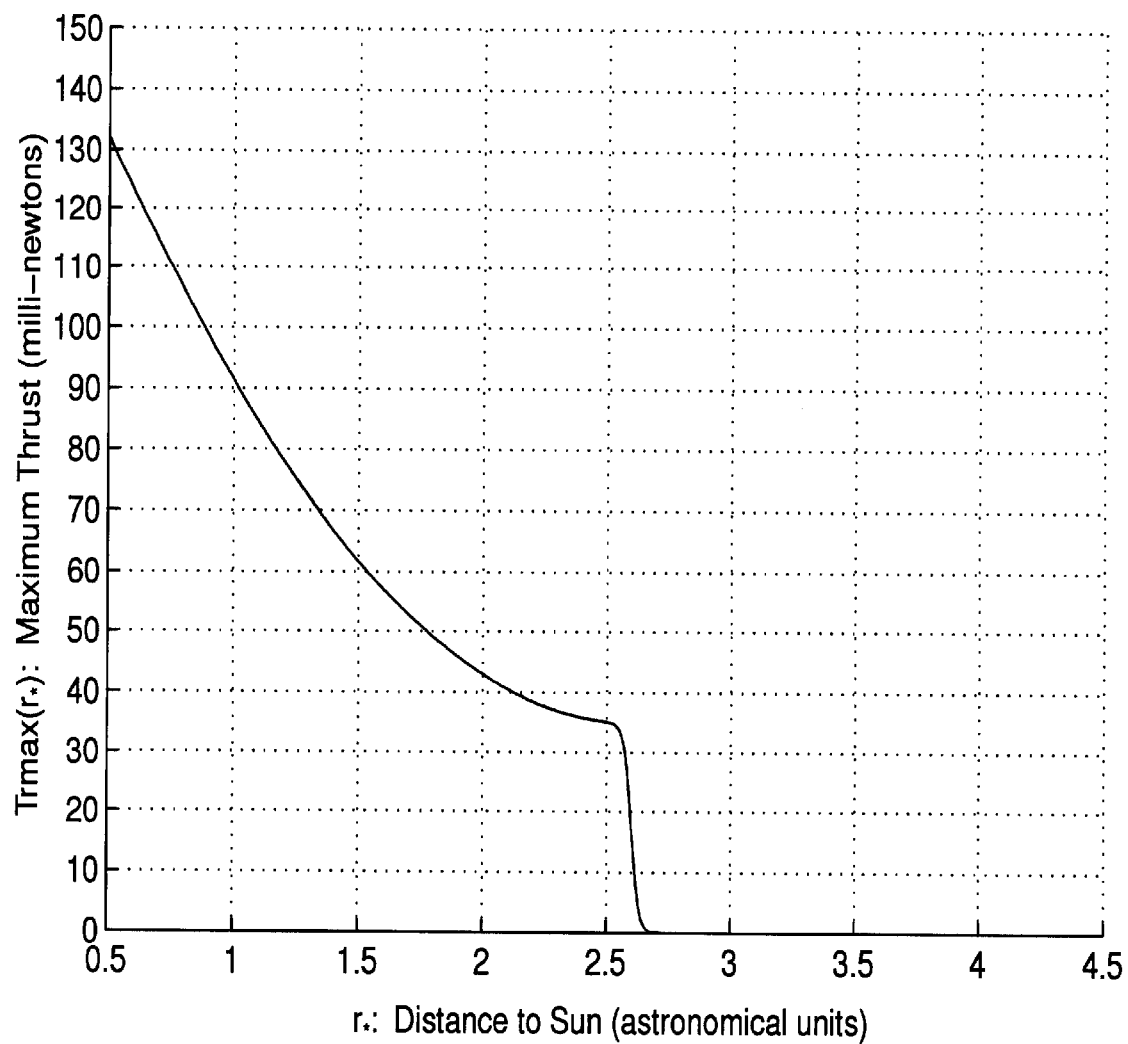
FIG. 8 depicts an assumed maximum thrust verses distance to the sun for the example of FIG. 9, using solar electric propulsion (SEP).

The SEP engine cut-off distance introduces a new constraint on the thrust, which can be written $$Tr\max(r^*) - \|v\| \geq 0, \tag{24}$$

where $r^*$ is the current distance between the spacecraft and the sun and $Tr\max(r^*)$ is the maximum possible thrust which can be attained using solar energy at distance $r^*$. A plot of the shape of $Tr\max(r^*)$ used in this example is given in FIG. 8. Notice that the maximum allowed thrust $Tr\max(r^*)$ drops to zero after 2.6 astronomical units.

In this example, the vector L of Equation (4) has two components $$L = \begin{Bmatrix} w[1] - 2001 \\ Tr\max(r_*) - \|v\| \end{Bmatrix} \geq \begin{Bmatrix} 0 \\ 0 \end{Bmatrix}. \tag{25}$$

The definition of L in Equation (25) will constrain the launch date w[1] and the thrust v(t) simultaneously.

Equations (15); (12); (16) and (25); and (18) provide the useful objective function 413, the state equation 414, the constraints 415, and dynamic limitations 416 respectively for the SEP example (see FIG. 4). The Static/dynamic algorithm 404 was used to generate the optimal SEP spacecraft trajectory.

The first step 406 of the Static/dynamic algorithm 404 incorporates the Equations (16) and (25) into the useful objective function J and incorporates Equation (18) into period functions ƒ. The same approach used for the NEP case of example 1 is used here. The result is given by Equations (19), (20), and (22).

The second step 407 in the SDC algorithm 404 of FIG. 4 provides arbitrary initial approximations for v(t) and w. Then the initial approximations of v)(t) and w, and the state equation (12) are used to compute x(t). Once x(t) is obtained, the useful objective value J is calculated using the objective equation (22). To again demonstrate the robustness of the SDC algorithm, the initial value of v(t) was set to zero for all times, $$v(t) = \begin{Bmatrix} 0 \\ 0 \\ 0 \end{Bmatrix} \text{ for } t = w[1] \text{ to } w[1] + w[2]. \tag{26}$$

The initial values for the launch date w[1] and flight time w[2] were arbitrarily chosen to be 12:00 am Jan. 1, 2014 and 3.25 years respectively. The initial values for v(t) and w result in the spacecraft never leaving the Earth's vicinity in its three year "flight" because the engine is never turned on. FIG. 5 is plot of the first iteration spacecraft trajectory resulting from the initial values of v(t) and w.

The remainder of step 407 and steps 408 through 412 of the SDC algorithm 404 were implemented using SDC software on a desktop workstation. The precise algorithmic steps followed by the computer are given in subsection 5 entitled "The Steps of the SDC Algorithm For the Period Formulation." The normalized time substitution was used which is described in detail in subsection 6 entitled "The Normalized Time Substitution." The required number of iterations of the loop terminating in step 412 of FIG. 2 was 1941.

Figure 9:
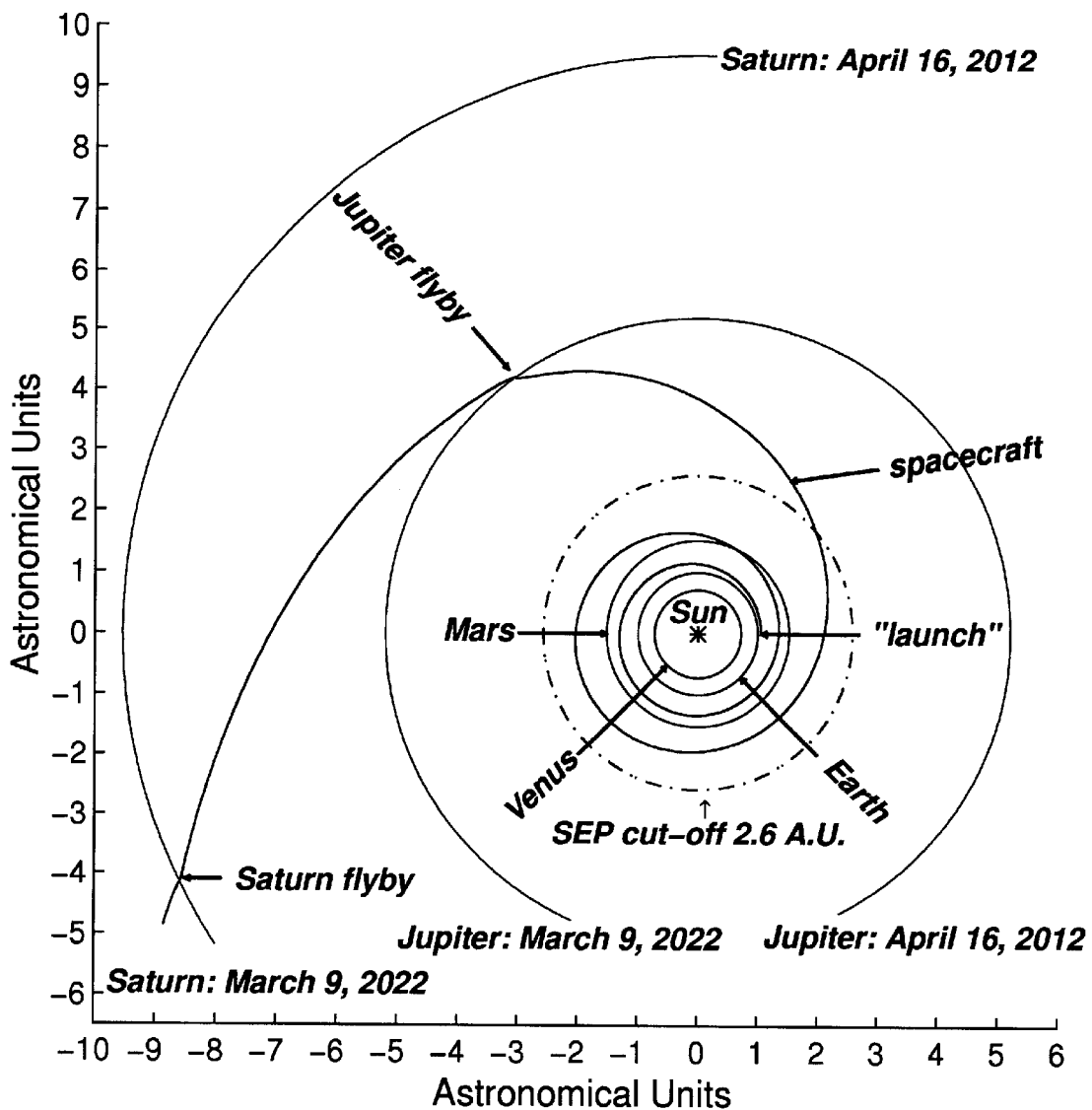
FIG. 9 depicts the optimal converged spacecraft trajectory for the example of FIGS. 4–5, using solar electric propulsion (SEP).

FIG. 9 is a plot of the optimal SEP trajectory obtained after convergence. FIG. 9 demonstrates a novel aspect of the present invention: the SDC process can identify and optimize spacecraft flybys without having the flybys prespecified even when an SEP thrust constraint is in effect. No other method for optimizing spacecraft trajectories is presently capable of doing this. As shown in FIG. 9, the SDC process identified and optimized two flybys. The first is a flyby of the planet Jupiter, which imparts kinetic energy to the spacecraft to accelerate the spacecraft toward the orbit of Saturn, thereby saving fuel. The second flyby is of the planet Saturn which results in a slow down to reach the final target 1 astronomical unit outside the orbit of Saturn. The converged closest approach to Jupiter is 1.717×10⁶ km. The converged closest approach to Saturn is 1.153×10⁶ km. The optimal launch date (w[1]) is at 05:43:08 on Apr. 16 of the year 2012. The optimal flight time (w[2]) is 10.190 years.

Figure 10:
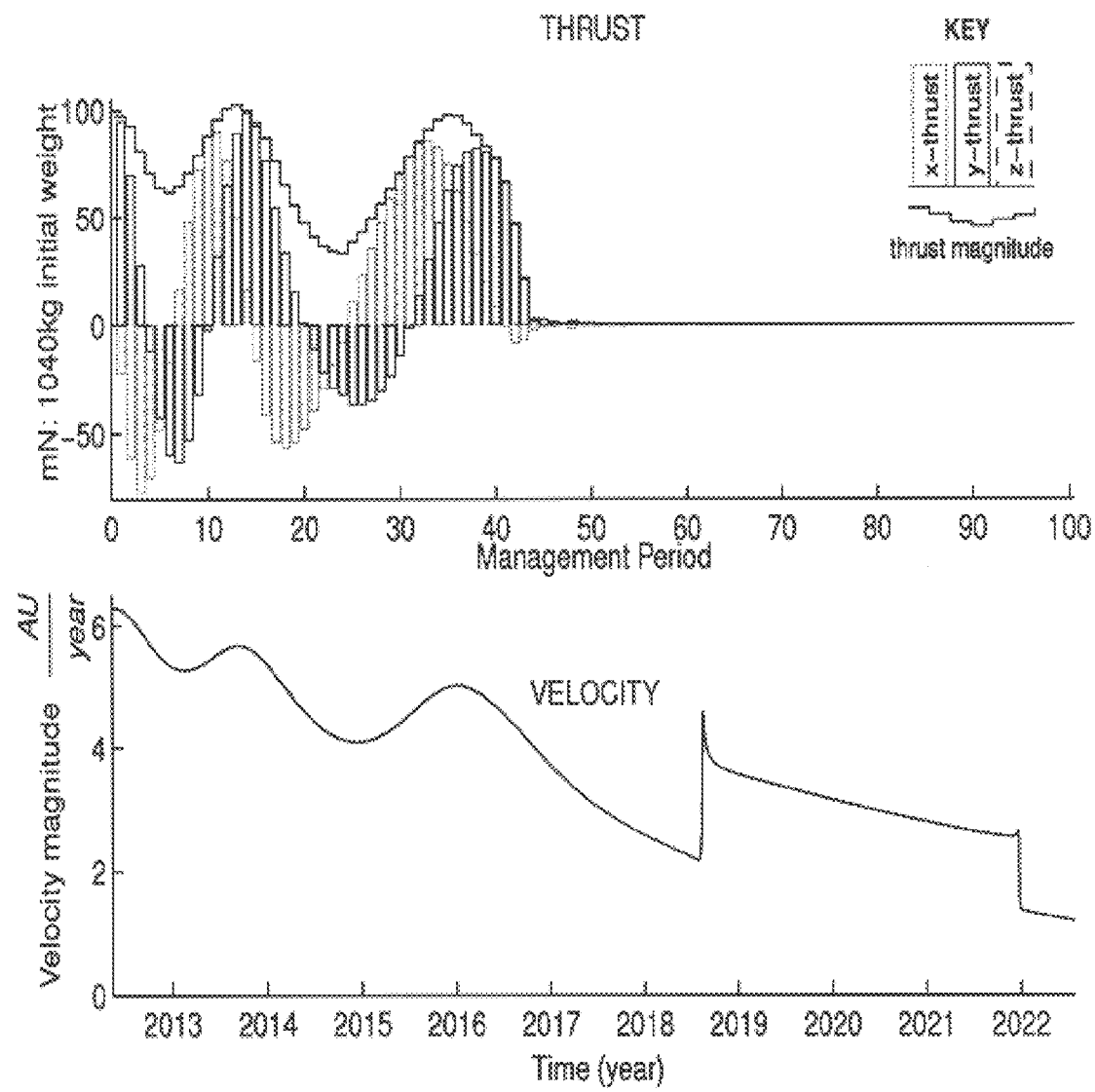
FIG. 10 depicts the time dependence of the converged optimal thrust sequence and velocity magnitude for the example of FIG. 9.

FIG. 10 is a plot of the optimal thrust sequence and the velocity magnitude corresponding to the trajectory plotted in FIG. 9 for a 1040 kg initial weight spacecraft. The thrust in the z direction does not rise substantially above zero millinewtons on the scale of the thrust plot in FIG. 10. Note that the engine is essentially shut down around year 2017 when the spacecraft exceeds the 2.6 astronomical unit distance. The optimal payload fraction for this example is 62.792%. Thus 37.208% of the initial spacecraft mass must be fuel. The velocity magnitude plot in FIG. 10 shows the velocity changes from the Jupiter flyby around the middle of year 2018 and the Saturn flyby near year 2022.

Note that despite the difficulty of sending an SEP spacecraft to a target beyond Saturn, the SDC process identified a trajectory that is similar to, and nearly as efficient, as the NEP trajectory in FIG. 6. In addition, the SDC process was started with a zero thrust initial trajectory. This demonstrates the power of the SDC process. The calculations for Example 2, comprising 1941 iterations, were performed in 141.3 minutes on a SUN Ultra workstation.

It should be understood that the present invention can be applied to virtually any spacecraft design and trajectory problem, which can differ substantially from the examples given in this subsection. While the examples given in this subsection may require certain variables, objectives and constraints, to be considered, other situations may require other variables, objectives, and constraints, in addition to, and/or in place of, those that are discussed. A detailed description of the static/dynamic control (SDC) algorithm for the period formulation is provided below. The fully continuous form of the SDC algorithm is provided in Appendix B.

4. The SDC Algorithm For the Period Formulation

The period formulation of the SDC algorithm is designed to solve problems of the following general form.

Algorithm Parameters

N=number of periods n=dimension of the state vector x(t)

m=dimension of the dynamic parameter Vectors $u_i$ (i=0, 1, . . . , N)

m'=dimension of the dynamic control vector v(t)

l=dimension of the static parameter vector w $t_i$=(i=0, 1, . . . , N) times marking divisions between periods General Formulation Given a user specified useful objective function of the form, $$J(u_1, u_2, \ldots, u_N, w) = \int_{t_0}^{t_N} F(x(t), v(t), w, t)dt + \sum_{i=1}^{N} G(x(t_i), u_i, w, t_i, i), \tag{27}$$

where either of $t_0 < t_N$ and $t_0 > t_N$ is permitted. The period formulation of the present invention finds dynamic parameter vectors $u_1, u_2, \ldots, u_N$, and static parameter vector w such that J is minimized (or analogously maximized), $$J^* = \min_{u,w} J(u_1, u_2, \ldots, u_N, w). \tag{28}$$

The minimization (or maximization) is subject to a user specified state equation:

$$\frac{dx(t)}{dt} = T(x(t), v(t), w, t) \quad x(t=t_0) = \Gamma(w). \tag{29}$$

The dynamic control vector, $v(t) \in R^{m'}$, is dynamically limited to be a parametric function of time over each of N specified time intervals called "periods:"

$$v(t) = \begin{cases} f(u_1, w, t, 1) & \text{for } t = t_0 \text{ to } t_1 \\ f(u_2, w, t, 2) & \text{for } t = t_1 \text{ to } t_2 \\ \vdots & \vdots \\ f(u_N, w, t, N) & \text{for } t = t_{N-1} \text{ to } t_N \end{cases} \quad (30)$$

The dynamic control vector v(t) is a piece-wise continuous vector function of time defining the dynamic control values at each time instant. The value of v(t) may change discontinuously at period interfaces $t_1, t_2, t_3, \ldots, t_{N-1}$. The functions $f(u_i, w, t, i) \in R^{m'}$, $i=1, 2, \ldots, N$ are parameterized by $u_i \in R^m$ and $w \in R^l$. The "dynamic parameter vector" for the $i^{th}$ period is defined to be the vector of parameters $u_i$. The time intervals $(t_{i-1}, t_i)$, $i=1, 2, \ldots, N$ and the number of periods N may be chosen arbitrarily. The elements of the static parameter vector w are fixed-in-time decision variables (i.e. non-dynamic). This formulation requires that both classes of variables, time changing (dynamic) variables and fixed-in-time (static) variables, are optimized simultaneously. The system state at time $t_0$, $\Gamma(w) \in R^n$ is assumed to be a continuously differentiable function of the static parameter vector w.

The state vector $x(t) \in R^n$ is a continuous function of time. It is assumed that the user selected functions $f \in R^{m'}$; F and $G \in R$; and $T \in R^n$ are continuously differentiable with respect to state vector x and the parameter vectors $u_i$ and w. The functions $f$, F, and T may be discontinuous functions of time t.

In addition, the user may define linear or nonlinear constraints of the form:

$$L(x(t), v(t), w, t) \geq 0 \text{ and/or } K(x(t), v(t), w, t) = 0. \quad (31)$$

Equation (31) constitute constraints relating x(t), v(t), w, and t. Any such constraint may be in the form of a constraint on a subset of x(t), v(t), w, and t. An example of such a constraint is a relationship between v(t) and t, such as $v(t) \leq At$ where A is a specified constant. Another example is a condition on v(t) alone, such as $v(t) < v_{max}$ where $v_{max}$ is a specified constant.

5. The Steps of the SDC Algorithm For the Period Formulation

This subsection outlines the steps for implementing the SDC algorithm for the period formulation. The theoretical basis for the period formulation is presented in subsection 7.

With reference to FIG. 2, Step 406 incorporates the constraint equations (31) into the objective function (27) using a twice differentiable penalty function or other standard constraint method. Next, the dynamic limitations, if present, are incorporated into period functions $f$.

Step 407 provides an initial (arbitrary) value for the dynamic parameter vectors $u_1, u_2, \ldots, u_N$, and the static parameter vector w. The initial values are denoted as $\bar{u}_1, \bar{u}_2, \ldots, \bar{u}_N$, and $\bar{w}$. Next, the time evolution of the state vector x(t), subject to $x(t=t_0)=\Gamma(w)$, is calculated using $\bar{u}_1, \bar{u}_2, \ldots, \bar{u}_N$, and $\bar{w}$ by integrating the state equation (29). The resulting state vector is denoted $\bar{x}(t)$. The useful objective value $J(\bar{u}_1, \bar{u}_2, \ldots, \bar{u}_N, \bar{w})$ is calculated using Equation (27). The resulting objective value is denoted $\bar{J}$.

Step 408 initializes the program parameters $P=0^{n \times n}$, $Q=0^{n \times 1}$, $\Delta R=0$, $S=0^{l \times 1}$, $Y=0^{n \times l}$, $W=0^{l \times l}$, and $\epsilon=1$.

Step 409 completes the following calculation for i=N, N−1, N−2, ..., 1 comprising a first substep followed by a second substep. Since period N encompasses times between $t_{N-1}$ and $t_N$, and since period 1 encompasses times between $t_0$ an $t_1$, the calculations of step 409 proceed backward in time if $t_0 < t_N$ and forward in time if $t_0 > t_N$.

The first substep of step 409 is the integration of the system of coupled ordinary differential equations (32)–(40) from $t=t_i$ to $t=t_{i-1}$ using the condition equations (41)–(49). The integration results in $J_x(t_{i-1})$, $J_u(t_{i-1})$, $J_w(t_{i-1})$, $J_{xx}(t_{i-1})$, $J_{xu}(t_{i-1})$, $J_{xw}(t_{i-1})$, $J_{uu}(t_{i-1})$, $J_{wu}(t_{i-1})$, and $J_{ww}(t_{i-1})$.

$$\dot{\bar{J}}_x = -F_x - T_x^t \bar{J}_x \quad (32)$$

$$\dot{\bar{J}}_u = -F_u - T_u^t \bar{J}_x \quad (33)$$

$$\dot{\bar{J}}_w = -F_w - T_w^t \bar{J}_x \quad (34)$$

$$\dot{\bar{J}}_{xx} = -F_{xx} - \bar{J}_{xx} T_x - T_x^t \bar{J}_{xx} - \sum_{k=1}^{n} \bar{J}_x[k] T_{xx}[k, :, :] \quad (35)$$

$$\dot{\bar{J}}_{xu} = -F_{xu} - \bar{J}_{xx} T_u - T_x^t \bar{J}_{xu} - \sum_{k=1}^{n} \bar{J}_x[k] T_{xu}[k, :, :] \quad (36)$$

$$\dot{\bar{J}}_{xw} = -F_{xw} - \bar{J}_{xx} T_w - T_x^t \bar{J}_{xw} - \sum_{k=1}^{n} \bar{J}_x[k] T_{xw}[k, :, :] \quad (37)$$

$$\dot{\bar{J}}_{uu} = -F_{uu} - \bar{J}_{xu}^t T_u - T_u^t \bar{J}_{xu} - \sum_{k=1}^{n} \bar{J}_x[k] T_{uu}[k, :, :] \quad (38)$$

$$\dot{\bar{J}}_{wu} = -F_{wu} - \bar{J}_{xw}^t T_u - T_w^t \bar{J}_{xu} - \sum_{k=1}^{n} \bar{J}_x[k] T_{wu}[k, :, :] \quad (39)$$

$$\dot{\bar{J}}_{ww} = -F_{ww} - \bar{J}_{xw}^t T_w - T_w^t \bar{J}_{xw} - \sum_{k=1}^{n} \bar{J}_x[k] T_{ww}[k, :, :] \quad (40)$$

Equations (32)–(40) are respectively subject to the conditions at time $t_i$:

$$\bar{J}_x(t_i) = G_x(\bar{x}(t_i), \bar{u}_i, \bar{w}, t_i) + Q \quad (41)$$

$$\bar{J}_u(t_i) = G_u(\bar{x}(t_i), \bar{u}_i, \bar{w}, t_i) \quad (42)$$

$$\bar{J}_w(t_i) = G_w(\bar{x}(t_i), \bar{u}_i, \bar{w}, t_i) + S \quad (43)$$

$$\bar{J}_{xx}(t_i) = G_{xx}(\bar{x}(t_i), \bar{u}_i, \bar{w}, t_i) + P \quad (44)$$

$$\bar{J}_{xu}(t_i) = G_{xu}(\bar{x}(t_i), \bar{u}_i, \bar{w}, t_i) \quad (45)$$

$$\bar{J}_{xw}(t_i) = G_{xw}(\bar{x}(t_i), \bar{u}_i, \bar{w}, t_i) + Y \quad (46)$$

$$\bar{J}_{uu}(t_i) = G_{uu}(\bar{x}(t_i), \bar{u}_i, \bar{w}, t_i) \quad (47)$$

$$\bar{J}_{wu}(t_i) = G_{wu}(\bar{x}(t_i), \bar{u}_i, \bar{w}, t_i) \quad (48)$$

$$\bar{J}_{ww}(t_i) = G_{ww}(\bar{x}(t_i), \bar{u}_i, \bar{w}, t_i) + W \quad (49)$$

where $\bar{J}_x(t) \in R^n$, $\bar{J}_u(t) \in R^m$, $\bar{J}_w(t) \in R^l$, $\bar{J}_{xx}(t) \in R^{n \times n}$, $\bar{J}_{xu}(t) \in R^{n \times m}$, $\bar{J}_{xw}(t) \in R^{n \times l}$, $\bar{J}_{wu}(t) \in R^{l \times m}$, $\bar{J}_{ww}(t) \in R^{l \times l}$, and $\bar{J}_{uu}(t) \in R^{m \times m}$. The superscript t indicates the transpose operation. All derivatives of F, G, and T in Equations (32)–(49) are evaluated using $\bar{x}(t)$, $\bar{u}_i$, and $\bar{w}$ and can be evaluated either analytically or numerically. The condition equations (41), (42), ..., and (49) apply to Equations (32), (33), ..., and (40) respectively.

The second substep of step 409 is implemented as follows. If $i \geq 2$, then the results of the integration of Equations (32)–(40) are used to evaluate and store:

$$\alpha_i = -\bar{J}_{uu}^{-1}(t_{i-1}) \bar{J}_u(t_{i-1})$$

$$\beta_i = -\bar{J}_{uu}^{-1}(t_{i-1}) \bar{J}_{xu}^t(t_{i-1})$$

$$\gamma_i = -\bar{J}_{uu}^{-1}(t_{i-1}) \bar{J}_{wu}^t(t_{i-1}).$$

Additionally, the values of ΔR, P, Q, S, W, and Y are replaced according to:

$$\Delta R = \Delta R + \bar{J}_u^t(t_{i-1})\bar{J}_{uu}^{-1}(t_{i-1})\bar{J}_u(t_{i-1}) = \Delta R - \bar{J}_u^t(t_{i-1})\alpha_i$$

$$P = \bar{J}_{xx}(t_{i-1}) - \bar{J}_{xu}(t_{i-1})\bar{J}_{uu}^{-1}(t_{i-1})\bar{J}_{xu}'(t_{i-1}) = \bar{J}_{xx}(t_{i-1}) + \bar{J}_{xu}(t_{i-1})\beta_i$$

$$Q = \bar{J}_x(t_{i-1}) - \bar{J}_{xu}(t_{i-1})\bar{J}_{uu}^{-1}(t_{i-1})\bar{J}_u(t_{i-1}) = \bar{J}_x(t_{i-1}) + \beta_i^t \bar{J}_u(t_{i-1})$$

$$S = \bar{J}_w(t_{i-1}) - \bar{J}_{wu}(t_{i-1})\bar{J}_{uu}^{-1}(t_{i-1})\bar{J}_u(t_{i-1}) = \bar{J}_w(t_{i-1}) + \gamma_i^t \bar{J}_u(t_{i-1})$$

$$W = \bar{J}_{ww}(t_{i-1}) - \bar{J}_{wu}(t_{i-1})\bar{J}_{uu}^{-1}(t_{i-1})\bar{J}_{wu}'(t_{i-1}) = \bar{J}_{ww}(t_{i-1}) + \bar{J}_{wu}(t_{i-1})\gamma_i$$

$$Y = \bar{J}_{xw}(t_{i-1}) - \bar{J}_{xu}(t_{i-1})\bar{J}_{uu}^{-1}(t_{i-1})\bar{J}_{wu}'(t_{i-1}) = \bar{J}_{xw}(t_{i-1}) + \beta_i^t \bar{J}_{wu}'(t_{i-1})$$

If i=1 then the results of the integration of Equations (32)–(40) are used to evaluate and store:

$$\alpha_1 = \left(\tilde{J}_{uu}(t_0) - \tilde{J}_{wu}^t(t_0)\tilde{J}_{ww}^{-1}(t_0)\tilde{J}_{wu}(t_0)\right)^{-1}\left(\tilde{J}_{wu}^t(t_0)\tilde{J}_{ww}^{-1}(t_0)\tilde{J}_w(t_0) - \tilde{J}_u(t_0)\right),$$

$$\xi = -\tilde{J}_{ww}^{-1}(t_0)\left(\tilde{J}_w(t_0) + \tilde{J}_{wu}(t_0)\alpha_1\right).$$

and the value of ΔR is replaced according to:

$$\Delta R = \Delta R + \tilde{J}_w^t(t_0)\tilde{J}_{ww}^{-1}(t_0)\tilde{J}_w(t_0) + \left(\tilde{J}_w^t(t_0)\tilde{J}_{ww}^{-1}(t_0)\tilde{J}_{wu}(t_0) - \bar{J}_u^t(t_0)\right)\alpha_1$$

where $$\tilde{J}_w^t \doteq \bar{J}_x^t(t_0)\Gamma_w + \bar{J}_w^t(t_0)$$

$$\tilde{J}_{ww} \doteq 2\bar{J}_x^t(t_0)\Gamma_{ww} + \Gamma_w^t \bar{J}_{xx}(t_0)\Gamma_w + \bar{J}_{ww}(t_0) + \Gamma_w^t \bar{J}_{xw}(t_0) + \bar{J}_{xw}^t(t_0)\Gamma_w$$

$$\tilde{J}_{wu} \doteq \Gamma_w^t \bar{J}_{xu}(t_0) + \bar{J}_{wu}(t_0).$$

Step 410 is the calculation of the updated static and dynamic parameter vectors, w and v(t), and the corresponding state vector x(t) for each time period in the time order of time periods 1, 2, . . . , j, . . . , N as follows: For j=1, the updated dynamic and static parameter vectors, $u_1$ and w, are respectively calculated via:

$$u_1 = \bar{u}_1 + \epsilon \alpha_1 \quad (50)$$

$$w = \bar{w} + \epsilon \xi. \quad (51)$$

The resulting values $u_1$, w and the updated state $x(t_0)=\Gamma$ (w) are used to integrate the state equation (29) from $t_0$ to $t_1$. For j=2, 3, . . . , N the updated dynamic parameter vector $u_j$ is calculated using:

$$u_j = \bar{u}_j + \epsilon \alpha_j + \beta_j(x(t_{j-1}) - \bar{x}(t_{j-1})) + \epsilon \gamma_j \xi \quad (52)$$

The resulting value of $u_j$ is used to integrate the state equation (29) from $t_{j-1}$ to $t_j$.

Concurrently with Step 410, the useful objective function (27) is evaluated using the updated control. The resulting objective value is denoted J(ε).

Step 411 is a comparison of the useful objective value J(ε) with the useful objective value $\bar{J}$. If there is satisfactory change, the values of the variables $\bar{J}$, $\bar{u}$, $\bar{w}$, and $\bar{x}(t)$ are respectively replaced by the values of J(ε), u, w, and x(t). A satisfactory change is a satisfactory reduction to J(ε) if J is to be minimized. A satisfactory change is a satisfactory increase to J(ε) if J is to be maximized. If there is not a satisfactory change, then ε is reduced and Step 410 is repeated. For example, ε can be reduced by one half. A satisfactory reduction criterion for minimization that can be used is:

$$\bar{J} - J(\epsilon) \geq \frac{1}{2}\left(\frac{\epsilon^2}{2} - \epsilon\right)\Delta R \quad (53)$$

A satisfactory increase criterion for maximization that can be used is:

$$J(\epsilon) - \bar{J} \geq -\frac{1}{2}\left(\frac{\epsilon^2}{2} - \epsilon\right)\Delta R \quad (54)$$

The criteria (53) and (54) are simply requirements that the observed improvement in the useful objective be at least half the improvement that is expected if the problem were exactly quadratic (see subsection 8 titled "The Expected Quadratic Change for the Period Formulation").

Step 412 is a test for convergence. If convergence is achieved, then the calculation ends. If convergence is not yet achieved, the Steps 408, 409, 410, and 411 are repeated. A convergence test that can be used is: convergence is achieved if the update law equations (50)–(52) with ε=1 result in 1) a change in the objective that is very small (i.e., within a specified tolerance) and is nearly equal to −½ΔR, and 2) $\tilde{J}_{ww}(t_0)$; $J_{uu}(t_i)$ for i=0, 2, 3, . . . , N−1; and $$\bar{J}_{uu}(t_0) - \tilde{J}_{wu}^t(t_0)\bar{J}_{ww}^{-1}(t_0)\tilde{J}_{wu}(t_0)$$

are all positive definite for minimization or all negative definite for maximization. This convergence test satisfies the necessary and sufficient conditions of optimality. Note, also, that when any of the above are not positive definite (or negative definite for maximization), a variation of the well known Trust Region method or shifting method can be used.

6. The Normalized Time Substitution

This subsection presents a method to solve dynamic optimization problems with variable beginning and ending times and variable time horizons. The goal is to optimize the trajectory simultaneously with optimizing the time $t_0$, and length of time $|t_N - t_0|$ used for the trajectory. The time $t_0$ is the initial time if $t_0 < t_N$ or it is the final time if $t_0 > t_N$. The general method presented here was originally developed for the specific problem of space flight trajectory optimization but is applicable to general physical problems. The method developed here uses the strengths of the SDC algorithm to simultaneously optimize static and dynamic variables.

It is not immediately possible for SDC to optimize the start-time and the time-horizon. The SDC algorithm requires a fixed start and end to the integration. A further complication is that if the time-horizon $t_N$ $t_0$ to changes, then individual periods $(t_{i-1}, t_i)$ must also change in length. In particular, the relationships $t_{i-1} < t_i$ must be maintained if $t_N > t_0$ or the relationships $t_{i-1} > t_i$ must be maintained if $t_N < t_0$. The method in this subsection assumes that as the time-horizon $t_N$ to $t_0$ changes in size, the sizes of the individual periods $t_i$ to $t_{i-1}$ change such that $t_i - t_{i-1}/t_N - t_0$ remains constant. For example, if $|t_N - t_0|$ is halved, then each period is halved. This method guarantees that the relationships $t_{i-1} < t_i$ or, alternately, $t_{i-1} > t_i$ are maintained. It is easy to generalize the method given in this subsection to optimize the time-duration of all periods $(t_{i-1}, t_i)$ simultaneously by assigning a component of w or $u_i$ to each period.

The normalized time substitution addresses the following general problem:

$$J^* = \min_{u_i,w} J = \min_{u_i,w} \int_{w[1]}^{w[1]+w[2]} F(x(t), v(t), w, t)\,dt + \sum_{N=i}^{1} G(x(t_i), u_i, w, t_i, i), \quad (55)$$

subject to the equation of state:

$$\frac{dx(t)}{dt} = T(x(t), v(t), w, t) \quad x(t = w[1]) = \Gamma(w), \quad (56)$$

where v(t) is subject to the dynamic limitation:

$$v(t) = \begin{vmatrix} f(u_1, w, t, 1) & \text{for } t = t_0 \text{ to } t_1 \\ f(u_2, w, t, 2) & \text{for } t = t_1 \text{ to } t_2 \\ \vdots & \vdots \\ f(u_N, w, t, N) & \text{for } t = t_{N-1} \text{ to } t_N, \end{vmatrix} \quad (57)$$

and where x, v, and w are subject to general constraints of the form:

$$L(x, v, w, t) \geq 0 \text{ and/or } K(x, v, w, t) = 0. \quad (58)$$

The static parameter vector w is assumed to have at least two components. The first two components are w[1] the start time of the problem and w[2] the duration of the problem. Note that Equations (55)–(57) are not in a form which SDC can solve directly. Equations (55)–(57) can be transformed into a mathematically equivalent problem which SDC can solve directly by making the substitution:

$$t = w[1] + w[2]\tau \quad 0 \leq \tau \leq 1 \quad (59)$$

where t is the "real time" or clock time and $\tau$ is the "normalized time."

Substitution of the Time Transformation into the Objective

If Equation (59) is substituted into Equation (55) then:

$$\min_{u_i,w} \int_0^1 F(x(w[1]+w[2]\tau), v(w[1]+w[2]\tau), w, w[1]+w[2]\tau)w[2]\,d\tau + \quad (60)$$
$$\sum_{i=1}^{N} G_i(x(w[1]+w[2]\tau_i), u_i, w, w[1]+w[2]\tau_i, i),$$

where $$\tau_i = \frac{t_i - w[1]}{w[2]}$$

and $dt = w[2]d\tau$. Depending on the physical interpretations of x, v, and w, the values x, v, and w may depend on w[2]. This may be understood by considering the example when x is equal to velocity. If the value of x is 5 in real time units or t-time, then, if w[2]=2, x is w[2]×5=10 in the normalized time units or $\tau$-time. The variables $\tilde{x}$, $\tilde{v}$, and $\tilde{w}$ are defined to be the state vector, dynamic control vector, and static parameter vector, respectively, in $\tau$-time units. In general, $$x(t=w[1]+w[2]\tau) = (w[2])^{nx}\tilde{x}(\tau) \quad (61)$$

$$v(t=w[1]+w[2]\tau) = (w[2])^{nv}\tilde{v}(\tau) \quad (62)$$

$$w = (w[2])^{nw}\tilde{w}. \quad (63)$$

For example, if x is a velocity, then nx=-1. In general, if the units of x include time$^{nx}$ then:

$$x(t=w[1]+w[2]\tau) = (w[2])^{nx}\tilde{x}(\tau)$$

because $$w[2] = \frac{t \text{ time units}}{\tau \text{ time units}}$$

is the conversion factor. If the units of x do not include time then nx=0. The same arguments hold for v and nv. For example, if v is interpreted as thrust, then the units of v are [mass][length][time]$^{-2}$. It follows that the conversion is $v(t=w[1]+w[2]\tau) = (w[2])^{-2}\tilde{v}(\tau)$. For w and nw, note that the first two components of w define the substitution and hence do not require conversion (i.e. nw=0 for w[1] and w[2].) If w has more than two components, then nw will be non-zero for components of w with units of time. Note: in general, different components of state and control vectors may have different units and hence require different factors of w[2] for the conversion. An example is when the first 3 components of x are position coordinates (units of length no time units) and the second set of three components are velocity (units of length and time$^{-1}$.) For this example, the conversion for the first three components is $(w[2])^0 = 1$ and the conversion for the second three components is $$(w[2])^{-1} = \frac{1}{w[2]}.$$

Thus $(w[2])^{nx}$, $(w[2])^{nv}$, and $(w[2])^{nw}$ are interpreted as vectors $\in R^n$, $R^m$, and $R^{m_w}$ respectively. For example, $$(w[2])^{nx} = \begin{bmatrix} (w[2])^{nx[1]} \\ (w[2])^{nx[2]} \\ \vdots \\ (w[2])^{nx[n]} \end{bmatrix}$$

where nx[i] is the appropriate factor of w[2] for the $i^{th}$ component of the state x. Further, products like $(w[2])^{nx}\tilde{x}(\tau)$ are interpreted as an element by element product $\in R^n$:

$$(w[2])^{nx}\tilde{x}(\tau) = \begin{bmatrix} (w[2])^{nx[1]}\tilde{x}_1(\tau) \\ (w[2])^{nx[2]}\tilde{x}_2(\tau) \\ \vdots \\ (w[2])^{nx[n]}\tilde{x}_n(\tau) \end{bmatrix}$$

Using the definitions for $\tilde{x}$, $\tilde{v}$, and $\tilde{w}$, Equation (60) can be rewritten in terms of the state and control in $\tau$-time units:

$$\min_{u_i,w} \int_0^1 F((w[2])^{nx}\tilde{x}(\tau), \quad (64)$$
$$(w[2])^{nv}\tilde{v}(\tau), (w[2])^{nw}w, w[1]+w[2]\tau)w[2]d\tau +$$
$$\sum_{i=1}^{N} G_i((w[2])^{nx}\tilde{x}(\tau_i), u_i, (w[2])^{nw}\tilde{w}, w[1]+w[2]\tau_i, i).$$

The time transformation of Equation (59) will be used to transform the state equation, the dynamic limitation, and the constraints into forms that explicitly relate to the normalized time variable $\tau$.

Substitution of the Time Transformation into the State Equation

Substituting Equation (59) into the continuous-time state equation (56) yields:

$$\frac{dx(t = w[1] + w[2]\tau)}{w[2]dt} = \qquad (65)$$
$$T(x(w[1] + w[2]\tau), v(w[1] + w[2]\tau), w, t = w[1] + w[2]\tau)$$
$$x(t = w[1]) = \Gamma(w).$$

Using the definition equations (61)–(63) Equation (65) can be rewritten as:

$$\frac{d((w[2])^{nx}\tilde{x}(\tau))}{w[2]d\tau} = \qquad (66)$$
$$T((w[2])^{nx}\tilde{x}(\tau), (w[2])^{nv}\tilde{v}(\tau), (w[2])^{nw}\tilde{w}, w[1] + w[2]\tau),$$

subject to the condition:

$$(w[2])^{nx}\tilde{x}(\tau=0) = \Gamma((w[2])^{nw}\tilde{w}). \qquad (67)$$

If the factors of w[2] are shifted to the right-hand-sides of Equations (66) and (67) then:

$$\frac{d\tilde{x}(\tau)}{d\tau} = \qquad (68)$$
$$(w[2])^{1-nx}T((w[2])^{nx}\tilde{x}(\tau), (w[2])^{nv}\tilde{v}(\tau), (w[2])^{nw}\tilde{w}, w[1] + w[2]\tau),$$

subject to the condition:

$$\tilde{x}(\tau=0) = (w[2])^{-nx}\Gamma((w[2])^{nw}\tilde{w}),$$

which is the state equation for $\tilde{x}$.

Substitution of the Time Transformation into the Dynamic Limitation

Substitution of Equation (59) into the dynamic limitation equation (57) yields:

$$v(w[1] + w[2]\tau) = \qquad (69)$$

$$\begin{vmatrix} f(u_1, w, w[1]+w[2]\tau, 1) & \text{for } \tau = 0 \text{ to } \frac{t_1 - w[1]}{w[2]} \\ f(u_1, w, w[1]+w[2]\tau, 2) & \text{for } \tau = \frac{t_1 - w[1]}{w[2]} \text{ to } \frac{t_2 - w[1]}{w[2]} \\ \vdots & \vdots \\ f(u_N, w, w[1]+w[2]\tau, N) & \text{for } \tau = \mathrm{frac}t_{N-1} - w[1]w[2] \text{ to } 1. \end{vmatrix}$$

If $\tau_i$ is defined to be $$\tau_i \doteq \frac{t_i - w[1]}{w[2]}$$

and the definition equations (62) and (63) are used, then Equation (69) can be rewritten as follows:

$$\tilde{v}(\tau) = (w[2])^{-nv}\begin{vmatrix} f(u_1, w, w[1]+w[2]\tau, 1) & \text{for } \tau = 0 \text{ to } \tau_1 \\ f(u_1, w, w[1]+w[2]\tau, 2) & \text{for } \tau = \tau_1 \text{ to } \tau_2 \\ \vdots & \vdots \\ f(u_N, w, w[1]+w[2]\tau, N) & \text{for } \tau = \tau_{N-1} \text{ to } 1. \end{vmatrix} \qquad (70)$$

Equation (70) is the dynamic limitation for the dynamic control in $\tau$-time units, $\tilde{v}$. Note that $u_i$ is assumed to be a unitless vector of parameters. This is the same as assuming the units of v are embedded within a constant multiplier of the functions $f$. For example, if $f(u_i, w, t, i) = u_i$, then the units of v are contained in the constant 1 multiplying $u_i$. With this approach, it is not necessary convert $u_i$ to $\tau$-time units.

Substitution of the Time Transformation into the Constraints

Substitution of (59) into the general constraint equations (58) results in:

$$L((w[2])^{nx}\tilde{x}(\tau), (w[2])^{nv}\tilde{v}(\tau), (w[2])^{nw}\tilde{w}, w[1]+w[2]\tau) \geq 0 \qquad (71)$$

and $$K((w[2])^{nx}\tilde{x}(\tau), (w[2])^{nv}\tilde{v}(\tau), (w[2])^{nw}\tilde{w}, w[1]+w[2]\tau) \geq 0. \qquad (72)$$

Summary

With the following definitions:

$$\tilde{F}(\tilde{x}, \tilde{v}, \tilde{w}, \tau) \doteq w[2]F((w[2])^{nx}\tilde{x}(\tau), (w[2])^{nv}\tilde{v}(\tau), (w[2])^{nw}\tilde{w}, w[1]+w[2]\tau) \qquad (73)$$

$$\tilde{G}(\tilde{x}, u_i, \tilde{w}, \tau_i, i) \doteq G((w[2])^{nx}\tilde{x}(\tau_i), u_i, (w[2])^{nw}\tilde{w}, w[1]+w[2]\tau_i, i) \qquad (74)$$

$$\tilde{T}(\tilde{x}, \tilde{v}, \tilde{w}, \tau) \doteq (w[2])^{1-nx}T((w[2])^{nx}\tilde{x}(\tau), (w[2])^{nv}\tilde{v}(\tau), (w[2])^{nw}\tilde{w}, w[1]+w[2]\tau) \qquad (75)$$

$$\tilde{\Gamma}(\tilde{w}) \doteq (w[2])^{-nx}\Gamma((w[2])^{nw}\tilde{w}) \qquad (76)$$

$$\tilde{f}(u_i, \tilde{w}, \tau, i) \doteq (w[2])^{-nv}f(u_i, w, w[1]+w[2]\tau, i) \qquad (77)$$

$$\tilde{L}(\tilde{x}, \tilde{v}, \tilde{w}, \tau) \doteq L((w[2])^{nx}\tilde{x}(\tau), (w[2])^{nv}\tilde{v}(\tau), (w[2])^{nw}\tilde{w}, w[1]+w[2]\tau) \qquad (78)$$

$$\tilde{K}(\tilde{x}, \tilde{v}, \tilde{w}, \tau) \doteq K((w[2])^{nx}\tilde{x}(\tau), (w[2])^{nv}\tilde{v}(\tau), (w[2])^{nw}\tilde{w}, w[1]+w[2]\tau) \qquad (79)$$

$$\tau_i \doteq \frac{t_i - w[1]}{w[2]} \qquad (80)$$

the original problem equations (55)–(58) can be rewritten:

$$J^* = \min_{u_i, w} J = \qquad (81)$$
$$\min_{u_i, \tilde{w}} \int_0^1 \tilde{F}(\tilde{x}(\tau), \tilde{v}(\tau), \tilde{w}, \tau)d\tau + \sum_{i=1}^N \tilde{G}(\tilde{x}(\tau_i), u_i, \tilde{w}, \tau_i, i),$$

$$\frac{d\tilde{x}(\tau)}{d\tau} = \tilde{T}(\tilde{x}(\tau), \tilde{v}(\tau), \tilde{w}, \tau) \quad \tilde{x}(\tau=0) = \tilde{\Gamma}(\tilde{w}), \qquad (82)$$

$$\tilde{v}(\tau) = \begin{vmatrix} \tilde{f}(u_1, \tilde{w}, \tau, 1) & \text{for } \tau = 0 \text{ to } \tau_1 \\ \tilde{f}(u_2, \tilde{w}, \tau, 2) & \text{for } \tau = \tau_1 \text{ to } \tau_2 \\ \vdots & \vdots \\ \tilde{f}(u_N, \tilde{w}, \tau, N) & \text{for } \tau = \tau_{N-1} \text{ to } 1, \end{vmatrix} \qquad (83)$$

$$\tilde{L}(\tilde{x}, \tilde{v}, \tilde{w}, \tau) \geq 0, \text{ and/or } \tilde{K}(\tilde{x}, \tilde{v}, \tilde{w}, \tau) = 0, \qquad (84)$$

which is a form that SDC can directly address.

7. The Theoretical Basis of the SDC Algorithm For the Period Formulation

The SDC algorithm is constructed beginning with the period (i=N) first and working in time to the period (i=1). Appendix A contains variable definitions.

The theoretical basis addresses the formulation (27)–(34). The theoretical basis begins with the period $t \in (t_{N-1}, t_N)$. The not necessarily optimal objective value, initially defined as a function of state x at time $t \in (t_{N-1}, t_N)$, and using parameter values $u_N$ and w from time t to $t_N$ is:

$$J(x, u_N, w, t) \doteq \int_t^{t_N} F(x(\tau), f(u_N, w, \tau, N), w, \tau) d\tau + G(x(t_N), u_N, w, t_N, N) \quad (85)$$

The symbol $\doteq$ is read "defined to be." It follows by definition equation (85) that, $$J(x, u_N, w, t) = \int_t^{t+\Delta t} F(x(\tau), f(u_N, w, \tau, N), w, \tau) d\tau + J(x(t+\Delta t), u_N, w, t+\Delta t). \quad (86)$$

A Taylor series expansion of $J(x(t+\Delta t), u_N, w, t+\Delta t)$ about the time t is:

$$J(x(t+\Delta t), u_N, w, t+\Delta t) = J(x(t), u_N, w, t) + (J_t + J_x^t \dot{x} + J_u^t \dot{u}_N + J_w^t \dot{w}) \Delta t + O(\Delta t^2), \quad (87)$$

where $J_t \in R$, $J_x \in R^n$, $J_u \in R^m$, $J_w \in R^l$ are partial derivatives of J with respect to t, x, u, and w. The superscript t denotes the transpose operation. The time derivatives $\dot{u}_N$ and $\dot{w}$ are both zero because $u_N$ and w are not functions of time. The derivative $\dot{x}$ is already defined as $T(x, f(u_N, w, t, N), w, t)$ by Equation (29) so Equation (87) can be written:

$$J(x(t+\Delta t), u_N, w, t+\Delta t) = J(x(t), u_N, w, t) + J_t \Delta t + J_x^t T \Delta t + O(\Delta t^2) \quad (88)$$

Substituting Equation (88) into Equation (86) and cancelling $J(x(t), u_N, w, t)$ appearing on the left and right hand sides results in:

$$-J_t \Delta t = \int_t^{t+\Delta t} F(x(\tau), f(u_N, w, \tau, N), w, \tau) d\tau + J_x^t T \Delta t + O(\Delta t^2). \quad (89)$$

If Equation (89) is divided by $\Delta t$ and $\Delta t \to 0$ the result is:

$$-J_t(x, u_N, w, t) = F(x, f(u_N, w, t, N), w, t) + J_x^t(x, u_N, w, t) T(x, f(u_N, w, t, N), w, t). \quad (90)$$

The right-hand side of Equation (90) is often called the Hamiltonian function. A system of (adjoint) ordinary differential equations which describe J, $J_x$, $J_u$, $J_w$, $J_{xx}$, $J_{xu}$, $J_{xw}$, $J_{uu}$, $J_{wu}$, and $J_{ww}$ as functions of time $t \in (t_{N-1}, t_N)$ can be obtained using Equation (90). Subscripts of J denote partial derivatives (for example $J_u = \partial J / \partial u$.) The system of ordinary differential equations can be used to calculate feedback law updates using only derivatives of f, F, T and G. These equations are obtained by simply differentiating Equation (90) with respect to x, u, and w:

$$-J_{tx} = F_x + J_{xx} T + T_x^t J_x \quad (91)$$

$$-J_{tu} = F_u + J_{xu}^t T + T_u^t J_x \quad (92)$$

$$-J_{tw} = F_w + J_{xw}^t T + T_w^t J_x \quad (93)$$

$$-J_{txx} = \quad (94)$$

$$F_{xx} + \sum_{i=1}^n J_{xxx}[:,:,i] T[i] + J_{xx} T_x + T_x^t J_{xx} + \sum_{i=1}^n J_x[i] T_{xx}[i,:,:]$$

$$-J_{txu} = \quad (95)$$

$$F_{xu} + \sum_{i=1}^n J_{xux}[:,:,i] T[i] + J_{xx} T_u + T_x^t J_{xu} + \sum_{i=1}^n J_x[i] T_{xu}[i,:,:]$$

$$-J_{txw} = \quad (96)$$

$$F_{xw} + \sum_{i=1}^n J_{xwx}[:,:,i] T[i] + J_{xx} T_w + T_x^t J_{xw} + \sum_{i=1}^n J_x[i] T_{xw}[i,:,:]$$

$$-J_{tuu} = \quad (97)$$

$$F_{uu} + \sum_{i=1}^n J_{uux}[:,:,i] T[i] + J_{xu}^t T_u + T_u^t J_{xu} + \sum_{i=1}^n J_x[i] T_{uu}[i,:,:]$$

$$-J_{twu} = \quad (98)$$

$$F_{wu} + \sum_{i=1}^n J_{wux}[:,:,i] T[i] + J_{xw}^t T_u + T_w^t J_{xu} + \sum_{i=1}^n J_x[i] T_{wu}[i,:,:]$$

$$-J_{tww} = \quad (99)$$

$$F_{ww} + \sum_{i=1}^n J_{wwx}[:,:,i] T[i] + J_{xw}^t T_w + T_w^t J_{xw} + \sum_{i=1}^n J_x[i] T_{ww}[i,:,:].$$

The summations in Equations (94)–(99) are used to clarify products involving rank three objects. For example, $T_{xx}[i,:,:]$ is the Hessian of the $i^{th}$ coruporient of T with respect to x, $J_x[i]$ is the $i^{th}$ component of the derivative of J with respect to x, and $$J_{wux}[i, j, k] = \frac{\partial^3 J}{\partial w[i] \partial u[j] \partial x[k]}.$$

Products involving rank one and/or rank two objects are ordinary vector and matrix products (for example $J_{xx} T_x$ is the ordinary matrix product of two $R^{n \times n}$ matrices.) An integrable system of equations requires the total time derivatives of J, $J_x$, $J_u$, $J_w$, $J_{xx}$, $J_{xu}$, $J_{xw}$, $J_{uu}$, $J_{wu}$, and $J_{ww}$. The total time derivative of J is:

$$\dot{J} = J_t + J_x^t T, \quad (100)$$

where $$T = \frac{\partial x}{\partial t}.$$

Similarly;

$$\dot{J}_x = J_{xt} + J_{xx} T \quad (101)$$

$$\dot{J}_u = J_{ut} + J_{xu}^t T \quad (102)$$

$$\dot{J}_w = J_{wt} + J_{xw}^t T \quad (103)$$

$$\dot{J}_{xx} = J_{xxt} + \sum_{i=1}^n J_{xxx}[:,:,i] T[i] \quad (104)$$

$$\dot{J}_{xu} = J_{xut} + \sum_{i=1}^n J_{xux}[:,:,i] T[i] \quad (105)$$

$$\dot{J}_{xw} = J_{xwt} + \sum_{i=1}^n J_{xwx}[:,:,i] T[i] \quad (106)$$

$$\dot{J}_{uu} = J_{uut} + \sum_{i=1}^n J_{uux}[:,:,i] T[i] \quad (107)$$

$$\dot{J}_{wu} = J_{wut} + \sum_{i=1}^n J_{wux}[:,:,i] T[i] \quad (108)$$

-continued $$\dot{J}_{ww} = J_{wwt} + \sum_{i=1}^{n} J_{wwx}[:,:,i]T[i] \tag{109}$$

Substituting Equations (90) through (99) into Equations (100) through (109) yields the following integratable expression for the total derivatives:

$$\dot{J} = -F \tag{110}$$

$$\dot{J}_x = -F_x - T_x^t J_x \tag{111}$$

$$\dot{J}_u = -F_u - T_u^t J_x \tag{112}$$

$$\dot{J}_w = -F_w - T_w^t J_x \tag{113}$$

$$\dot{J}_{xx} = -F_{xx} - J_{xx}T_x - T_x^t J_{xx} - \sum_{i=1}^{n} J_x[i]T_{xx}[i,:,:] \tag{114}$$

$$\dot{J}_{xu} = -F_{xu} - J_{xx}T_u - T_x^t J_{xu} - \sum_{i=1}^{n} J_x[i]T_{xu}[i,:,:] \tag{115}$$

$$\dot{J}_{xw} = -F_{xw} - J_{xx}T_w - T_x^t J_{xw} - \sum_{i=1}^{n} J_x[i]T_{xw}[i,:,:] \tag{116}$$

$$\dot{J}_{uu} = -F_{uu} - J_{xu}^t T_u - T_u^t J_{xu} - \sum_{i=1}^{n} J_x[i]T_{uu}[i,:,:] \tag{117}$$

$$\dot{J}_{wu} = -F_{wu} - J_{xw}^t T_u - T_w^t J_{xu} - \sum_{i=1}^{n} J_x[i]T_{wu}[i,:,:] \tag{118}$$

$$\dot{J}_{ww} = -F_{ww} - J_{xw}^t T_w - T_w^t J_{xw} - \sum_{i=1}^{n} J_x[i]T_{ww}[i,:,:] \tag{119}$$

Equations (110)–(119) along with the condition equations which specify J and it's derivitives at time $t_N$, $$J(x(t_N), u_N, w, t_N) = G(x(t_N), u_N, w, t_N, N) \tag{120}$$

$$J_x(x(t_N), u_N, w, t_N) = G_x(x(t_N), u_N, w, t_N, N) \tag{121}$$

$$J_u(x(t_N), u_N, w, t_N) = G_u(x(t_N), u_N, w, t_N, N) \tag{122}$$

$$J_w(x(t_N), u_N, w, t_N) = G_w(x(t_N), u_N, w, t_N, N) \tag{123}$$

$$J_{xx}(x(t_N), u_N, w, t_N) = G_{xx}(x(t_N), u_N, w, t_N, N) \tag{124}$$

$$J_{xu}(x(t_N), u_N, w, t_N) = G_{xu}(x(t_N), u_N, w, t_N, N) \tag{125}$$

$$J_{xw}(x(t_N), u_N, w, t_N) = G_{xw}(x(t_N), u_N, w, t_N, N) \tag{126}$$

$$J_{uu}(x(t_N), u_N, w, t_N) = G_{uu}(x(t_N), u_N, w, t_N, N) \tag{127}$$

$$J_{wu}(x(t_N), u_N, w, t_N) = G_{wu}(x(t_N), u_N, w, t_N, N) \tag{128}$$

$$J_{ww}(x(t_N), u_N, w, t_N) = G_{ww}(x(t_N), u_N, w, t_N, N) \tag{129}$$

provide a means to calculate the first and second order partial derivatives of J with respect to x, u, and w at any time $t \in (t_{N-1}, t_N)$. The calculation of a control update, requires these derivatives at time $t_{N-1}$. Derivatives at time $t_{N-1}$ can be obtained by integrating the Equations (111)–(129) from time $t_N$ to $t_{N-1}$.

Once the first and second order partial derivatives of J at time $t_{N-1}$ are computed, a feedback update for $u_N$ can be computed. The feedback update is a function of $x(t_{n-1})$ and w and is based on a quadratic approximation to the original problem at time $t_{N-1}$. $\bar{u}$ and $\bar{w}$ denote a nominal (not necessarily optimal) control. $\bar{x}(t)$ is defined to be the state trajectory obtained by integrating the state equation using $\bar{u}$ and $\bar{w}$. The useful objective function J can be expanded about $\bar{u}, \bar{w}$, and $\bar{x}(t_{N-1})$ at time $t_{N-1}$ using a Taylor series:

$$J(x(t_{N-1}), u_N, w, t_{N-1}) = \bar{J} + \bar{J}_x^t \delta x + \bar{J}_u^t \delta u_N + \bar{J}_w^t \delta w + \tag{130}$$
$$\frac{1}{2} \delta x^t \bar{J}_{xx} \delta x +$$
$$\delta x^t \bar{J}_{xu} \delta u_N + \delta w^t \bar{J}_{wu} \delta u_N +$$
$$\frac{1}{2} \delta u_N^t \bar{J}_{uu} \delta u_N +$$
$$\frac{1}{2} \delta w^t \bar{J}_{ww} \delta w \delta x^t \bar{J}_{xw} \delta w + H.O.T.,$$

where $\bar{J} \doteq J(\bar{x}(t_{N-1}), \bar{u}_N, \bar{w}, t_{N-1})$, $\delta x \doteq x(t_{N-1}) - \bar{x}(t_{N-1})$, $\delta u_N \doteq u_N - \bar{u}_N$, $\delta w \doteq w - \bar{w}$, and H.O.T. stands for "Higher Order Terms".

$\hat{J}$ is defined to be the quadratic part of $J(x(t_{N-1}), u_N, w, t_{N-1})$:

$$\hat{J}(\delta x, \delta u_N, \delta w) \doteq \bar{J} + \bar{J}_x^t \delta x + \bar{J}_u^t \delta u_N + \bar{J}_w^t \delta w + \frac{1}{2} \delta x^t \bar{J}_{xx} \delta x + \tag{131}$$
$$\delta x^t \bar{J}_{xu} \delta u_N + \delta w^t \bar{J}_{wu} \delta u_N + \frac{1}{2} \delta u_N^t \bar{J}_{uu} \delta u_N +$$
$$\frac{1}{2} \delta w^t \bar{J}_{ww} \delta w + \delta x^t \bar{J}_{xw} \delta w.$$

The necessary condition for a minima of $\hat{J}$ with respect to $u_N$ is $$\nabla_{u_N} \hat{J} = 0 \tag{132}$$

Differentiating Equation (131) with respect to $u_N$ yields the necessary condition:

$$0 = \bar{J}_u + \bar{J}_{xu}^t \delta x + \bar{J}_{wu}^t \delta w + \bar{J}_{uu} \delta u_N \tag{133}$$

Solving Equation (133) for $\delta u_N$ yields the following feedback law:

$$\delta u_N(\delta x, \delta w) = -\bar{J}_{uu}^{-1} \bar{J}_u - \bar{J}_{uu}^{-1} \bar{J}_{xu}^t \delta x - \bar{J}_{uu}^{-1} \bar{J}_{wu}^t \delta w \tag{134}$$

With the definitions $\alpha_N \doteq -\bar{J}_{uu}^{-1} \bar{J}_u$, $\beta_N \doteq -\bar{J}_{uu}^{-1} \bar{J}_{xu}^t$, and $\gamma_N \doteq -\bar{J}_{uu}^{-1} \bar{J}_{wu}^t$, the feedback law equation (134) can be written $$\delta u_N(\delta x, \delta w) = \alpha_N + \beta_N \delta x + \gamma_N \delta w. \tag{135}$$

If $J_{uu}$ is positive (negative) definite, then $\bar{u}_N + \delta u_N$ is the global minima (maxima) of $\hat{J}$. Note that $\nabla_w \hat{J}(t_{N-1}) = 0$ is not required at this stage. The update for $\delta w$ is obtained from the requirement that $\nabla_w \hat{J}(t_0) = 0$. The resulting $\delta w$ is then used in the feedback law equation (135) and its successors for period N−1, N−2, etc.

If Equation (135) is substituted into the quadratic expansion equation (131) and term, are collected, then the quadratic return function can be obtained. The quadratic return function $\hat{J}^*$ is the optimal value of $\hat{J}$ with respect to $\delta u_N$ for any given $\delta x$ and $\delta w$ at time $t_{N-1}$.

$$\hat{J}^*(\delta x, \delta w) = \left(\bar{J} + \bar{J}_u^t \alpha_N + \frac{1}{2}\alpha_N^t \bar{J}_{uu}\alpha_N\right) + \quad (136)$$

$$\left(\bar{J}_x^t + \bar{J}_u^t \beta_N + \alpha_N^t \bar{J}_{xu}^t + \alpha_N^t \bar{J}_{uu}\beta_N\right)\delta x +$$

$$\left(\bar{J}_u^t \gamma_N + \bar{J}_w^t + \alpha_N^t \bar{J}_{uw} + \alpha_N^t \bar{J}_{uu}\gamma_N\right)\delta w +$$

$$\delta x^t \left(\frac{1}{2}\bar{J}_{xx} + \bar{J}_{uu}\beta_N + \frac{1}{2}\beta_N^t \bar{J}_{uu}\beta_N\right)\delta x +$$

$$\delta x^t \left(\frac{1}{2}\bar{J}_{ww} + \gamma_N^t \bar{J}_{uw} + \frac{1}{2}\gamma_N^t \bar{J}_{uu}\gamma_N\right)\delta w +$$

$$\delta x^t (\bar{J}_{xu}\gamma_N + \beta_N^t \bar{J}_{uw} + \beta_N^t \bar{J}_{uu}\gamma_N + \bar{J}_{xw})\delta w.$$

With the definitions $\alpha_N = -\bar{J}_{uu}^{-1}\bar{J}_u$, $\beta_N = -\bar{J}_{uu}^{-1}\bar{J}_{xu}^t$, and $\gamma_N = -\bar{J}_{uu}^{-1}\bar{J}_{wu}^t$, Equation (136) can be simplified to:

$$\hat{J}^*(\delta x, \delta w) = \left(\bar{J} - \frac{1}{2}\bar{J}_u^t \bar{J}_{uu}^{-1}\bar{J}_u\right) + (\bar{J}_x^t - \bar{J}_u^t \bar{J}_{uu}^{-1}\bar{J}_{xu}^t)\delta x + \quad (137)$$

$$(\bar{J}_w^t - \bar{J}_u^t \bar{J}_{uu}^{-1}\bar{J}_{wu}^t)\delta w +$$

$$\frac{1}{2}\delta x^t (\bar{J}_{xx} - \bar{J}_{xu}\bar{J}_{uu}^{-1}\bar{J}_{xu}^t)\delta x +$$

$$\frac{1}{2}\delta x^t (\bar{J}_{ww} - \bar{J}_{wu}\bar{J}_{uu}^{-1}\bar{J}_{xu}^t)\delta x +$$

$$\delta w^t (\bar{J}_{xw} - \bar{J}_{xu}\bar{J}_{uu}^{-1}\bar{J}_{wu}^t)\delta w.$$

With the following definitions, $$P \doteq \bar{J}_{xx} - \bar{J}_{xu}\bar{J}_{uu}^{-1}\bar{J}_{xu}^t \quad (138)$$

$$Q^t \doteq \bar{J}_x^t - \bar{J}_u^t \bar{J}_{uu}^{-1}\bar{J}_{xu}^t$$

$$R \doteq \bar{J} - \frac{1}{2}\bar{J}_u^t \bar{J}_{uu}^{-1}\bar{J}_u$$

$$S^t \doteq \bar{J}_w^t - \bar{J}_u^t \bar{J}_{uu}^{-1}\bar{J}_{wu}^t$$

$$W \doteq \bar{J}_{ww} - \bar{J}_{wu}\bar{J}_{uu}^{-1}\bar{J}_{wu}^t$$

$$Y \doteq \bar{J}_{xw} - \bar{J}_{xu}\bar{J}_{uu}^{-1}\bar{J}_{wu}^t,$$

Equation (137) can be rewritten:

$$\hat{J}^*(\delta x, \delta w) = R + Q^t \delta x + S^t \delta w + \frac{1}{2}\delta x^t P \delta x + \frac{1}{2}\delta w^t W \delta w \quad (139)$$

$$+ \delta x^t Y \delta w.$$

The objective value accumulated between a time $t \in (t_{N-2}, t_{N-1})$ to the time $t_N$ can be defined to be:

$$J(x(t), u_{N-1}, w, t) \doteq \int_t^{t_{N-1}} F(x(\tau), u_{N-1}, w, \tau)d\tau +$$
$$G(x(t_{N-1}), u_{N-1}, w, t_{N-1}, N-1) + \hat{J}^*(\delta x, \delta w). \quad (140)$$

Note that J as defined above does not depend on a choice for $u_N$ because the optimal (quadratic) choice for $u_N$ will be made using the feedback law equation (135). The optimal choice for $u_N$ is a function of $\delta x$ and $\delta w$ and indirectly a function of $u_{N-1}$ because $u_{N-1}$ will affect $\delta x$ in general. The optimal objective value (for $t > t_{N-1}$) is represented by $\hat{J}^*$.

The problem is now to optimize Equation (140) with respect to $u_{N-1}$. This can be achieved by finding a feedback update similar to Equation (135) for $u_{N-1}$.

The form of Equation (140) is identical to Equation (85) replacing G with $G + \hat{J}^*$ and replacing $u_N$ by $u_{N-1}$, hence the same development used to obtain the update equation (135) can be repeated to find an update for $\delta u_{N-1}$. In particular, the ordinary differential equation system (110) to (119) can be integrated from $t_{N-1}$ to $t_{N-2}$ with the following conditions specified at time $t_{N-1}$:

$$J(x(t_{N-1}), u_{N-1}, w, t_{N-1}) = G(x(t_{N-1}), u_{N-1}, w, t_{N-1}, N-1) + R \quad (141)$$

$$J_x(x(t_{N-1}), u_{N-1}, w, t_{N-1}) = G_x(x(t_{N-1}), u_{N-1}, w, t_{N-1}, N-1) + Q \quad (142)$$

$$J_u(x(t_{N-1}), u_{N-1}, w, t_{N-1}) = G_u(x(t_{N-1}), u_{N-1}, w, t_{N-1}, N-1) \quad (143)$$

$$J_w(x(t_{N-1}), u_{N-1}, w, t_{N-1}) = G_w(x(t_{N-1}), u_{N-1}, w, t_{N-1}, N-1) + S \quad (144)$$

$$J_{xx}(x(t_{N-1}), u_{N-1}, w, t_{N-1}) = G_{xx}(x(t_{N-1}), u_{N-1}, w, t_{N-1}, N-1) + P \quad (145)$$

$$J_{xu}(x(t_{N-1}), u_{N-1}, w, t_{N-1}) = G_{xu}(x(t_{N-1}), u_{N-1}, w, t_{N-1}, N-1) \quad (146)$$

$$J_{xw}(x(t_{N-1}), u_{N-1}, w, t_{N-1}) = G_{xw}(x(t_{N-1}), u_{N-1}, w, t_{N-1}, N-1) + Y \quad (147)$$

$$J_{uu}(x(t_{N-1}), u_{N-1}, w, t_{N-1}) = G_{uu}(x(t_{N-1}), u_{N-1}, w, t_{N-1}, N-1) \quad (148)$$

$$J_{wu}(x(t_{N-1}), u_{N-1}, w, t_{N-1}) = G_{wu}(x(t_{N-1}), u_{N-1}, w, t_{N-1}, N-1) \quad (149)$$

$$J_{ww}(x(t_{N-1}), u_{N-1}, w, t_{N-1}) = G_{ww}(x(t_{N-1}), u_{N-1}, w, t_{N-1}, N-1) + W \quad (150)$$

If the definitions $\bar{J} \doteq J(\bar{x}(t_{N-2}), \bar{u}_{N-1}, \bar{w}, t_{N-2})$, $\delta x \doteq x(t_{N-2}) - \bar{x}(t_{N-2})$, and $\delta u_{N-1} \doteq u_{N-1} - \bar{u}_{N-1}$ are made, then the update for $u_{N-1}$ analogous to Equation (134) is:

$$\delta u_{N-1}(\delta x, \delta w) = -\bar{J}_{uu}^{-1}\bar{J}_u - \bar{J}_{uu}^{-1}\bar{J}_{xu}^t \delta x - \bar{J}_{uu}^{-1}\bar{J}_{wu}^t \delta w \quad (151)$$

With the definitions, $\alpha_{N-1} \doteq -\bar{J}_{uu}^{-1}\bar{J}_u$, $\beta_{N-1} \doteq -\bar{J}_{uu}^{-1}\bar{J}_{xu}^t$, and $\gamma_{N-1} \doteq -\bar{J}_{uu}^{-1}\bar{J}_{wu}^t$, the update for $u_{N-1}$ can be written $$\delta u_{N-1}(\delta x, \delta w) = \alpha_{N-1} + \beta_{N-1}\delta x + \gamma_{N-1}\delta w. \quad (152)$$

This procedure can be repeated for each period $N-2$, $N-3$, ..., 2. The result is a feedback law for $u_{N-2}, u_{N-3}, \ldots, u_2$ similar to Equation (135).

The first period must be handled differently and requires additional steps to calculate the update $\delta w$ for the static parameter vector w. The quadratic expansion which is an analog to Equation (131) for the first period $t = t_0$ is:

$$\hat{J}(\delta x, \delta u_1, \delta w) = \bar{J} + \bar{J}_x^t \delta x + \bar{J}_u^t \delta u_1 + \bar{J}_w^t \delta w + \frac{1}{2}\delta x^t \bar{J}_{xx}\delta x + \quad (153)$$

$$\delta x^t \bar{J}_{xu}\delta u_1 + \delta w^t \bar{J}_{wu}\delta u_1 + \frac{1}{2}\delta u_1^t \bar{J}_{uu}\delta u_1 +$$

$$\frac{1}{2}\delta w^t \bar{J}_{ww}\delta w + \delta x^t \bar{J}_{xw}\delta w,$$

where $\bar{J} \doteq J(\bar{x}(t_0), \bar{u}_1, \bar{w}, t_0)$, and $\delta u_1 \doteq u_1 - \bar{u}_1$. The value $\delta x$ for $t = t_0$ is:

$$\delta x \doteq \Gamma(w) - \Gamma(\bar{w}) = \Gamma(w) - \bar{\Gamma}$$

An update for $u_1$ and w can be calculated by expanding $\delta x(w)$ about $\bar{w}$:

$$\delta x(w) = \Gamma_w \delta w + \frac{1}{2}\delta w^t \Gamma_{ww}\delta w, \quad (154)$$

where all derivatives of $\Gamma$ are evaluated at the nominal $\bar{w}$. The dependence on $\delta x$ in Equation (153) can be eliminated if Equation (154) is substituted into Equation (153). Keeping only quadratic and lower order terms, Equation (153) becomes:

$$\hat{J}(\delta u_1, \delta w) = \bar{J} + \bar{J}_x^t \Gamma_w \delta w + \delta w^t (\bar{J}_x^t \Gamma_{ww})\delta w + \quad (155)$$

$$\bar{J}_u^t \delta u_1 + \bar{J}_w^t \delta w + \frac{1}{2}\delta w^t \Gamma_w^t \bar{J}_{xx}\Gamma_w \delta w +$$

$$\delta w^t \Gamma_w^t \bar{J}_{xu}\delta u_1 + \delta w^t \bar{J}_{wu}\delta u_1 +$$

-continued $$\frac{1}{2}\delta u_1^t J_{uu} \delta u_1 + \frac{1}{2}\delta w^t J_{ww} \delta w +$$

$$\frac{1}{2}\delta w^t (\Gamma_w^t J_{xw} + J_{xw}^t \Gamma_w) \delta w.$$

Collecting terms, Equation (155) becomes:

$$\hat{J}(\delta u_1, \delta w) = J + (J_x^t \Gamma_w + J_w^t) \delta w + \quad (156)$$

$$\frac{1}{2}\delta w^t (2J_x^t \Gamma_{ww} + \Gamma_w^t J_{xx} \Gamma_w + J_{ww} + \Gamma_w^t J_{xw} + J_{xw}^t \Gamma_w) \delta w +$$

$$J_u^t \delta u_1 + \frac{1}{2}\delta u_1^t J_{uu} \delta u_1 + \delta w^t (\Gamma_w^t J_{xu} + J_{wu}) \delta u_1.$$

With the definitions:

$$\tilde{J}_w^t \triangleq J_x^t \Gamma_w + J_w^t \quad (157)$$

$$\tilde{J}_{ww} \triangleq 2J_x^t \Gamma_{ww} + \Gamma_w^t J_{xx} \Gamma_w + J_{ww} + \Gamma_w^t J_{xw} + J_{xw}^t \Gamma_w$$

$$\tilde{J}_{wu} \triangleq \Gamma_w^t J_{xu} + J_{wu},$$

Equation (156) can be written:

$$\hat{J}(\delta u_1, \delta w) = \quad (158)$$

$$J + \tilde{J}_w^t \delta w + \frac{1}{2}\delta w^t \tilde{J}_{ww} \delta w + J_u^t \delta u_1 + \frac{1}{2}\delta u_1^t J_{uu} \delta u_1 + \delta w^t \tilde{J}_{wu} \delta u_1.$$

The optimal updates for w arid $u_1$, $\delta w^*$ and $\delta u_1^*$ respectively, can be calculated using the necessary conditions for optimality:

$$\frac{\partial \hat{J}}{\partial u_1} = 0 = J_u + \tilde{J}_{uw} \delta w^* + J_{uu} \delta u_1^* \quad (159)$$

$$\frac{\partial \hat{J}}{\partial w} = 0 = \tilde{J}_w + \tilde{J}_{uw}^t \delta u_1^* + \tilde{J}_{ww} \delta w^* \quad (160)$$

The condition equations (159) and (160) must be solved simultaneously. The update $\delta w^*$ can be eliminated first by solving for $\delta w^*$ in Equation (160) and then substituting $\delta w^*$ into Equation (159):

$$\xi \triangleq \delta w^* = -\tilde{J}_{ww}^{-1} \tilde{J}_w - \tilde{J}_{ww}^{-1} \tilde{J}_{uw}^t \delta u_1^* \quad (161)$$

$$0 = J_u - \tilde{J}_{uw} \tilde{J}_{ww}^{-1} \tilde{J}_w + (J_{uu} - \tilde{J}_{uw} \tilde{J}_{ww}^{-1} \tilde{J}_{uw}^t) \delta u_1^*. \quad (162)$$

Thus, the update for $u_1$ is given by $$\alpha_1 \triangleq \delta u_1^* = (J_{uu} - \tilde{J}_{uw} \tilde{J}_{ww}^{-1} \tilde{J}_{uw}^t)^{-1} (\tilde{J}_{uw} \tilde{J}_{ww}^{-1} \tilde{J}_w - J_u). \quad (163)$$

Once $\alpha_1$ is obtained, Equation (161) can be used to find $\delta w^*$. $\xi$ is defined to be the optimal update $\delta w^*$. Since the dependence on $\delta x$ is eliminated in Equation (115), there is no need for a "$\beta_1$", only $\alpha_1$ and $\xi$ are needed to define the update for period 1.

8. The Expected quadratic Change for the Period Formulation

In this subsection the quadratic expected change for the SDC Algorithm is calculated. The quadratic expected change is the exact change in the useful objective function J using a single iteration of the SDC algorithm if the problem the algorithm is applied to has a linear state equation and a quadratic objective. For general nonlinear problems far from the optimal solution, the change in the objective for a single iteration is different than the quadratic expected change. SDC uses the difference between the expected quadratic change and the actual change in the objective to test candidate update steps and as a convergence measure.

A single iteration of the SDC algorithm results in feedback law equations (135), (152) and it's predecessors, and the update equations (161) and (163). The feedback laws and updates are defined by $\alpha_i$, $\beta_i$, and $\gamma_i$ for i=2, 3, . . . , N; and $\xi$. This subsection will present the calculation of the expected quadratic change for slightly more general feedback laws and updates which include a single scaler parameter $\epsilon$ in addition to $\alpha$, $\beta$, $\gamma$, and $\xi$. The more general feedback laws and updates are "damped" versions of the SDC feedback laws and updates developed in subsection 7. In particular, if $\epsilon=0$, then no change in the control trajectory will result. If $\epsilon=1$, the SDC feedback laws and updates developed in subsection 7 are applied to update the control trajectory. If $\epsilon$ has a value between zero and one, then the feedback laws and updates generally produce smaller changes to the current iterations control values as $\epsilon$ decreases. The parameter $\epsilon$ is useful for dealing with highly nonlinear problems because large, unstable updates can be avoided.

The sequence of updates and feedback laws are defined as follows: for period 1:

$$\delta u_1 = \epsilon \alpha_1 \quad (164)$$

$$\delta w = \epsilon \xi \quad (165)$$

for periods i=2, 3, . . . , N:

$$\delta u_i = \epsilon \alpha_i + \beta_i \delta x + \gamma_i \delta w \quad (166)$$

or equivalently for periods i=2, 3, . . . , N, $$\delta u_i = \epsilon \alpha_i + \beta_i \delta x + \epsilon \gamma_i \xi, \quad (167)$$

where $\epsilon$ can be any value between 1 and 0, and $$\alpha_1 = \left(J_{uu}(t_0) - \tilde{J}_{wu}^t \tilde{J}_{ww}^{-1} \tilde{J}_{wu}\right)^{-1} \left(\tilde{J}_{wu}^t \tilde{J}_{ww}^{-1} \tilde{J}_w - J_u(t_0)\right),$$

$$\alpha_i = -J_{uu}^{-1}(t_{i-1}) J_u(t_{i-1}) \text{ for } i > 1,$$

$$\xi = -\tilde{J}_{ww}^{-1} \left(\tilde{J}_w - \tilde{J}_{uw}^t \alpha_1\right),$$

$$\beta_i = -J_{uu}^{-1}(t_{i-1}) J_{xu}^t(t_{i-1}),$$

$$\gamma_i = -J_{uu}^{-1}(t_{i-1}) J_{wu}^t(t_{i-1}).$$

In order to compute the expected change, begin with the $N^{th}$ period. If the feedback law equation (166) with i=N is substituted into the quadratic expansion, $$\hat{J}(\delta x, \delta u_N, \delta w) = \quad (168)$$

$$J + J_x^t \delta x + J_u^t \delta u_N + J_w^t \delta w + \frac{1}{2}\delta x^t J_{xx} \delta x + \delta x^t J_{xu} \delta u_N +$$

$$\delta w^t J_{wu} \delta u_N + \frac{1}{2}\delta u_N^t J_{uu} \delta u_N + \frac{1}{2}\delta w^t J_{ww} \delta w + \delta x^t J_{xw} \delta w,$$

the result is, $$\hat{J}'(\delta x, \delta w, \epsilon, t_{N-1}) = \left(\bar{J} + \bar{J}_u^t \epsilon \alpha_N + \frac{1}{2}\epsilon^2 \alpha_N^t \bar{J}_{uu} \alpha_N\right) + \quad (169)$$
$$(\bar{J}_u^t \gamma_N + \bar{J}_w^t + \epsilon \alpha_N^t \bar{J}_{uw} + \epsilon \alpha_N^t \bar{J}_{uu} \gamma_N) \delta w +$$
$$\delta w^t \left(\frac{1}{2}\bar{J}_{ww} + \gamma_N^t \bar{J}_{uw} + \frac{1}{2}\gamma_N^t \bar{J}_{uu} \gamma_N\right) \delta w +$$
$$\delta w^t (\gamma_N^t \bar{J}_{xu}^t + \bar{J}_{uw}^t \beta_N + \gamma_N^t \bar{J}_{uu} \beta_N + \bar{J}_{xw}^t) \delta x +$$
$$(\bar{J}_x^t + \bar{J}_u^t \beta_N + \epsilon \alpha_N^t \bar{J}_{xu}^t + \epsilon \alpha_N^t \bar{J}_{uu} \beta_N) \delta x +$$
$$\delta x^t \left(\frac{1}{2}\bar{J}_{xx} + \bar{J}_{xu} \beta_N + \frac{1}{2}\beta_N^t \bar{J}_{uu} \beta_N\right) \delta x.$$

Using the definitions of $\alpha_N$, $\beta_N$ and $\gamma_N$, and collecting terms, Equation (169) can be written:

$$\hat{J}'(\delta x, \delta w, \epsilon, t_{N-1}) = \quad (170)$$
$$\bar{J}(t_{N-1}) + \left(\frac{\epsilon^2}{2} - \epsilon\right) \bar{J}_u^t \bar{J}_{uu}^{-1} \bar{J}_u + (\bar{J}_w^t - \bar{J}_u^t \bar{J}_{uu}^{-1} \bar{J}_{wu}^t) \delta w +$$
$$\frac{1}{2}\delta w^t (\bar{J}_{ww} - \bar{J}_{wu} \bar{J}_{uu}^{-1} \bar{J}_{uw}) \delta w + \delta w^t (\bar{J}_{xw}^t - \bar{J}_{wu} \bar{J}_{uu}^{-1} \bar{J}_{xu}^t) \delta x +$$
$$(\bar{J}_x^t - \bar{J}_u^t \bar{J}_{uu}^{-1} \bar{J}_{xu}^t) \delta x + \frac{1}{2} \delta x^t (\bar{J}_{xx} - \bar{J}_{xu} \bar{J}_{uu}^{-1} \bar{J}_{xu}^t) \delta x.$$

Equation (170) is the quadratic expected objective for the $N^{th}$ period given $\delta x$, $\delta w$ and $\epsilon$ when the feedback law equation (166) is used.

With the definitions:

$$P \doteq \bar{J}_{xx} - \bar{J}_{xu} \bar{J}_{uu}^{-1} \bar{J}_{xu}^t \quad (171)$$
$$Q^t \doteq \bar{J}_x^t - \bar{J}_u^t \bar{J}_{uu}^{-1} \bar{J}_{xu}^t$$
$$R(\epsilon) \doteq \bar{J}(t_{N-1}) + \left(\frac{\epsilon^2}{2} - \epsilon\right) \bar{J}_u^t \bar{J}_{uu}^{-1} \bar{J}_u$$
$$S^t \doteq \bar{J}_w^t - \bar{J}_u^t \bar{J}_{uu}^{-1} \bar{J}_{wu}^t$$
$$W \doteq \bar{J}_{ww} - \bar{J}_{uu} \bar{J}_{uu}^{-1} \bar{J}_{wu}^t$$
$$Y \doteq \bar{J}_{xw} - \bar{J}_{xu} \bar{J}_{uu}^{-1} \bar{J}_{wu}^t$$

Equation (170) can be rewritten, $$\hat{J}'(\delta x, \delta w, \epsilon, t_{N-1}) = \quad (172)$$
$$R(\epsilon) + Q^t \delta x + S^t \delta w + \frac{1}{2} \delta x^t P \delta x + \frac{1}{2} \delta w^t W \delta w + \delta x^t Y \delta w.$$

For the period N−1, $t \in (t_{N-2}, t_{N-1})$, J' can be defined to be:

$$J'(x(t), u_{N-1}, w, \epsilon, t) \doteq \int_t^{t_{N-1}} F(x(\tau), f_{N-1}(u_{N-1}, \tau), w, \tau) d\tau + G(x(t_{N-1}), u_{N-1}, w, t_{N-1}, N-1) + \hat{J}'(\delta x(t_{N-1}), \delta w, \epsilon, t_{N-1}). \quad (173)$$

Equation (173) is an approximation for the objective for time $t \in (t_{N-2}, t_{N-1})$ to $t_N$. Arbitrary $\delta w$, $\epsilon$ and $u_{N-1}$ can be used in Equation (173). Equation (173) assumes that $u_{N-1}$ is used until $t_{N-1}$ and then the feedback law equation (167) is used for time $t_{N-1}$ to $t_N$. Note that the objective indicated by Equation (173) is exact over $(t_{N-2}, t_{N-1})$ but is only approximated by the quadratic expansion $\hat{J}$ about the nominal policy for time $t_{N-1}$ to $t_N$. The form of Equation (173) is identical to Equation (85) replacing G with G+$\hat{J}$ and replacing $u_N$ by $u_{N-1}$, hence the same development used to obtain the quadratic expansion equation (131) can be repeated. Unlike Equation (85), there is now a dependence on $\epsilon$ occurring in the last term of Equation (173). At this stage, arbitrary $u_{N-1}$ can be considered. i.e. $u_{N-1}$ is not limited to the feedback law equation (167) and hence is not dependent on $\epsilon$. Once the quadratic expansion of Equation (173) about $\bar{u}_{N-1}$, $\bar{x}(t_{N-2})$, and $\bar{w}$ is calculated, then the feedback law equation (167) can be used to find the expected quadratic change of the objective from time $t_{N-2}$ to time $t_N$ as a function of $\epsilon$ and $\delta w$.

Thus if the equation system (110)–(119) is integrated subject to the conditions at time $t_{N-1}$:

$$J(x(t_{N-1}), u_{N-1}, w, t_{N-1}) = G(x(t_{N-1}), u_{N-1}, w, t_{N-1}, N-1) + R(\epsilon)$$

$$J_x(x(t_{N-1}), u_{N-1}, w, t_{N-1}) = G_x(x(t_{N-1}), u_{N-1}, w, t_{N-1}) + Q$$

$$J_u(x(t_{N-1}), u_{N-1}, w, t_{N-1}) = G_u(x(t_{N-1}), u_{N-1}, w, t_{N-1})$$

$$J_w(x(t_{N-1}), u_{N-1}, w, t_{N-1}) = G_w(x(t_{N-1}), u_{N-1}, w, t_{N-1}) + S$$

$$J_{xx}(x(t_{N-1}), u_{N-1}, w, t_{N-1}) = G_{xx}(x(t_{N-1}), u_{N-1}, w, t_{N-1}) + P$$

$$J_{xu}(x(t_{N-1}), u_{N-1}, w, t_{N-1}) = G_{xu}(x(t_{N-1}), u_{N-1}, w, t_{N-1})$$

$$J_{xw}(x(t_{N-1}), u_{N-1}, w, t_{N-1}) = G_{xw}(x(t_{N-1}), u_{N-1}, w, t_{N-1}) + Y$$

$$J_{uu}(x(t_{N-1}), u_{N-1}, w, t_{N-1}) = G_{uu}(x(t_{N-1}), u_{N-1}, w, t_{N-1})$$

$$J_{wu}(x(t_{N-1}), u_{N-1}, w, t_{N-1}) = G_{wu}(x(t_{N-1}), u_{N-1}, w, t_{N-1})$$

$$J_{ww}(x(t_{N-1}), u_{N-1}, w, t_{N-1}) = G_{ww}(x(t_{N-1}), u_{N-1}, w, t_{N-1}) + W$$

then, the desired quadratic expansion can be obtained.

The next step is to perform the necessary integration to obtain J'($\bar{x}(t_{N-2})$, $\bar{w}$, $\bar{u}_{N-1}$, $\epsilon$, $t_{N-2}$) and it's derivatives with respect to $x(t_{N-2})$, w, and $u_{N-1}$ where the derivatives are evaluated at $\bar{x}(t_{N-2})$, $\bar{w}$, and $\bar{u}_{N-1}$. The integration of J' depends on $\epsilon$ through R($\epsilon$). The integrations to obtain the derivatives of J' do not depend on $\epsilon$. Substitution of $u_{N-1} = \bar{u}_{N-1}$, $x(t) = \bar{x}(t)$, and $w = \bar{w}$ into Equation (173) yields:

$$J'(\epsilon, t) = \int_t^{t_{N-1}} F(\bar{x}(\tau), f_{N-1}(\bar{u}_{N-1}, \tau), \bar{w}, \tau) d\tau + G(\bar{x}(t_{N-1}), \bar{u}_{N-1}, \bar{w}, t_{N-1}, N-1) + R(\epsilon). \quad (175)$$

Note that $\hat{J}$ in Equation (172) is just R($\epsilon$) when $u_{N-1} = \bar{u}_{N-1}$, $x(t) = \bar{x}(t)$, and $w = \bar{w}$. Equation (175) can be rewritten as follows using the definition of the useful objective and R($\epsilon$):

$$J'(\epsilon, t) = \int_t^{t_{N-1}} \overline{F} dt' + \overline{G} + R(\epsilon) \qquad (176)$$

$$= \int_t^{t_{N-1}} \overline{F} dt' + \overline{G} + \overline{J}(t_{N-1}) + \left(\frac{\epsilon^2}{2} - \epsilon\right) \overline{J}_u^t(t_{N-1}) \overline{J}_{uu}^{-1}(t_{N-1}) \overline{J}_u(t_{N-1})$$

$$= \overline{J}(t) + \left(\frac{\epsilon^2}{2} - \epsilon\right) \overline{J}_u^t(t_{N-1}) \overline{J}_{uu}^{-1}(t_{N-1}) \overline{J}_u(t_{N-1})$$

where $$\overline{F}(t') \doteq F(\overline{x}(t'), f_{N-1}(\overline{u}_{N-1}, t'), \overline{w}, t')$$

and $$\overline{G} \doteq G(\overline{x}(t_{N-1}), \overline{u}_{N-1}, \overline{w}, t_{N-1}, N-1).$$

Thus the quadratic expansion of J'($\epsilon$, $t_{N-2}$) about the nominal state and control is $$\hat{J}' = \overline{J}(t_{N-2}) + \left(\frac{\epsilon^2}{2} - \epsilon\right) \overline{J}_u^t(t_{N-1}) \overline{J}_{uu}^{-1}(t_{N-1}) \overline{J}_u(t_{N-1}) \overline{J}_x^t(t_{N-2}) \delta x + \qquad (177)$$

$$\overline{J}_u^t(t_{N-2}) \delta u_{N-1} + \overline{J}_w^t(t_{N-2}) \delta w + \frac{1}{2} \delta x^t \overline{J}_{xx}(t_{N-2}) \delta x +$$

$$\delta x^t \overline{J}_{xu}(t_{N-2}) \delta u_{N-1} + \delta w^t \overline{J}_{wu}(t_{N-2}) \delta u_{N-1} +$$

$$\frac{1}{2} \delta u_{N-1}^t \overline{J}_{uu}(t_{N-2}) \delta u_{N-1} + \frac{1}{2} \delta w^t \overline{J}_{ww}(t_{N-2}) \delta w + \delta x^t \overline{J}_{xw}(t_{N-2}) \delta w.$$

Substituting the feedback law equation (167) with i=N−1 into Equation (177) and collecting terms using the definitions of $\alpha_{N-1}$, $\beta_{N-1}$, and $\gamma t_{N-1}$ yields (analogous to Equation (170)):

$$\hat{J}'(\delta x, \delta w, \epsilon, t_{N-2}) = \qquad (178)$$

$$\overline{J}(t_{N-2}) + \left(\frac{\epsilon^2}{2} - \epsilon\right) \sum_{i=N-2}^{N-1} \overline{J}_u^t(t_i) \overline{J}_{uu}^{-1}(t_i) \overline{J}_u(t_i) + \left(\overline{J}_w^t - \overline{J}_u^t \overline{J}_{uu}^{-1} \overline{J}_{wu}^t\right) \delta w +$$

$$\frac{1}{2} \delta w^t \left(\overline{J}_{ww} - \overline{J}_{wu} \overline{J}_{uu}^{-1} \overline{J}_{uw}\right) \delta w + \delta w^t \left(\overline{J}_w^t - \overline{J}_{wu} \overline{J}_{uu}^{-1} \overline{J}_{xu}^t\right) \delta x +$$

$$\left(\overline{J}_w^t - \overline{J}_u^t \overline{J}_{uu}^{-1} \overline{J}_{xu}^t\right) \delta x + \frac{1}{2} \delta x^t \left(\overline{J}_{xx} - \overline{J}_{xu} \overline{J}_{uu}^{-1} \overline{J}_{xu}^t\right) \delta x,$$

where $\overline{J}$ and it's derivatives with out a time argument are assumed to have a time argument of $t=t_{N-2}$. Equation (178) is the quadratic expected objective value for an arbitrary $\epsilon$, $\delta x(t_{N-2})$, and $\delta w$ when the feedback law equation (166) is used for periods N and N−1.

A procedure analogous to the procedure outlined above for period N−1 can be used for all remaining periods in the order N−2, N−3, . . . , 1. In particular, the analogous expression for Equation (177) can be written for $t=t_0$:

$$\hat{J}'(\delta x, \delta u_1, \delta w, \epsilon, t_0) = \qquad (179)$$

$$\overline{J}(t_0) + \left(\frac{\epsilon^2}{2} - \epsilon\right) \sum_{i=1}^{N-1} \overline{J}_u^t(t_i) \overline{J}_{uu}^{-1}(t_i) \overline{J}_u(t_i) + \overline{J}_x^t(t_0) \delta x + \overline{J}_u^t(t_0) \delta u_1 +$$

$$\overline{J}_w^t(t_0) \delta w + \frac{1}{2} \delta x^t \overline{J}_{xx}(t_0) \delta x + \delta x^t \overline{J}_{xu}(t_0) \delta u_1 + \delta w^t \overline{J}_{wu}(t_0) \delta u_1 +$$

$$\frac{1}{2} \delta u_1^t \overline{J}_{uu}(t_0) \delta u_1 + \frac{1}{2} \delta w^t \overline{J}_{ww}(t_0) \delta w + \delta x^t \overline{J}_{xw}(t_0) \delta w.$$

The dependence of Equation (179) on $\delta x$ at $t=t_0$ can be eliminated using Equation (154) and the definition equations (157):

$$\hat{J}'(\delta u_1, \delta w, \epsilon, t_0) = \qquad (180)$$

$$\overline{J}(t_0) + \left(\frac{\epsilon^2}{2} - \epsilon\right) \sum_{i=1}^{N-1} \overline{J}_u^t(t_i) \overline{J}_{uu}^{-1}(t_i) \overline{J}_u(t_i) + \overline{J}_u^t(t_0) \delta u_1 + \tilde{\overline{J}}_w^t(t_0) \delta w +$$

$$\delta w^t \tilde{\overline{J}}_{wu}(t_0) \delta u_1 + \frac{1}{2} \delta u_1^t \overline{J}_{uu}(t_0) \delta u_1 + \frac{1}{2} \delta w^t \tilde{\overline{J}}_{ww}(t_0) \delta w.$$

The dependences of Equation (180) on both $\delta u_1$ and $\delta w$ can be removed by using the update equations (164) and (165). If $\delta u_1 = \epsilon \alpha_1$ is substituted into Equation (180) where, $$\alpha_1 =$$

$$\left(\overline{J}_{uu}(t_0) - \tilde{\overline{J}}_{uw}(t_0) \tilde{\overline{J}}_{ww}^{-1}(t_0) \tilde{\overline{J}}_{uw}^t(t_0)\right)^{-1} \left(\tilde{\overline{J}}_{uw}(t_0) \tilde{\overline{J}}_{ww}^{-1}(t_0) \tilde{\overline{J}}_w(t_0) - \overline{J}_u(t_0)\right),$$

and $\delta w$ is replaced with $$\delta w = -\epsilon \tilde{\overline{J}}_{ww}^{-1}(t_0) \left(\tilde{\overline{J}}_w(t_0) - \tilde{\overline{J}}_{uw}^t(t_0) \alpha_1\right),$$

the result after collecting like terms is:

$$\hat{J}'(\epsilon, t_0) = \overline{J}(t_0) + \left(\frac{\epsilon^2}{2} - \epsilon\right) \tilde{\overline{J}}_w^t \tilde{\overline{J}}_{ww}^{-1} \tilde{\overline{J}}_w + \qquad (181)$$

$$\left(\frac{\epsilon^2}{2} - \epsilon\right) \sum_{i=1}^{N-1} \overline{J}_u^t(t_i) \overline{J}_{uu}^{-1}(t_i) \overline{J}_u(t_i) + \left(\frac{\epsilon^2}{2} - \epsilon\right) \left(\tilde{\overline{J}}_w^t \tilde{\overline{J}}_{ww}^{-1} \tilde{\overline{J}}_{wu} - \overline{J}_u^t(t_0)\right) \alpha_1.$$

Equation (181) is the expected quadratic objective value for feedback law equation (167) with arbitrary epsilon. The actual objective value obtained during the integration of the state and the useful objective function J can be compared with Equation (181) for convergence information. The expected quadratic change is computed by the SDC algorithm and stored in the program variable ΔR. This completes the theoretical basis of the SDC Algorithm.

Although the description contains many specificities, these should not be construed as limiting the scope of the invention, but merely providing illustrations of some of the presently preferred embodiments of this invention. The present invention can be used with minor modifications well known in art, such as Quasi Newton approximations, Hessian shifting, SALQR approximation, adaptive integration, implicit-time integration. Trust region methods, iterative equation solvers, bang-bang optimization, non-convex objective functions, sparse operations, and multi-grid methods. The present invention can also be extended to a fully continuous formulation (i.e. without the dynamic limitation equation in the formulation equations (1)–(31), see Appendix B.)

APPENDIX A

Variable and Function Definitions

| Symbol | Dimensions | Definition |
|---|---|---|
| $\alpha_i$ | vector $\in \Re^m$ | feedback law coefficient for period i |
| $\beta_i$ | matrix $\in \Re^{m \times n}$ | feedback law coefficient for period i |
| $C_0(t)$ | scaler function | defined by (244) |
| $C_1(t)$ | vector function $\in \Re^n$ | defined by (245) |
| $C_2(t)$ | vector function $\in \Re^{m'}$ | defined by (246) |
| $C_3(t)$ | vector function $\in \Re^1$ | defined by (247) |
| $C_4(t)$ | matrix function $\in \Re^{n \times n}$ | defined by (248) |
| $C_5(t)$ | matrix function $\in \Re^{m' \times m'}$ | defined by (249) |
| $C_6(t)$ | matrix function $\in \Re^{1 \times 1}$ | defined by (250) |
| $C_7(t)$ | matrix function $\in \Re^{n \times m'}$ | defined by (251) |
| $C_8(t)$ | matrix function $\in \Re^{n \times 1}$ | defined by (252) |
| $C_9(t)$ | matrix function $\in \Re^{1 \times m'}$ | defined by (253) |
| $c_d$ | real scaler > 0 | penalty function weight |
| $c_l$ | real scaler > 0 | penalty function weight |
| $\Delta R$ | scaler | expected quadratic change |
| $\delta x$ | vector $\in \Re^n$ | difference between current state and the nominal state: $\delta x = x - \bar{x}$ |
| $\hat{\delta}x$ | vector $\in \Re^n$ | quadratic expansion of the state function $\Gamma$. See (273) |
| $\delta w$ | vector $\in \Re^1$ | difference between current and nominal static parameter vectors $\delta w = w - \bar{w}$ |
| $\delta u_i$ | vector $\in \Re^m$ | difference between current and nominal dynamic parameter vectors: $\delta u_i = u_i - \bar{u}_i$ |
| $\delta w^*$ | vector $\in \Re^1$ | difference between optimal and nominal static parameter vectors $\delta w^* = w^* - \bar{w}$ |
| $\delta u^*_i$ | vector $\in \Re^m$ | difference between optimal and nominal dynamic parameter vectors: $\delta u^*_i = u^*_i - \bar{u}_i$ |
| $\epsilon$ | real scaler $\in (0, 1)$ | feedback law damping factor |
| $F(x, v, w, t)$ | scaler function | integrand of the objective function J |
| $\bar{F}(t)$ | scaler function | function F evaluated using the nominal state and control = $F(\bar{x}(t), \bar{v}(t), \bar{w}, t)$ |
| $F_x(x, u, w, t)$ | vector function $\in \Re^n$ | gradient of F w.r.t. x: $\frac{\partial F}{\partial x}$ |
| $\bar{F}_x(t)$ | vector function $\in \Re^n$ | defined to be $F_x(\bar{x}(t), \bar{v}(t), \bar{w}, t)$ |
| $F_u(x, u, w, t)$ | vector function $\in \Re^m$ | gradient of F w.r.t. u: $\frac{\partial F}{\partial u}$ |
| $\bar{F}_v(t)$ | vector function $\in \Re^{m'}$ | defined to be $F_v(\bar{x}(t), \bar{v}(t), \bar{w}, t)$ |
| $F_w(x, u, w, t)$ | vector function $\in \Re^1$ | gradient of F w.r.t. w: $\frac{\partial F}{\partial w}$ |
| $\bar{F}_w(t)$ | vector function $\in \Re^1$ | defined to be $F_w(\bar{x}(t), \bar{v}(t), \bar{w}, t)$ |
| $F_{xx}(x, u, w, t)$ | matrix function $\in \Re^{n \times n}$ | Hessian of F w.r.t. x: $\frac{\partial^2 F}{\partial x^2}$ |
| $\bar{F}_{xx}(t)$ | matrix function $\in \Re^{n \times n}$ | defined to be $F_{xx}(\bar{x}(t), \bar{v}(t), \bar{w}, t)$ |
| $F_{uu}(x, u, w, t)$ | matrix function $\in \Re^{m \times m}$ | Hessian of F w.r.t. u: $\frac{\partial^2 F}{\partial u^2}$ |
| $\bar{F}_{vv}(t)$ | matrix function $\in \Re^{m' \times m'}$ | Hessian of F: $\frac{\partial^2 F}{\partial v^2}$ $(\bar{x}(t), \bar{v}(t), \bar{w}, t)$ |

APPENDIX A-continued

Variable and Function Definitions

| Symbol | Dimensions | Definition |
|---|---|---|
| $F_{ww}(x, u, w, t)$ | matrix function $\in \Re^{l \times l}$ | Hessian of F w.r.t. w: $\dfrac{\partial^2 F}{\partial w^2}$ |
| $\bar{F}_{ww}(t)$ | matrix function $\in \Re^{l \times l}$ | defined to be $F_{ww}(\bar{x}(t), \bar{v}(t), \bar{w}, t)$ |
| $F_{xu}(x, u, w, t)$ | matrix function $\in \Re^{n \times m}$ | derivative of F w.r.t. x, u: $\dfrac{\partial^2 F}{\partial x \partial u}$ |
| $\bar{F}_{xv}(t)$ | matrix function $\in \Re^{n \times m'}$ | defined to be $F_{xv}(\bar{x}(t), \bar{v}(t), \bar{w}, t)$ |
| $F_{wu}(x, u, w, t)$ | matrix function $\in \Re^{l \times m}$ | derivative of F w.r.t. w, u: $\dfrac{\partial^2 F}{\partial w \partial u}$ |
| $\bar{F}_{wv}(t)$ | matrix function $\in \Re^{l \times m'}$ | defined to be $F_{wv}(\bar{x}(t), \bar{v}(t), \bar{w}, t)$ |
| $F_{xw}(x, u, w, t)$ | matrix function $\in \Re^{n \times l}$ | derivative of F w.r.t. x, w: $\dfrac{\partial^2 F}{\partial x \partial w}$ |
| $\bar{F}_{xw}(t)$ | matrix function $\in \Re^{n \times l}$ | defined to be $F_{xw}(\bar{x}(t), \bar{v}(t), \bar{w}, t)$ |
| $\tilde{F}(\tilde{x}, \tilde{v}, \tilde{w}, \tau)$ | scaler function | objective in normalized time units |
| $f(u_i, w, t, i)$ | vector function $\in \Re^{m'}$ | parametric period function |
| $\tilde{f}(\tilde{x}, \tilde{v}, \tilde{w}, \tau)$ | vector function $\in \Re^{m'}$ | function f in normalized time units |
| $\Gamma(w)$ | vector function $\in \Re^n$ | state vector value at $t = t_0$ |
| $\Gamma_w(w)$ | matrix function $\in \Re^{n \times l}$ | derivative of $\Gamma$: $\dfrac{\partial \Gamma}{\partial w}$ |
| $\Gamma_{ww}(w)$ | rank 3 function $\in \Re^{n \times l \times l}$ | derivative of $\Gamma$: $\dfrac{\partial \Gamma}{\partial w^2}$ |
| $\bar{\Gamma}$ | vector $\in \Re^n$ | state vector value at $t = t_0$ when $w = \bar{w}$ |
| $\bar{\Gamma}_w$ | matrix $\in \Re^{n \times l}$ | derivative $\Gamma_w$ evaluated at $\bar{w}$ |
| $\bar{\Gamma}_{ww}$ | rank 3 $\in \Re^{n \times l \times l}$ | derivative $\Gamma_{ww}$ evaluated at $\bar{w}$ |
| $\tilde{\Gamma}(\tilde{w})$ | vector function $\in \Re^n$ | function $\Gamma$ in normalized time units |
| $\gamma_i$ | matrix $\in \Re^{m \times l}$ | feedback law coefficient for period i |
| $G(x, u, w, t)$ | scaler function | Time specific part of the objective J. |
| $\bar{G}$ | scaler | defined $G(\bar{x}(t_{N-1}), \bar{u}_{N-1}, \bar{w}, t_{N-1}, N-1)$ |
| $G_x(x, u, w, t)$ | vector function $\in \Re^n$ | gradient of G w.r.t. x: $\dfrac{\partial G}{\partial x}$ |
| $G_u(x, u, w, t)$ | vector function $\in \Re^m$ | gradient of G w.r.t. u: $\dfrac{\partial G}{\partial u}$ |
| $G_w(x, u, w, t)$ | vector function $\in \Re^l$ | gradient of G w.r.t. w: $\dfrac{\partial G}{\partial w}$ |
| $G_{xx}(x, u, w, t)$ | matrix function $\in \Re^{n \times n}$ | Hessian of G w.r.t. x: $\dfrac{\partial^2 G}{\partial x^2}$ |
| $G_{uu}(x, u, w, t)$ | matrix function $\in \Re^{m \times m}$ | Hessian of G w.r.t. u: $\dfrac{\partial^2 G}{\partial u^2}$ |

APPENDIX A-continued

Variable and Function Definitions

| Symbol | Dimensions | Definition |
|---|---|---|
| $G_{xx}(x, u, w, t)$ | matrix function $\in \Re^{1\times 1}$ | Hessian of G w.r.t. w: $\dfrac{\partial^2 G}{\partial w^2}$ |
| $G_{xu}(x, u, w, t)$ | matrix function $\in \Re^{n\times m}$ | derivative of G w.r.t. x, u: $\dfrac{\partial^2 G}{\partial x \partial u}$ |
| $G_{wu}(x, u, w, t)$ | matrix function $\in \Re^{1\times m}$ | derivative of G w.r.t. w, u: $\dfrac{\partial^2 g}{\partial w \partial u}$ |
| $G_{xw}(x, u, w, t)$ | matrix function $\in \Re^{n\times 1}$ | derivative of G w.r.t. x, w: $\dfrac{\partial^2 G}{\partial x \partial w}$ |
| $\tilde{G}(\tilde{x}, \tilde{v}, \tilde{w}, \tau)$ | scaler function | objective in normalized time units |
| g | scaler constant | acceleration of gravity at sea level |
| H.O.T. | various | abbreviation for "Higher Order Terms" |
| $I_{sp}$ | scaler | specific impulse |
| i | integer scaler | counting integer or variable subscript |
| $J(u, w)$ | scaler function | useful objective function |
| $J(x, u, w, t)$ | scaler function | objective value accumulated from time t to time $t_N$ |
| $J(x, u, v, t)$ | scaler function | objective value accumulated from time t to time $t_f$: See (184) (fully continuous formulation) |
| $J^*(t_0)$ | scaler | the optimal value $\min_{u,w} J(x, u, w, t_0)$ |
| $J^*(x, w, t)$ | scaler function | the optimal value $\min_v J(x, v, w, t)$ |
| $J_x(x, u, w, t)$ | vector function $\in \Re^n$ | gradient of J w.r.t. x: $\dfrac{\partial J}{\partial x}$ |
| $J_u(x, u, w, t)$ | vector function $\in \Re^m$ | gradient of J w.r.t. u: $\dfrac{\partial J}{\partial u}$ |
| $J_w(x, u, w, t)$ | vector function $\in \Re^1$ | gradient of J w.r.t. w: $\dfrac{\partial J}{\partial w}$ |
| $J_{xx}(x, u, w, t)$ | matrix function $\in \Re^{n\times n}$ | Hessian of J w.r.t. x: $\dfrac{\partial^2 J}{\partial x^2}$ |
| $J_{uu}(x, u, w, t)$ | matrix function $\in \Re^{m\times m}$ | Hessian of J w.r.t. u: $\dfrac{\partial^2 J}{\partial u^2}$ |
| $J_{xx}(x, u, w, t)$ | matrix function $\in \Re^{1\times 1}$ | Hessian of J w.r.t. w: $\dfrac{\partial^2 J}{\partial w^2}$ |
| $J_{xu}(x, u, w, t)$ | matrix function $\in \Re^{n\times m}$ | derivative of J w.r.t. x, u: $\dfrac{\partial^2 J}{\partial x \partial u}$ |
| $J_{wu}(x, u, w, t)$ | matrix function $\in \Re^{1\times m}$ | derivative of J w.r.t. w, u: $\dfrac{\partial^2 J}{\partial w \partial u}$ |
| $J_{xw}(x, u, w, t)$ | matrix function $\in \Re^{n\times 1}$ | derivative of J w.r.t. x, w: $\dfrac{\partial^2 J}{\partial x \partial w}$ |

APPENDIX A-continued

Variable and Function Definitions

| Symbol | Dimensions | Definition |
|---|---|---|
| $J_{tx}(x, u, w, t)$ | vector function $\in \mathfrak{R}^n$ | partial derivative of $J_x$ w.r.t time: $\dfrac{\partial J_x}{\partial t}$ |
| $J_{tu}(x, u, w, t)$ | vector function $\in \mathfrak{R}^m$ | partial derivative of $J_u$ w.r.t time: $\dfrac{\partial J_u}{\partial t}$ |
| $J_{tw}(x, u, w, t)$ | vector function $\in \mathfrak{R}^l$ | partial derivative of $J_w$ w.r.t time: $\dfrac{\partial J_w}{\partial t}$ |
| $J_{xxx}(x, u, w, t)$ | rank 3 function $\in \mathfrak{R}^{n \times n \times n}$ | 3$^{rd}$ deriv. of J w.r.t. x: $\dfrac{\partial^3 J}{\partial x^3}$ |
| $J_{xux}(x, u, w, t)$ | rank 3 function $\in \mathfrak{R}^{n \times m \times n}$ | 3$^{rd}$ deriv. of J w.r.t. x, u, x: $\dfrac{\partial^3 J}{\partial x \partial u \partial x}$ |
| $J_{xwx}(x, u, w, t)$ | rank 3 function $\in \mathfrak{R}^{n \times l \times n}$ | 3$^{rd}$ deriv. of J w.r.t. x, w, x: $\dfrac{\partial^3 J}{\partial x \partial w \partial x}$ |
| $J_{uux}(x, u, w, t)$ | rank 3 function $\in \mathfrak{R}^{m \times m \times n}$ | 3$^{rd}$ deriv. of J w.r.t. u, u, x: $\dfrac{\partial^3 J}{\partial u \partial u \partial x}$ |
| $J_{wux}(x, u, w, t)$ | rank 3 function $\in \mathfrak{R}^{l \times m \times n}$ | 3$^{rd}$ deriv. of J w.r.t. w, u, x: $\dfrac{\partial^3 J}{\partial w \partial u \partial x}$ |
| $J_{wwx}(x, u, w, t)$ | rank 3 function $\in \mathfrak{R}^{l \times l \times n}$ | 3$^{rd}$ deriv. of J w.r.t. w, w, x: $\dfrac{\partial^3 J}{\partial w \partial w \partial x}$ |
| $J_{txx}(x, u, w, t)$ | matrix function $\in \mathfrak{R}^{n \times n}$ | partial deriv. of $J_{xx}$ w.r.t time: $\dfrac{\partial J_{xx}}{\partial t}$ |
| $J_{txu}(x, u, w, t)$ | matrix function $\in \mathfrak{R}^{n \times m}$ | partial deriv. of $J_{xu}$ w.r.t time: $\dfrac{\partial J_{xu}}{\partial t}$ |
| $J_{txw}(x, u, w, t)$ | matrix function $\in \mathfrak{R}^{n \times l}$ | partial deriv. of $J_{xw}$ w.r.t time: $\dfrac{\partial J_{xw}}{\partial t}$ |
| $J_{tuu}(x, u, w, t)$ | matrix function $\in \mathfrak{R}^{m \times m}$ | partial deriv. of $J_{uu}$ w.r.t time: $\dfrac{\partial J_{uu}}{\partial t}$ |
| $J_{twu}(x, u, w, t)$ | matrix function $\in \mathfrak{R}^{l \times m}$ | partial deriv. of $J_{wu}$ w.r.t time: $\dfrac{\partial J_{wu}}{\partial t}$ |
| $J_{tww}(x, u, w, t)$ | matrix function $\in \mathfrak{R}^{l \times l}$ | partial deriv. of $J_{ww}$ w.r.t time: $\dfrac{\partial J_{ww}}{\partial t}$ |
| $\dot{J}(x, u, w, t)$ | scaler function | total deriv. of J w.r.t. to time: $\dfrac{dJ}{dt}$ |

APPENDIX A-continued

Variable and Function Definitions

| Symbol | Dimensions | Definition |
|---|---|---|
| $\dot{J}_x(x, u, w, t)$ | vector function $\in \Re^n$ | total deriv. of $J_x$ w.r.t. to time: $\dfrac{dJ_x}{dt}$ |
| $\dot{J}_u(x, u, w, t)$ | vector function $\in \Re^m$ | total deriv. of $J_u$ w.r.t. to time: $\dfrac{dJ_u}{dt}$ |
| $\dot{J}_w(x, u, w, t)$ | vector function $\in \Re^l$ | total deriv. of $J_w$ w.r.t. to time: $\dfrac{dJ_w}{dt}$ |
| $\dot{J}_{xx}(x, u, w, t)$ | matrix function $\in \Re^{n \times n}$ | total deriv. of $J_{xx}$ w.r.t. to time: $\dfrac{dJ_{xx}}{dt}$ |
| $\dot{J}_{uu}(x, u, w, t)$ | matrix function $\in \Re^{m \times m}$ | total deriv. of $J_{uu}$ w.r.t. to time: $\dfrac{dJ_{uu}}{dt}$ |
| $\dot{J}_{ww}(x, u, w, t)$ | matrix function $\in \Re^{l \times l}$ | total deriv. of $J_{ww}$ w.r.t. to time: $\dfrac{dJ_{ww}}{dt}$ |
| $\dot{J}_{xu}(x, u, w, t)$ | matrix function $\in \Re^{n \times m}$ | total derivative of $J_{xu}$ w.r.t. to time: $\dfrac{dJ_{xu}}{dt}$ |
| $\dot{J}_{wu}(x, u, w, t)$ | matrix function $\in \Re^{l \times m}$ | total derivative of $J_{wu}$ w.r.t. to time: $\dfrac{dJ_{wu}}{dt}$ |
| $\dot{J}_{xw}(x, u, w, t)$ | matrix function $\in \Re^{n \times l}$ | total derivative of $J_{xw}$ w.r.t. to time: $\dfrac{dJ_{xw}}{dt}$ |
| $\bar{J}(t)$ | scaler function | defined as $J(\bar{x}(t), \bar{u}, \bar{w}, t)$ |
| $\bar{J}_x(t)$ | vector function $\in \Re^n$ | defined as $J_x(\bar{x}(t), \bar{u}, \bar{w}, t)$ |
| $\bar{J}_u(t)$ | vector function $\in \Re^m$ | defined as $J_u(\bar{x}(t), \bar{u}, \bar{w}, t)$ |
| $\bar{J}_w(t)$ | vector function $\in \Re^l$ | defined as $J_w(\bar{x}(t), \bar{u}, \bar{w}, t)$ |
| $\bar{J}_{xx}(t)$ | matrix function $\in \Re^{n \times n}$ | defined as $J_{xx}(\bar{x}(t), \bar{u}, \bar{w}, t)$ |
| $\bar{J}_{uu}(t)$ | matrix function $\in \Re^{m \times m}$ | defined as $J_{uu}(\bar{x}(t), \bar{u}, \bar{w}, t)$ |
| $\bar{J}_{ww}(t)$ | matrix function $\in \Re^{l \times l}$ | defined as $J_{ww}(\bar{x}(t), \bar{u}, \bar{w}, t)$ |
| $\bar{J}_{xu}(t)$ | matrix function $\in \Re^{n \times m}$ | defined as $J_{xu}(\bar{x}(t), \bar{u}, \bar{w}, t)$ |
| $\bar{J}_{xw}(t)$ | matrix function $\in \Re^{n \times l}$ | defined as $J_{xw}(\bar{x}(t), \bar{u}, \bar{w}, t)$ |
| $\bar{J}_{wu}(t)$ | matrix function $\in \Re^{l \times m}$ | defined as $J_{wu}(\bar{x}(t), \bar{u}, \bar{w}, t)$ |
| $\bar{J}^*(t)$ | scaler function | defined as $J^*(x, w, t)$. See $J^*(\bar{x}, \bar{w}, t)$. |
| $\bar{J}^*_x(t)$ | vector function $\in \Re^n$ | defined as $J^*_x(\bar{x}(t), \bar{u}, \bar{w}, t)$ |
| $\bar{J}^*_{xx}(t)$ | matrix function $\in \Re^{n \times n}$ | defined as $J^*_{xx}(\bar{x}(t), \bar{u}, \bar{w}, t)$ |
| $\bar{J}^*_{xw}(t)$ | matrix function $\in \Re^{n \times l}$ | defined as $J^*_{xw}(\bar{x}(t), \bar{u}, \bar{w}, t)$ |
| $\bar{J}^*_{xww}(t)$ | rank 3 function $\in \Re^{n \times l \times l}$ | defined as $J^*_{xww}(\bar{x}(t), \bar{u}, \bar{w}, t)$ |
| $\bar{J}^*_{xxx}(t)$ | rank 3 function $\in \Re^{n \times n \times n}$ | defined as $J^*_{xww}(\bar{x}(t), \bar{u}, \bar{w}, t)$ |
| $\bar{J}^*_{xxw}(t)$ | rank 3 function $\in \Re^{n \times n \times l}$ | defined as $J^*_{xxw}(\bar{x}(t), \bar{u}, \bar{w}, t)$ |
| $\bar{J}^*_t(t)$ | scaler function | defined as $\dfrac{\partial J^*(t)}{\partial t}$ |
| $\bar{J}^*_{tx}(t)$ | vector function $\in \Re^n$ | defined as $\dfrac{\partial J^*_x(t)}{\partial t}$ |
| $\bar{J}^*_{tw}(t)$ | vector function $\in \Re^l$ | defined as $\dfrac{\partial \bar{J}^*_w(t)}{\partial t}$ |

APPENDIX A-continued

Variable and Function Definitions

| Symbol | Dimensions | Definition |
|---|---|---|
| $\bar{J}^*_{txx}(t)$ | matrix function $\in \Re^{n \times n}$ | defined as $\dfrac{\partial J^*_{xx}(t)}{\partial t}$ |
| $\bar{J}^*_{tww}(t)$ | matrix function $\in \Re^{l \times l}$ | defined as $\dfrac{\partial J^*_{ww}(t)}{\partial t}$ |
| $\bar{J}^*_{txw}(t)$ | matrix function $\in \Re^{n \times l}$ | defined as $\dfrac{\partial J^*_{xw}(t)}{\partial t}$ |
| $\dot{J}^*(t)$ | scaler function | defined as $\dfrac{dJ^*(t)}{dt}$ |
| $\dot{J}^*_x(t)$ | vector function $\in \Re^n$ | defined as $\dfrac{dJ^*_x(t)}{dt}$ |
| $\dot{J}^*_w(t)$ | vector function $\in \Re^l$ | defined as $\dfrac{dJ^*_w(t)}{dt}$ |
| $\dot{J}^*_{xx}(t)$ | vector function $\in \Re^{n \times n}$ | defined as $\dfrac{dJ^*_{xx}(t)}{dt}$ |
| $\dot{J}^*_{ww}(t)$ | vector function $\in \Re^{l \times l}$ | defined as $\dfrac{dJ^*_{ww}(t)}{dt}$ |
| $\dot{J}^*_{xw}(t)$ | vector function $\in \Re^{n \times l}$ | defined as $\dfrac{dJ^*_{xw}(t)}{dt}$ |
| $\hat{J}(\delta x, \delta u_i, \delta w)$ | scaler function | quadratic part of $J(x, u, w, t)$ expanded about $\bar{x}$, $\bar{u}_i$, and $\bar{w}$ at time t. See (131). |
| $\hat{J}^*(\delta x, \delta w)$ | scaler function | optimal value of J given $\delta x$ and $\delta w$ i.e. $\min_{\delta u_i} \hat{J}(\delta x, \delta u_i, \delta w)$ |
| $\tilde{J}_w$ | vector $\in \Re^l$ | $\bar{J}_w(t_0)$ after $\delta x$ is eliminated. See (157) |
| $\tilde{J}_{ww}$ | matrix $\in \Re^{l \times l}$ | $\bar{J}_{ww}(t_0)$ after $\delta x$ is eliminated. See (157) |
| $\tilde{J}_{wu}$ | matrix $\in \Re^{l \times m}$ | $\bar{J}_{wu}(t_0)$ after $\delta x$ is eliminated. See (157) |
| $\tilde{J}^*_w$ | vector $\in \Re^l$ | $\bar{J}^*_w(t_0)$ after $\delta x(t_0)$ is eliminated. See (275) |
| $\tilde{J}^*_{ww}$ | matrix $\in \Re^{l \times l}$ | $\bar{J}^*_{ww}(t_0)$ after $\delta x(t_0)$ is eliminated. See (276) |
| $J'(x, u_i, w, \epsilon, t)$ | scaler function | objective value accumulated from time t to time $t_N$ using the damped feedback law (167) for periods $i + 1, i + 2, \ldots, N$ |
| $\hat{J}'(\delta x, \delta w, \epsilon, t_i)$ | scaler function | quadratic part of $J'(x, u_i, w, t_i)$ expanded about $\bar{x}$, $\bar{u}_i$, and $\bar{w}$ at time $t_i$ after $\delta u_i$ has been eliminated using (167) |
| j | integer scaler | counting integer or variable subscript |
| $K(x, v, w, t)$ | vector function $\in \Re^\kappa$ | equality constraint function: $K = 0$. |
| $\tilde{K}(\tilde{x}, \tilde{v}, \tilde{w}, \tau)$ | vector function $\in \Re^\kappa$ | function K in normalized time units |
| k | integer scaler | counting integer or variable subscript |
| $\kappa$ | integer scaler | number of equality constraints |
| $L(x, v, w, t)$ | vector function $\in \Re^\sigma$ | inequality constraint function: $L \geq 0$. |
| $\tilde{L}(\tilde{x}, \tilde{v}, \tilde{w}, \tau)$ | vector function $\in \Re^\sigma$ | function L in normalized time units |
| l | integer scaler | dimension of static parameter vector w |
| $M(t)$ | scaler constant | mass of $i^{th}$ gravitating body |
| $M_s(t)$ | scaler function | mass of the spacecraft at time t. |
| m | integer scaler | dimension of dynamic control parameter u |
| m' | integer scaler | dimension of dynamic control v |
| N | integer scaler | number of periods |

APPENDIX A-continued

Variable and Function Definitions

| Symbol | Dimensions | Definition |
|---|---|---|
| n | integer scaler | dimension of system state x |
| nv | vector $\in \Re^{m'}$ | factors of w[2] needed to convert each component of v to normalized time units |
| nw | vector $\in \Re^l$ | factors of w[2] needed to convert each component of w to normalized time units |
| nx | vector $\in \Re^n$ | factors of w[2] needed to convert each component of x to normalized time units |
| P | matrix $\in \Re^{n \times n}$ | quadratic coefficient defined by (138) |
| Q | vector $\in \Re^n$ | quadratic coefficient defined by (138) |
| R | scaler | quadratic coefficient defined by (138) |
| R($\epsilon$) | scaler function | quadratic coefficient R resulting from using a damping factor of $\epsilon$. See (171) |
| $\Re$ | set of real numbers | used to define dimensions |
| r(t) | vector $\in \Re^3$ | separation of spacecraft and $i^{th}$ planet |
| r. | vector $\in \Re^3$ | separation of spacecraft and the Sun |
| $r_{Saturn}$(t) | vector function $\in \Re^3$ | separation of spacecraft and a target 1 a.u. beyond the orbit of Saturn |
| S | vector $\in \Re^1$ | quadratic coefficient defined by (138) |
| $\sigma$ | integer scaler | number of inequality constraints |
| T(x, u, w, t) | vector function $\in \Re^n$ | total derivative of the state x w.r.t. time |
| $T_x$(x, u, w, t) | matrix function $\in \Re^{n \times n}$ | derivative of T w.r.t. x: $\frac{\partial T}{\partial x}$ |
| $T_u$(x, u, w, t) | matrix function $\in \Re^{n \times m}$ | derivative of T w.r.t. u: $\frac{\partial T}{\partial u}$ |
| $T_w$(x, u, w, t) | matrix function $\in \Re^{n \times l}$ | derivative of T w.r.t. w: $\frac{\partial T}{\partial w}$ |
| $T_{xx}$(x, u, w, t) | rank 3 function $\in \Re^{n \times n \times n}$ | second derivative of T w.r.t. x: $\frac{\partial^2 T}{\partial x^2}$ |
| $T_{uu}$(x, u, w, t) | rank 3 function $\in \Re^{n \times m \times m}$ | second derivative of T w.r.t. u: $\frac{\partial^2 T}{\partial u^2}$ |
| $T_{ww}$(x, u, w, t) | rank 3 function $\in \Re^{n \times l \times l}$ | second derivative of T w.r.t. w: $\frac{\partial^2 T}{\partial w^2}$ |
| $T_{xu}$(x, u, w, t) | rank 3 function $\in \Re^{n \times n \times m}$ | second derivative of T w.r.t. x, u: $\frac{\partial^2 T}{\partial x \partial u}$ |
| $T_{xw}$(x, u, w, t) | rank 3 function $\in \Re^{n \times n \times l}$ | second derivative of T w.r.t. x, w: $\frac{\partial^2 T}{\partial x \partial w}$ |
| $T_{uw}$(x, u, w, t) | rank 3 function $\in \Re^{n \times l \times m}$ | second derivative of T w.r.t. w, u: $\frac{\partial^2 T}{\partial w \partial u}$ |
| $\tilde{T}(\tilde{x}, \tilde{v}, \tilde{w}, \tau)$ | vector function $\in \Re^n$ | function T in normalized time units |
| Trmax(r.) | scaler function | maximum solar electric thrust at r. |
| t | real scaler | clock time |
| t' | real scaler | dummy variable (usually time.) |
| $t_i$ | real scaler | time marking end of period i |

APPENDIX A-continued

Variable and Function Definitions

| Symbol | Dimensions | Definition |
|---|---|---|
| $t_f$ | real scaler | time marking end of trajectory (continuous case, see Appendix B.) |
| $\tau$ | real scaler | normalized time $\tau = \dfrac{t-w[1]}{w[2]}$, $0 \leq \tau \leq 1$ |
| $\tau_i$ | real scaler | normalized time at end of period i |
| $U_G$ | scaler constant | universal gravitation constant |
| $u_i$ | vector $\in \Re^m$ | dynamic parameter vector for period i |
| $\bar{u}_i$ | vector $\in \Re^m$ | $i^{th}$ nominal dynamic parameter vector |
| $v(t)$ | vector function $\in \Re^m$ | dynamic control vector |
| $\bar{v}(t)$ | vector function $\in \Re^{m'}$ | nominal dynamic control vector |
| $\tilde{v}(\tau)$ | vector function of normalized time $\in \Re^{m'}$ | dynamic control vector in normalized units as a function of normalized time |
| W | matrix $\in \Re^{1 \times 1}$ | quadratic coefficient defined by (138) |
| w | vector $\in \Re^1$ | static parameter vector |
| $\bar{w}$ | vector $\in \Re^1$ | nominal static parameter vector |
| $\tilde{w}$ | vector $\in \Re^1$ | static parameter vector in normalized time units |
| $x(t)$ | vector function $\in \Re^n$ | state vector |
| $\bar{x}(t)$ | vector function $\in \Re^n$ | nominal state obtained by integrating the state equation with $\bar{v}$ and $\bar{w}$ |
| $\dot{x}(t)$ | vector function $\in \Re^n$ | time derivative of state vector: $\dfrac{dx}{dt}$ |
| $\tilde{x}(\tau)$ | vector function of normalized time $\in \Re^n$ | state vector in normalized time units as a function of normalized time $\tau$ |
| $\xi$ | vector $\in \Re^m$ | defined to be $\xi \doteq \delta u^*_1$ |
| Y | matrix $\in \Re^{n \times 1}$ | quadratic coefficient defined by (138) |

Appendix B: The SDC Algorithm For the Fully Continuous Formulation

A fully continuous formulation of the SDC process assumes that the dynamic optimization variables are continuous functions of time. A fully continuous SDC process is best suited to problems like solar sail spacecraft, electrical engineering problems, and laser proplulsion) trajectory optimization where the mechanical control is best described as a time continuous function. A frilly continuous SDC formulation allows the dynamic control vector v(t) to vary in a non-parametric continuous fashion. The period function dynamic limitation equation (5) is not used.

Subsection 1 of Appendix B presents the theoretical basis for a fully continuous SDC algorithm. Subsection 2 of Appendix B presents the steps of a fully continuous formulation of the SDC algorithm.

1. The Theoretical Basis of the Fully Continuous SDC Algorithm

The continuous SDC algorithm is constructed as follows. Appendix A contains variable definitions. The fully continuous SDC formulation optimizes a user specified useful objective J:

$$J(v, w) = \int_{t_0}^{t_f} F(x(t), v(t), w, t)dt + G(x(t_f), v(t_f), w, t_f), \quad (182)$$

or a mathematical equivalent. Both $t_0 < t_f$ and $t_0 > t_f$ are within the scope of the SDC fully continuous formulation. J(v, w) is subject to the state equation:

$$\frac{dx(t)}{dt} = T(x(t), v(t), w, t) \quad x(t = t_0) = \Gamma(w). \quad (183)$$

The function $\Gamma(w)$ is an initial condition on x(t) if $t_0 < t_f$ and a terminal condition on x(t) if $t_0 > t_f$. The formulation (182)–(183) differs from Equations (27)–(30) because no dynamic limitation equation (30) is assumed. The dynamic control vector v(t) is riot assumed to be a parameterized function. The control parameters u and the functions $f$ do not appear in the fully continuous formulation of SDC. The dynamic control v(t) can be any continuous function of time in the formulation (182)–(183). This subsection applies to SDC problems of non-parametric type.

The optimal objective value accumulated from time t to $t_f$, given a state x(t) at time t and a static parameter value w, can be defined:

$$J^*(x, w, t) \doteq \min_{v(t'): t'=t \text{ to } t_f} \{ \int_t^{t_f} F(x(t'), v(t'), w, t')dt' + G(x(t_f), v(t_f), w, t_f) \}. \quad (184)$$

The symbol $\doteq$ is read "defined to be." The optimal objective J* in Equation (184) is optimized only with respect to the dynamic control v(t') for t'=t to $t_f$. The static parameter vector w is an independent variable at this stage. If the optimization of J is a maximization of J, then "min" is replaced with "max" in Equation (184). The interval of integration in Equation (184) can be split as follows:

$$J^*(x, w, t) = \min_{v(t'): t'=t \text{ to } t_f} \{ \int_t^{t+\Delta t} F dt' + \int_{t+\Delta t}^{t_f} F dt' + G \}. \quad (185)$$

The principal of optimality requires v(t') for t=t+Δt to $t_f$ to be an optimal trajectory starting at t+Δt given w and x(t+Δt). Substituting t=t+Δt into the definition equation (184) yields:

$$J^*(x, w, t+\Delta t) = \min_{v(t'):t'=t+\Delta t \text{ to } t_f} \{\int_{t+\Delta t}^{t_f} F(x(t'), v(t'), w, t')dt' + G(x(t_f), v(t_f), w, t_f)\}. \quad (186)$$

If Equation (186) is substituted into Equation (185) the result is:

$$J^*(x, w, t) = \min_{v(t'):t'=t \text{ to } t+\Delta} \{\int_t^{t+\Delta t} F(x(t'), v(t'), w, t')dt' + J^*(x(t+\Delta t), w, t+\Delta t)\} \quad (187)$$

The minimization in Equation (187) is over the interval t to t+Δt whereas the minimization in Equation (185) is over the interval t to $t_f$. The minimization over the interval t+Δt to $t_f$ in Equation (187) is implicit in the term J*(x(t+Δt), w, t+Δt). Since the state x(t+Δt) is determined by the choice of v(t') for t'=t to t+Δt, it follows that J*(x(t+Δt), w, t+Δt) is a function of v(t') for t'=t to t+Δt.

The Taylor series expansion of J(x(t+Δt), w, t+Δt) about the time t is:

$$J^*(x(t+\Delta t), w, t+\Delta t) = J^*(x(t), w, t) + (J_t^* + J_x^{*t}\dot{x} + J_w^{*t}\dot{w})\Delta t + O(\Delta t^2), \quad (188)$$

where $J_t^* \in R$, $J_x^* \in R^n$, and $J_w^* \in R^l$ are partial derivatives of J* with respect to t, x, and w.

The superscript t denotes the transpose operation. The time derivative $\dot{w}$ is zero because w is not a function of time. The derivative $\dot{x}$ is already defined as T(x, f($u_N$, w, t, N), w, t) by Equation (183) so Equation (188) can be written:

$$J^*(x(t+\Delta t), w, t+\Delta t) = J^*(x(t), w, t) + J_t^*\Delta t + J_x^{*t}T\Delta t + O(\Delta t^2). \quad (189)$$

If Equation (189) is substituted into Equation (187) and the term J*(x(t), w, t) appearing on the left and right hand sides is cancelled the result is:

$$-J_t^*\Delta t = \min_{v(t'):t'=t \text{ to } t+\Delta t}\{\int_t^{t+\Delta t} F(x(t'), v(t'), w, t')dt' + J_x^{*t}T\Delta t + O(\Delta t^2)\}. \quad (190)$$

If Equation (190) is divided by Δt and Δt→0, the result is:

$$-J_t^*(x, w, t) = \min_{v(t)}\{F(x, v(t), w, t) + J_x^{*t}(x, w, t)T(x, v(t), w, t)\} \quad (191)$$

Equation (191) is a variation of the Hamiltonian-Jacobi-Bellman equation. The time interval of the minimization in Equation (191) is now a single point in time t. Equation (191) is an instantaneous property at time t of all optimal dynamic control trajectories given an arbitrary static parameter vector w and an arbitrary state x.

The instantaneous property equation (191) can be used to calculate instantaneous up-dates to improve sub-optimal dynamic control trajectories. To proceed, the following definitions are made:

$$\delta x \doteq x(t) - \bar{x}(t) \quad (192)$$

$$\delta v \doteq v(t) - \bar{v}(t) \quad (193)$$

$$\delta w \doteq w - \bar{w}, \quad (194)$$

where $\bar{x}(t)$ is the nominal or known state, x(t) is an arbitrary state, $\bar{v}(t)$ and $\bar{w}$ are nominal values for the dynamic and static controls, w is an arbitrary static parameter vector, and v(t) is the desired value of the dynamic control vector at time instant t. If Equations (192)–(194) are substituted into Equation (191), the result is:

$$-J_t^*(\bar{x}+\delta x, \bar{w}+\delta w, t) = \min_{\delta v}\{F(\bar{x}+\delta x, \bar{v}+\delta v, \bar{w}+\delta w, t) + J_x^{*t}(\bar{x}+\delta x, \bar{w}+\delta w, t)T(\bar{x}+\delta x, \bar{v}+\delta v, \bar{w}+\delta w, t)\}. \quad (195)$$

What is needed is an expression which gives δv as a function of δw and δx. In order to arrive at an expression, the Taylor series expansions of F, $J_t^*$, $J_x^*$, and T about $\bar{x}$, $\bar{v}$ and $\bar{w}$ are constructed as follows:

$$F(\bar{x}+\delta x, \bar{v}+\delta v, \bar{w}+\delta w, t) = \bar{F} + \bar{F}_x^t\delta x + \bar{F}_v^t\delta v + \bar{F}_w^t\delta w + \tfrac{1}{2}\delta x^t \bar{F}_{xx}\delta x + \tfrac{1}{2}\delta v^t \bar{F}_{vv}\delta v + \tfrac{1}{2}\delta w^t \bar{F}_{ww}\delta w + \delta x^t \bar{F}_{xv}\delta v + \delta x^t \bar{F}_{xw}\delta w + \delta w^t \bar{F}_{wv}\delta v + H.O.T. \quad (196)$$

$$J_t^*(\bar{x}+\delta x, \bar{w}+\delta w, t) = \bar{J}_t^* + \bar{J}_{tx}^{*t}\delta x + \bar{J}_{tw}^{*t}\delta w + \tfrac{1}{2}\delta x^t \bar{J}_{txx}^*\delta x + \tfrac{1}{2}\delta w^t \bar{J}_{tww}^*\delta w + \delta x^t \bar{J}_{txw}^*\delta w + H.O.T. \quad (197)$$

$$J_x^*(\bar{x}+\delta x, \bar{w}+\delta w, t) = \quad (198)$$
$$\bar{J}_x^* + \bar{J}_{xx}^*\delta x + \bar{J}_{xw}^*\delta w + \tfrac{1}{2}\sum_{i=1}^{n}\sum_{j=1}^{n}\delta x[i]\bar{J}_{xxx}^*[:,i,j]\delta x[j] +$$
$$\tfrac{1}{2}\sum_{i=1}^{l}\sum_{j=1}^{l}\delta w[i]\bar{J}_{xww}^*[:,i,j]\delta w[j] +$$
$$\sum_{i=1}^{n}\sum_{j=1}^{l}\delta x[i]\bar{J}_{xxw}^*[:,i,j]\delta w[j] + H.O.T.$$

$$T(\bar{x}+\delta x, \bar{v}+\delta v, \bar{w}+\delta w, t) = \quad (199)$$
$$\bar{T} + \bar{T}_x\delta x + \bar{T}_v\delta v + \bar{T}_w\delta w + \tfrac{1}{2}\sum_{i=1}^{n}\sum_{j=1}^{n}\delta x[i]\bar{T}_{xx}[:,i,j]\delta x[j] +$$
$$\tfrac{1}{2}\sum_{i=1}^{m'}\sum_{j=1}^{m'}\delta v[i]\bar{T}_{vv}[:,i,j]\delta v[j] +$$
$$\tfrac{1}{2}\sum_{i=1}^{l}\sum_{j=1}^{l}\delta w[i]\bar{T}_{ww}[:,i,j]\delta w[j] +$$
$$\sum_{i=1}^{n}\sum_{j=1}^{m'}\delta x[i]\bar{T}_{xv}[:,i,j]\delta v[j] +$$
$$\sum_{i=1}^{n}\sum_{j=1}^{l}\delta x[i]\bar{T}_{xw}[:,i,j]\delta w[j] +$$
$$\sum_{i=1}^{l}\sum_{j=1}^{m'}\delta w[i]\bar{T}_{wv}[:,i,j]\delta v[j] + H.O.T.$$

If Equations (196)–(199) are substituted into Equation (195), and higher order terms are neglected, the result is $$-\bar{J}_t^* - \bar{J}_{tx}^{*t}\delta x - \bar{J}_{tw}^{*t}\delta w - \tfrac{1}{2}\delta x^t \bar{J}_{txx}^*\delta x - \tfrac{1}{2}\delta w^t \bar{J}_{tww}^*\delta w - \delta x^t \bar{J}_{txw}^*\delta w = \quad (200)$$
$$\min_{\delta u}\{C_0 + C_1^t\delta x + C_2^t\delta v + C_3^t\delta w + \tfrac{1}{2}\delta x^t C_4\delta x + \tfrac{1}{2}\delta v^t C_5\delta v +$$
$$\tfrac{1}{2}\delta w^t C_6\delta w, + \delta x^t C_7\delta v + \delta x^t C_8\delta w + \delta w^t C_9\delta v\}$$

where:

$$C_0 = \bar{F} + \bar{J}_x^{*t}\bar{T} \quad (201)$$

$$C_1 = \bar{F}_x + \bar{T}_x^t \bar{J}_x^* + \bar{J}_{xx}^*\bar{T} \quad (202)$$

$$C_2 = \bar{F}_v + \bar{T}_v^t \bar{J}_x^* \quad (203)$$

$$C_3 = \bar{F}_w + \bar{T}_w^t \bar{J}_x^* + \bar{J}_{xw}^{*t} \bar{T} \tag{204}$$

$$C_4 = \bar{F}_{xx} + \bar{J}_{xx}^* \bar{T}_x + \bar{T}_x^t \bar{J}_{xx}^* + \sum_{i=1}^{n} \bar{J}_x^*[i] \bar{T}_{xx}[i,:,:] + \sum_{i=1}^{n} \bar{J}_{xxx}^*[i,:,:] \bar{T}[i] \tag{205}$$

$$C_5 = \bar{F}_{vv} + \sum_{i=1}^{n} \bar{J}_x^*[i] \bar{T}_{vv}[i,:,:] \tag{206}$$

$$C_6 = \bar{F}_{ww} + \bar{J}_{xw}^{*t} \bar{T}_w + \bar{T}_w^t \bar{J}_{xw}^* + \sum_{i=1}^{n} \bar{J}_x^*[i] \bar{T}_{ww}[i,:,:] + \sum_{i=1}^{n} \bar{J}_{xww}^*[i,:,:] \bar{T}[i] \tag{207}$$

$$C_7 = \bar{F}_{xv} + \bar{J}_{xx}^* \bar{T}_v + \sum_{i=1}^{n} \bar{J}_x^*[i] \bar{T}_{xv}[i,:,:] \tag{208}$$

$$C_8 = \bar{F}_{xw} + \bar{J}_{xx}^* \bar{T}_w + \bar{T}_x^t \bar{J}_{xw}^* + \sum_{i=1}^{n} \bar{J}_x^*[i] \bar{T}_{xw}[i,:,:] + \sum_{i=1}^{n} \bar{J}_{xxw}^*[i,:,:] \bar{T}[i] \tag{209}$$

$$C_9 = \bar{F}_{wv} + \bar{J}_{xw}^{*t} \bar{T}_v + \sum_{i=1}^{n} \bar{J}_x^*[i] \bar{T}_{wv}[i,:,:]. \tag{210}$$

The necessary condition of optimality applied to the right hand side of Equation (200) is:

$$\nabla_v \Big( C_0 + C_1^t \delta x + C_2^t \delta v + C_3^t \delta w + \frac{1}{2} \delta x^t C_4 \delta x + \frac{1}{2} \delta v^t C_5 \delta v + \frac{1}{2} \delta w^t C_6 \delta w + \delta x^t C_7 \delta v + \delta x^t C_8 \delta w + \delta w^t C_9 \delta v \Big) = 0. \tag{211}$$

The necessary condition requires that $C_5$ is positive definite (or negative definite if J is to be maximized.) If $C_5$ is not positive definite, then a shift is required. For example, a shift can be computed using a variation of the trust region method. The necessary condition equation (211) can be reduced to $$C_2 + C_5 \delta v + C_7^t \delta x + C_9^t \delta w = 0. \tag{212}$$

Solving for $\delta v$ in Equation (212) yields, $$\delta v = -C_5^{-1} C_2 - C_5^{-1} C_7^t \delta x - C_5^{-1} C_9^t \delta w. \tag{213}$$

With the definitions, $$\alpha(t) \doteq -C_5^{-1} C_2 \tag{214}$$

$$\beta(t) \doteq -C_5^{-1} C_7^t \tag{215}$$

$$\gamma(t) \doteq -C_5^{-1} C_9^t, \tag{216}$$

the optimal feedback law for time t can be written $$\delta v = \alpha(t) + \beta(t) \delta x + \gamma(t) \delta w. \tag{217}$$

The feedback law equation (217) can be used to improve the nominal control $\bar{v}(t)$ at the single time instant t.

In order to improve the nominal control for other times; $\alpha(t)$, $\beta(t)$, and $\gamma(t)$ must be calculated for other times. To calculate $\alpha(t)$, $\beta(t)$, and $\gamma(t)$ at all times t, a system of equations is needed to provide $C_i$ for all times t in $(t_0, t_f)$. If Equation (217) is substituted into Equation (200) the result is, $$-\bar{J}_t^* - \bar{J}_{tx}^{*t} \delta x - \bar{J}_{tw}^{*t} \delta w - \frac{1}{2} \delta x^t \bar{J}_{txx}^* \delta x - \frac{1}{2} \delta w^t \bar{J}_{tww}^* \delta w - \delta x^t \bar{J}_{txw}^* \delta w = \tag{218}$$

$$\Big( C_0 + C_2^t \alpha + \frac{1}{2} \alpha^t C_5 \alpha \Big) + (C_1^t + C_2^t \beta + \alpha^t C_5 \beta + \alpha^t C_7^t) \delta x +$$

$$(C_2^t \gamma + C_3^t + \alpha^t C_5 \gamma + \alpha^t C_9^t) \delta w +$$

$$\frac{1}{2} \delta x^t (C_4 + \beta^t C_5 \beta + C_7 \beta + \beta^t C_7^t) \delta x +$$

$$\frac{1}{2} \delta w^t (\gamma^t C_5 \gamma + C_6 + C_9 \gamma + \gamma^t C_9^t) \delta w +$$

$$\delta x^t (\beta^t C_5 \gamma + C_7 \gamma + C_8 + \beta^t C_9^t) \delta w.$$

If like coefficients in Equation (218) are equated, then the following set of equations is obtained:

$$-\bar{J}_t^* = C_0 + C_2^t \alpha + \tfrac{1}{2} \alpha^t C_5 \alpha \tag{219}$$

$$-\bar{J}_{tx}^* = C_1 + \beta^t C_2 + \beta^t C_5 \alpha + C_7 \alpha \tag{220}$$

$$-\bar{J}_{tw}^* = \gamma^t C_2 + C_3 + \gamma^t C_5 \alpha + C_9 \alpha \tag{221}$$

$$-\bar{J}_{txx}^* = C_4 + \beta^t C_5 \beta + C_7 \beta + \beta^t C_7^t \tag{222}$$

$$-\bar{J}_{tww}^* = \gamma^t C_5 \gamma + C_6 + C_9 \gamma + \gamma^t C_9^t \tag{223}$$

$$-\bar{J}_{txw}^* = \beta^t C_5 \gamma + C_7 \gamma + C_8 + \beta^t C_9^t \tag{224}$$

The definition equations (214)–(216) can be used to eliminate $\alpha$, $\beta$, and $\gamma$ in Equations (219)–(224) to obtain:

$$-\bar{J}_t^* = C_0 - \tfrac{1}{2} C_2^t C_5^{-1} C_2 \tag{225}$$

$$-\bar{J}_{tx}^* = C_1 - C_7 C_5^{-1} C_2 \tag{226}$$

$$-\bar{J}_{tw}^* = C_3 - C_9 C_5^{-1} C_2 \tag{227}$$

$$-\bar{J}_{txx}^* = C_4 - C_7 C_5^{-1} C_7^t \tag{228}$$

$$-\bar{J}_{tww}^* = C_6 - C_9 C_5^{-1} C_9^t \tag{229}$$

$$-\bar{J}_{txw}^* = C_8 - C_7 C_5^{-1} C_9^t. \tag{230}$$

Equations (225)–(230) are not in an integratable from because they involve partial derivatives with respect to time. To obtain integratable equations, the total time derivative is required. The total time derivative of $\bar{J}^*$ is $$\frac{\bar{J}^*(\bar{x}(t), \bar{w}, t)}{dt} \doteq \dot{\bar{J}}^* = \frac{\partial \bar{J}^*}{\partial t} + \frac{\partial \bar{J}^{*t}}{\partial x} \frac{dx}{dt}. \tag{231}$$

Substituting Equation (183) into Equation (231) yields $$\dot{\bar{J}}^* = \bar{J}_t^* + \bar{J}_x^{*t} \bar{T}. \tag{232}$$

Similarly, $$\dot{\bar{J}}_x^* = \bar{J}_{tx}^* + \bar{J}_{xx}^* \bar{T}. \tag{233}$$

$$\dot{\bar{J}}_w^* = \bar{J}_{tw}^* + \bar{J}_{xw}^{*t} \bar{T}. \tag{234}$$

$$\dot{\bar{J}}_{xx}^* = \bar{J}_{txx}^* + \sum_{i=1}^{n} \bar{J}_{xxx}^*[i,:,:] \bar{T}[i] \tag{235}$$

$$\dot{\bar{J}}_{ww}^* = \bar{J}_{tww}^* + \sum_{i=1}^{n} \bar{J}_{xww}^*[i,:,:] \bar{T}[i] \tag{236}$$

-continued $$\vec{J}^*_{xw} = \vec{J}^*_{txw} + \sum_{i=1}^{n} \vec{J}^*_{xxw}[i,:,:]\vec{T}[i]. \tag{237}$$

Substituting Equations (232)–(237) into Equations (225)–(230) and solving for the total time derivatives results in the following integratable system of equations:

$$-\dot{\vec{J}}^* = C_0 - \frac{1}{2}C_2^t C_5^{-1}C_2 - \vec{J}^{*t}\vec{T} \tag{238}$$

$$\dot{\vec{J}}_x^* = C_1 - C_7 C_5^{-1}C_2 - \vec{J}_{xx}^* \vec{T} \tag{239}$$

$$\dot{\vec{J}}_w^* = C_3 - C_9 C_5^{-1}C_2 - \vec{J}_{xw}^{*t}\vec{T} \tag{240}$$

$$-\dot{\vec{J}}_{xx}^* = C_4 - C_7 C_5^{-1} C_7^t - \sum_{i=1}^{n} \vec{J}_{xxx}^*[i,:,:]\vec{T}[i] \tag{241}$$

$$-\dot{\vec{J}}_{ww}^* = C_6 - C_9 C_5^{-1} C_9^t - \sum_{i=1}^{n} \vec{J}_{xww}^*[i,:,:]\vec{T}[i] \tag{242}$$

$$-\dot{\vec{J}}_{xw}^* = C_8 - C_7 C_5^{-1} C_9^t - \sum_{i=1}^{n} \vec{J}_{xxw}^*[i,:,:]\vec{T}[i]. \tag{243}$$

The last term on the right hand sides of Equations (238)–(243) cancels a term which is part of the definition of $C_0$, $C_1$, $C_3$, $C_4$, $C_6$, and $C_8$ in Equations (201), (202), (204), (205), (207), and (209) respectively. Thus the coefficients $C_i$ can be redefined as follows:

$$C_0(t) = \overline{F} \tag{244}$$

$$C_1(t) = \overline{F}_x + \overline{T}_x^t \vec{J}_x^* \tag{245}$$

$$C_2(t) = \overline{F}_v + \overline{T}_v^t \vec{J}_x^* \tag{246}$$

$$C_3(t) = \overline{F}_w + \overline{T}_w^t \vec{J}_x^* \tag{247}$$

$$C_4(t) = \overline{F}_{xx} + \vec{J}_{xx}^* \overline{T}_x + \overline{T}_x^t \vec{J}_{xx}^* + \sum_{i=1}^{n} \vec{J}_x^*[i]\overline{T}_{xx}[i,:,:] \tag{248}$$

$$C_5(t) = \overline{F}_{vv} + \sum_{i=1}^{n} \vec{J}_x^*[i]\overline{T}_{vv}[i,:,:] \tag{249}$$

$$C_6(t) = \overline{F}_{ww} + \vec{J}_{xw}^{*t} \overline{T}_w + \overline{T}_w^t \vec{J}_{xw}^* + \sum_{i=1}^{n} \vec{J}_x^*[i]\overline{T}_{ww}[i,:,:] \tag{250}$$

$$C_7(t) = \overline{F}_{xv} + \vec{J}_{xx}^* \overline{T}_v + \sum_{i=1}^{n} \vec{J}_x^*[i]\overline{T}_{xv}[i,:,:] \tag{251}$$

$$C_8(t) = \overline{F}_{xw} + \vec{J}_{xx}^* \overline{T}_w + \overline{T}_x^t \vec{J}_{xw}^* + \sum_{i=1}^{n} \vec{J}_x^*[i]\overline{T}_{xw}[i,:,:] \tag{252}$$

$$C_9(t) = \overline{F}_{wv} + \vec{J}_{xw}^{*t} \overline{T}_v + \sum_{i=1}^{n} \vec{J}_x^*[i]\overline{T}_{wv}[i,:,:]. \tag{253}$$

With the definition equations (238)–(243), Equations (254)–(259) become $$-\dot{\vec{J}}^*(t) = C_0 - \frac{1}{2}C_2^t C_5^{-1} C_2 \tag{254}$$

$$-\dot{\vec{J}}_x^*(t) = C_1 - C_7 C_5^{-1} C_2 \tag{255}$$

$$-\dot{\vec{J}}_w^*(t) = C_3 - C_9 C_5^{-1} C_2 \tag{256}$$

$$-\dot{\vec{J}}_{xx}^*(t) = C_4 - C_7 C_5^{-1} C_7^t \tag{257}$$

$$-\dot{\vec{J}}_{ww}^*(t) = C_6 - C_9 C_5^{-1} C_9^t \tag{258}$$

$$-\dot{\vec{J}}_{xw}^*(t) = C_8 - C_7 C_5^{-1} C_9^t \tag{259}$$

The system of ordinary differential equations (254)–(259) with the definition equations (244)–(253) provide a means to compute $\alpha(t)$, $\beta(t)$, and $\gamma(t)$ at any time $t$ between $t_0$ and $t_f$. The system can be integrated in time from $t_f$ to $t_0$. What is required to start the integration is a set of conditions which specify $\vec{J}^*(t_f)$, $\vec{J}_x^*(t_f)$, $\vec{J}_w^*(t_f)$, $\vec{J}_{xx}^*(t_f)$, $\vec{J}_{ww}^*(t_f)$, and $\vec{J}_{xw}^*(t_f)$. In order to derive the correct conditions, $t=t_f$ is substituted into Equation (184) to obtain:

$$J^*(x, w, t_f) = \min_{v(t_f)} \{G(x(t_f), v(t_f), w, t_f)\} \tag{260}$$

The next step is to expand $J^*$ and $G$ about the nominal state and control $\overline{x}$, $\overline{t}$, and $\overline{w}$:

$$J^*(\delta x, \delta w, t_f) = \overline{J}^* + \vec{J}_x^* \delta x + \vec{J}_w^* \delta w + \frac{1}{2}\delta x^t \vec{J}_{xx}^* \delta x + \tag{261}$$

$$\frac{1}{2}\delta w^t \vec{J}_{ww}^* \delta w + \delta x^t \vec{J}_{xw}^* \delta w + H.O.T.$$

$G(\delta x, \delta v, \delta w, t_f) = \overline{G}$ $+\overline{G}_x^t \delta x + \overline{G}_v^t$ $\delta v + \overline{G}_w^t \delta w + \frac{1}{2}$ $\delta x^t \overline{G}_{xx} \delta x + \frac{1}{2}$ $\delta v^t \overline{G}_{vv} \delta v + \frac{1}{2}$ $\delta w^t \overline{G}_{ww} \delta w + \delta x^t$ $\overline{G}_{xv} \delta v + \delta x^t \overline{G}_{xw}$ $\delta w + \delta w^t \overline{G}_{wv} \delta v$ $+H.O.T. \tag{262}$ If Equations (261) and (262) are substituted into Equation (260) the result is:

$$J^* + J_x^* \delta x + J_w^* \delta w + \frac{1}{2} \delta x^t J_{xx}^* \delta x + \frac{1}{2} \delta w^t J_{ww}^* \delta w + \delta x^t J_{xw}^* \delta w + H.O.T. = \qquad (263)$$

$$\min_{\delta v} \left\{ \begin{array}{l} \overline{G} + \overline{G}_x^t \delta x + \overline{G}_v^t \delta v + \overline{G}_w^t \delta w + \frac{1}{2} \delta x^t \overline{G}_{xx} \delta x + \frac{1}{2} \delta v^t \overline{G}_{vv} \delta v + \\ \frac{1}{2} \delta w^t \overline{G}_{ww} \delta w + \delta x^t \overline{G}_{xv} \delta v + \delta x^t \overline{G}_{xw} \delta w + \delta w^t \overline{G}_{wv} \delta v + H.O.T. \end{array} \right\}.$$

The necessary condition of optimality for Equation (263) is $$0 = \overline{G}_v + \overline{G}_{vv} \delta v + \overline{G}_{xv}{}^t \delta x + \overline{G}_{wv}{}^t \delta w. \qquad (264)$$

The condition equation (264) can be used to eliminate $\delta v$ in Equation (263) to obtain:

$$J^* + J_x^* \delta x + J_w^* \delta w + \frac{1}{2} \delta x^t J_{xx}^* \delta x + \frac{1}{2} \delta w^t J_{ww}^* \delta w + \delta x^t J_{xw}^* \delta w + H.O.T. = \qquad (265)$$

$$\left\{ \begin{array}{l} \overline{G} - \frac{1}{2} \overline{G}_v^t \overline{G}_{vv}^{-1} \overline{G}_v + \left( \overline{G}_x^t - \overline{G}_v^t \overline{G}_{vv}^{-1} \overline{G}_{xv}^t \right) \delta x + \left( \overline{G}_w^t - \overline{G}_v^t \overline{G}_{vv}^{-1} \overline{G}_{wv}^t \right) \delta w + \\ \frac{1}{2} \delta x^t \left( \overline{G}_{xx} - \overline{G}_{xv} \overline{G}_{vv}^{-1} \overline{G}_{xv}^t \right) \delta x + \frac{1}{2} \delta w^t \left( \overline{G}_{ww} - \overline{G}_{wv} \overline{G}_{vv}^{-1} \overline{G}_{wv}^t \right) \delta w + \delta x^t \left( \overline{G}_{xw} - \overline{G}_{xv} \overline{G}_{vv}^{-1} \overline{G}_{wv}^t \right) \delta w \end{array} \right\}.$$

If like coefficients in Equation (265) are equated, then the desired conditions are obtained:

$$J^*(t_f) = \overline{G} - \frac{1}{2} \overline{G}_v^t \overline{G}_{vv}^{-1} \overline{G}_v \qquad (266)$$

$$J_x^*(t_f) = \overline{G}_x^t - \overline{G}_v^t \overline{G}_{vv}^{-1} \overline{G}_{xv}^t \qquad (267)$$

$$J_w^*(t_f) = \overline{G}_w^t - \overline{G}_v^t \overline{G}_{vv}^{-1} \overline{G}_{wv}^t \qquad (268)$$

$$J_{xx}^*(t_f) = \overline{G}_{xx} - \overline{G}_{xv} \overline{G}_{vv}^{-1} \overline{G}_{xv}^t \qquad (269)$$

$$J_{ww}^*(t_f) = \overline{G}_{ww} - \overline{G}_{wv} \overline{G}_{vv}^{-1} \overline{G}_{wv}^t \qquad (270)$$

$$J_{xw}^*(t_f) = \overline{G}_{xw} - \overline{G}_{xv} \overline{G}_{vv}^{-1} \overline{G}_{wv}^t. \qquad (271)$$

The system of equations (254)–(259) with the definition equations (244)–(253) and condition equations (266)–(271) provide a means to compute $\alpha(t)$, $\beta(t)$, and $\gamma(t)$ at any time between $t_0$ and $t_f$. The coefficients $\alpha(t)$, $\beta(t)$, and $\gamma(t)$ define the update equation (217) for the dynamic control $v$ at all times $t$. All that remains is to derive an update for the static parameter vector $w$. This is accomplished as follows.

The quadratic approximation of $J^*$ analogous to Equation (261) with $t=t_0$ is:

$$J^*(\delta x, \delta w, t_0) = J^* + J_x^* \delta x + J_w^* \delta w + \frac{1}{2} \delta x^t J_{xx}^* \delta x + \qquad (272)$$

$$\frac{1}{2} \delta w^t J_{ww}^* \delta w + \delta x^t J_{xw}^* \delta w + H.O.T.$$

The objective equation (272) must be minimized (or maximized) with respect to $\delta w$. In addition, the fact that $\delta x(t_0)$ is a function of $\delta w$ must be taken into account by using the relationship:

$$\delta x(t_0) \doteq \Gamma(w) - \Gamma(\overline{w}) = \Gamma(w) - \overline{\Gamma}.$$

The quadratic expansion of $\Gamma(w)$ is, $$\delta x(w)[i] = \overline{\Gamma}_w \delta w + \frac{1}{2} \delta w^t \overline{\Gamma}_{ww}[i, :] \delta w. \qquad (273)$$

$\delta x(t_0)$ can be eliminated from Equation (272) by substituting Equation (273) into Equation (272) to obtain:

$$J^*(\delta w, t_0) = J^* + \left( J_x^{*t} \Gamma_w + J_w^{*t} \right) \delta w + \qquad (274)$$

$$\frac{1}{2} \delta w^t \left( \sum_{i=1}^n J_x^*[i] \Gamma_{ww}[i, :, :] + \right.$$

$$\left. \Gamma_w^t J_{xx}^* \Gamma_w + J_{xx}^* + \Gamma_w^t J_{xw}^* + J_{xw}^{*t} \Gamma_w \right) \delta w,$$

neglecting higher order terms. With the definitions $$\tilde{J}_w^* \doteq J_x^{*t} \Gamma_w + J_w^{*t} \qquad (275)$$

$$\tilde{J}_{ww}^* \doteq \sum_{i=1}^n J_x^*[i] \Gamma_{ww}[i, :, :] + \Gamma_w^t J_{xx}^* \Gamma_w + \qquad (276)$$

$$J_{xx}^* + \Gamma_w^t J_{xw}^* + J_{xw}^{*t} \Gamma_w,$$

Equation (274) can be rewritten:

$$J^*(\delta w, t_0) = J^* + \tilde{J}_w^{*t} \delta w + \frac{1}{2} \delta w^t \tilde{J}_{ww}^* \delta w. \qquad (277)$$

Assuming $\tilde{J}_{ww}^*$ is positive definite (or negative definite for maximization,) the necessary condition of optimality is $$\nabla_w J^*(\delta w, t_0) = 0 = \tilde{J}_w^* + \tilde{J}_{ww}^* \delta w. \qquad (278)$$

An update for the nominal static parameter vector $\overline{w}$ can be obtained by solving Equation (278) for $\delta w$:

$$\xi \doteq \delta w = -(\tilde{J}_{ww}^*)^{-1} \tilde{J}_w^*. \qquad (279)$$

The following subsection summarizes the fully continuous SDC algorithm steps.

2. The SDC Algorithm For the Fully Continuous Formulation

Algorithm Parameters n=dimension of the state vector $x(t)$
m'=dimension of the dynamic control vector $v(t)$ l=dimension of the static parameter vector w $t_0, t_f$=times marking the beginning and end of the problem

General Formulation

Given a user specified useful objective function of the form, $$J(v(t=t_0 \text{ to } t_f), w) = \int_{t_0}^{t_f} F(x(t), v(t), w, t) dt + G(x(t_f), v(t_f), w, t_f), \quad (280)$$

where either of $t_0 < t_f$ and $t_0 > t_f$ is permitted. The fully continuous formulation of the present invention finds a dynamic control vector v, and a static parameter vector w such that J is minimized (or analogously maximized), $$J^* = \min_{v,w} J(v(t=t_0 \text{ to } t_f), w). \quad (281)$$

The minimization (or maximization) is subject to a user specified state equation:

$$\frac{dx(t)}{dt} = T(x(t), v(t), w, t) \quad x(t=t_0) = \Gamma(w). \quad (282)$$

The dynamic control vector, $v(t) \in R^{m'}$, is a continuous function of time over the specified interval $(t_0, t_f)$. No parametric or dynamic limitation is assumed. The components of the static parameter vector $w \in R^l$ are fixed-in-time parameters (i.e. non-dynamic).

The time interval $(t_0, t_f)$ may be chosen arbitrarily. This formulation requires that both the dynamic control vector v(t) and the static parameter vector w are optimized simultaneously. The system state at time $t_0$, $\Gamma(w) \in R^n$ is assumed to be a continuously differentiable function of the static parameter vector w.

The state vector $x(t) \in R^n$ is a continuous function of time. It is assumed that the user selected functions $F \in R$, $G \in R$, and $T \in R^n$ are continuously differentiable with respect to the state vector x, the dynamic control vector v, and the parameter vector w. The functions F and T may be discontinuous functions of time t.

In addition, the user may define linear or nonlinear constraints of the form:

$$L(x(t), v(t), w, t) \geq 0 \text{ and/or } K(x(t), v(t), w, t) = 0. \quad (283)$$

3. The Steps of the Fully Continuous SDC Algorithm

This subsection outlines the steps for implementing the SDC algorithm for the fully continuous formulation. The theoretical basis for the fully continuous formulation is presented in subsection 1, of Appendix B.

Figure 11:
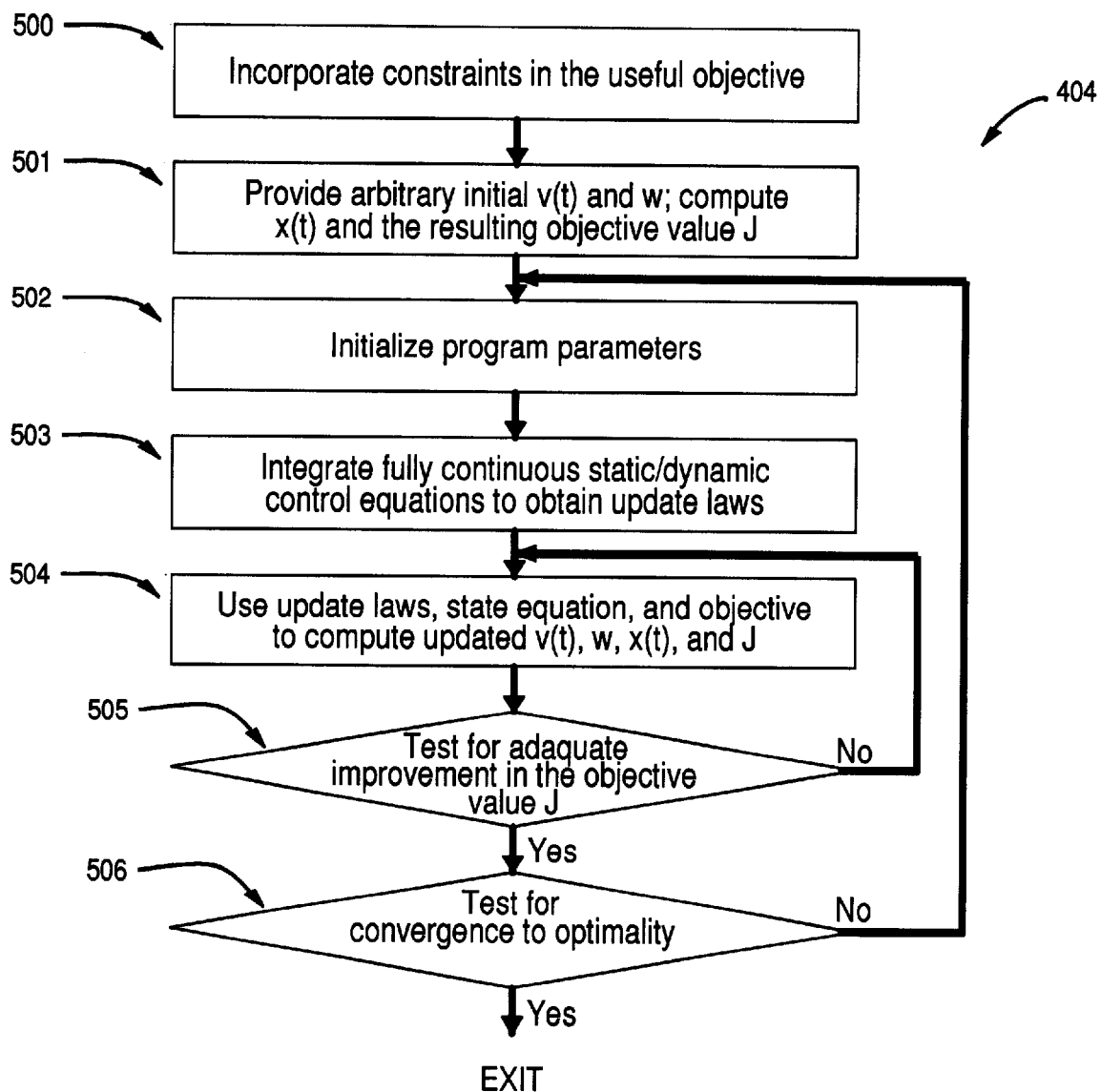
FIG. 11 depicts the SDC algorithm of FIG. 1 for the fully continuous formulation.

With reference to FIG. 11, Step 500 incorporates the constraint equations (31), if present, into the useful objective function (182) using a twice differentiable penalty function or other standard constraint method.

Step 501 provides an initial (arbitrary) value for the dynamic control vector v(t) for $t=t_0$ to $t_f$ and the static parameter vector w. The initial values are denoted $\bar{v}(t)$ and $\bar{w}$. Next. the time evolution of the system state vector x(t), subject to $x(t=t_0)=\Gamma(w)$, is calculated using $\bar{v}(t)$ and $\bar{w}$ by integrating the state equation (183). The resulting state vector is denoted $\bar{x}(t)$. The useful objective value $J(\bar{v}, \bar{w})$ is computed using Equation (182). The resulting objective value is denoted $\bar{J}$.

Step 502 initializes the program parameter $\epsilon=1$.

Step 503 completes the following calculation comprising a first substep followed by a second substep.

The first substep of step 503 is the integration of the system of coupled, ordinary differential equations (284)–(289) from $t=t_f$ to $t=t_0$ using the condition equations (290)–(295) and the definition equations (296)–(305). The integration results in $\bar{J}(t_0), \bar{J}_x^*(t_0), \bar{J}_w^*(t_0), \bar{J}_{xx}^*(t_0), \bar{J}_{ww}^*(t_0),$ and $\bar{J}_{xw}^*(t_0)$.

$$-\dot{\bar{J}}^*(t) = C_0 - \frac{1}{2}C_2^t C_5^{-1} C_2 \quad (284)$$

$$-\dot{\bar{J}}_x^*(t) = C_1 - C_7 C_5^{-1} C_2 \quad (285)$$

$$-\dot{\bar{J}}_w^*(t) = C_3 - C_9 C_5^{-1} C_2 \quad (286)$$

$$-\dot{\bar{J}}_{xx}^*(t) = C_4 - C_7 C_5^{-1} C_7^t \quad (287)$$

$$-\dot{\bar{J}}_{ww}^*(t) = C_6 - C_9 C_5^{-1} C_9^t \quad (288)$$

$$-\dot{\bar{J}}_{xw}^*(t) = C_8 - C_7 C_5^{-1} C_9^t \quad (289)$$

The condition equations are $$\bar{J}^*(t_f) = \bar{G} - \frac{1}{2}\bar{G}_v{}^t \bar{G}_{vv}{}^{-1} \bar{G}_v \quad (290)$$

$$\bar{J}_x^*(t_f) = \bar{G}_x{}^t - \bar{G}_v{}^t \bar{G}_{vv}{}^{-1} \bar{G}_{xv}{}^t \quad (291)$$

$$\bar{J}_w^*(t_f) = \bar{G}_w{}^t - \bar{G}_v{}^t \bar{G}_{vv}{}^{-1} \bar{G}_{wv}{}^t \quad (292)$$

$$\bar{J}_{xx}^*(t_f) = \bar{G}_{xx} - \bar{G}_{xv} \bar{G}_{vv}{}^{-1} \bar{G}_{xv}{}^t \quad (293)$$

$$\bar{J}_{ww}^*(t_f) = \bar{G}_{ww} - \bar{G}_{wv} \bar{G}_{vv}{}^{-1} \bar{G}_{wv}{}^t \quad (294)$$

$$\bar{J}_{xw}^*(t_f) = \bar{G}_{xw} - \bar{G}_{xv} \bar{G}_{vv}{}^{-1} \bar{G}_{wv}{}^t. \quad (295)$$

The definitions of $C_i$ are $$C_0(t) = \bar{F} \quad (296)$$

$$C_1(t) = \bar{F}_x + \bar{T}_x{}^t \bar{J}_x^* \quad (297)$$

$$C_2(t) = \bar{F}_v + \bar{T}_v{}^t \bar{J}_x^* \quad (298)$$

$$C_3(t) = \bar{F}_w + \bar{T}_w{}^t \bar{J}_x^* \quad (299)$$

$$C_4(t) = \bar{F}_{xx} + \bar{J}_x^{*t} \bar{T}_x + \bar{T}_x^t \bar{J}_{xx}^* + \sum_{i=1}^n \bar{J}_x^*[i] \bar{T}_{xx}[i, :, :] \quad (300)$$

$$C_5(t) = \bar{F}_{vv} + \sum_{i=1}^n \bar{J}_x^*[i] \bar{T}_{vv}[i, :, :] \quad (301)$$

$$C_6(t) = \bar{F}_{ww} + \bar{J}_{xw}^{*t} \bar{T}_w + \bar{T}_w^t \bar{J}_{xw}^* + \sum_{i=1}^n \bar{J}_x^*[i] \bar{T}_{ww}[i, :, :] \quad (302)$$

$$C_7(t) = \bar{F}_{xv} + \bar{J}_{xx}^* \bar{T}_v + \sum_{i=1}^n \bar{J}_x^*[i] \bar{T}_{xv}[i, :, :] \quad (303)$$

$$C_8(t) = \bar{F}_{xw} + \bar{J}_{xx}^* \bar{T}_w + \bar{T}_x^t \bar{J}_{xw}^* + \sum_{i=1}^n \bar{J}_x^*[i] \bar{T}_{xw}[i, :, :] \quad (304)$$

$$C_9(t) = \bar{F}_{wv} + \bar{J}_{xw}^{*t} \bar{T}_v + \sum_{i=1}^n \bar{J}_x^*[i] \bar{T}_{wv}[i, :, :]. \quad (305)$$

The second substep of step 503 is completed concurrently with the integration of Equations (284)–(289). The intermediate results of the integration of Equations (284)–(289) are used to evaluate and store:

$$\alpha(t) = -C_5^{-1}(t) C_2(t)$$

$$\beta(t) = -C_5^{-1}(t) C_7{}^t(t)$$

$$\gamma(t) = -C_5^{-1}(t) C_9{}^t(t)$$

When the integration of Equations (284)–(289) is completed, the following are evaluated and stored:

$$\tilde{J}_w^* = \tilde{J}_x^{*\prime}(t_0)\overline{\Gamma}_w + \tilde{J}_w^{*\prime}(t_0),$$

$$\tilde{J}_{ww}^* = \sum_{i=1}^{n} \tilde{J}_x^*(t_0)[i]\Gamma_{ww}[i,:,:] + \Gamma_w^t \tilde{J}_{xx}^*(t_0)\Gamma_w +$$

$$\tilde{J}_{xx}^*(t_0) + \Gamma_w^t \tilde{J}_{xw}^*(t_0) + \tilde{J}_{xw}^{*t}(t_0)\Gamma_w,$$

and $$\xi = -(\tilde{J}_{ww}^*)^{-1}\tilde{J}_w^*.$$

Step 504 calculates the updated static parameter vector w and the updated dynamic control vector v(t) for t=t₀ to t=t_f. The resulting state vector x(t) is also calculated.

First, the updated static parameter vector is calculated using, $$w = \overline{w} + \epsilon \xi.$$

Next, the updated state x(t) at time to is calculated using:

$$x(t_0) = \Gamma(w).$$

The updated value of w and the updated dynamic control vector v(t)=v̄(t)+δv(t) where $$\delta v(t) = \epsilon \alpha(t) + \beta(t)\delta x(t) + \epsilon \gamma(t)\xi$$

is used to calculate the updated state x(t) by integrating the state equation (183) from time t₀ to time t_f.

Concurrently with Step 504, the useful objective function in Equation (182) is evaluated using the updated x(t), v(t), and w. The resulting objective value is denoted J(ϵ).

Step 505 compares the useful objective value J(ϵ) with the useful objective value J̄. If there is satisfactory change, the values of the variables J̄, v̄(t), w̄, and x̄(t) are respectively replaced by the values of J(ϵ), v(t), w, and x(t). A satisfactory change is a satisfactory reduction to J(ϵ) if J is to be minimized. A satisfactory change is a satisfactory increase to J(ϵ) if J is to be maximized. If there is not a satisfactory change, then ϵ reduced and Step 504 is repeated. For example, ϵ can be reduced by one half. A satisfactory change criteria may include a requirement that the observed change in the objective be at least half expected change if the problem were exactly quadratic.

Step 506 is a test for convergence. If convergence is achieved, then the calculation ends. If convergence is not yet achieved, then the Steps 502, 503, 504, and 505 are repeated. A convergence test is: an optimal solution is found when 1) ϵ=1 results in only a very small change in w, v, and the useful objective (J(ϵ)−J̄) and the change in the objective is very 101 small and nearly equal to the expected quadratic change; and 2) J̄_{vv}*(t'), t∈(t₀, t_f), Ḡ_{vv}, and J̄_{ww}* are all positive definite for minimization or all negative definite for maximization. This convergence test satisfies the necessary and sufficient conditions of optimality.

A normalized time substitution method analogous to the one presented in subsection 6 of the Detailed Description section for the period formulation can be used with the fully continuous SDC algorithm. Also, an expected quadratic change for the fully continuous formulation can be computed in a fashion analogous to the method presented in subsection 8 of the Detailed Description section for the period formulation. When any of J̄_{vv}*(t'), t'∈(t₀, t_f), Ḡ_{vv}, and J̄_{ww}* are not definite, a variation of the well known trust region method or shifting method can be used.

What is claimed is:

1. A method for optimizing a useful objective function, comprising the steps of:

(a) providing a computer system having:
      a memory device;
      a code located on the memory device;
      a processor for executing the code; and
      the useful objective function J coupled to the code, wherein the code includes a static/dynamic control program for optimizing J with respect to a dynamic control vector v(t) and a static parameter vector w, and wherein t denotes time;

(b) providing input data for the static/dynamic control program, wherein the input data is coupled to the code;

(c) optimizing J with respect to v(t) and w, by executing the static/dynamic control program and using the input data; and (d) outputting a computed result from the optimizing step to an output device within the computer system.

2. The method of claim 1, wherein the step of optimizing J comprises minimizing J.

3. The method of claim 1, wherein the step of optimizing J comprises maximizing J.

4. The method of claim 1, further comprising utilizing the optimized useful objective.

5. The method of claim 1, wherein the step of optimizing J comprises simultaneously optimizing a spacecraft trajectory and a spacecraft design.

6. The method of claim 1, wherein the step of providing input data further comprises storing the input data on the memory device.

7. The method of claim 1, wherein the step of providing input data further comprises transferring the input data from a second memory device to the code.

8. The method of claim 1, wherein the input data includes specification of J.

9. The method of claim 1, wherein the computed result includes v(t) and w.

10. The method of claim 1, wherein $$J = \int_{t_0}^{t_N} F(x(t), v(t), w, t)dt + \sum_{i=1}^{N} G(x(t_i), u_i, w, t_i, i),$$

wherein N is a positive integer,
wherein x(t) satisfies a state equation,
wherein for each positive integer i from 1 to N inclusive:
   v(t)=f(u_i, w, t, i) for t in a range of t_{i−1} to t_i, and
   u_i is a dynamic parameter vector that is constant for t in the range of t_{i−1} to t_i,
and wherein optimizing J comprises optimizing J with respect to u_1, . . . , u_N, and w.

11. The method of claim 10, wherein the step of providing input data includes specifying: F(x(t), v(t), w, t), t₀, and t_i for all integers i from 1 to N inclusive, the state equation, f(u_i, w, t_i, i) for all integers i from 1 to N inclusive, and G(x(t_i), u_i, w, t_i, i) for all integers i from 1 to N inclusive.

12. The method of claim 10, wherein optimizing J includes optimizing J subject to a constraint that relates x(t), v(t), w, and t.

13. The method of claim 10, wherein optimizing J includes performing a normalized time substitution.

14. The method of claim 1, wherein
wherein $J=\int_{t_0}^{t_f} F(x(t),v(t), w, t)dt+G(x(t_f), v(t_f), w, t_f)$
wherein x(t) satisfies a state equation,
wherein v(t) is continuous for t in a range of $t_0$ to $t_f$,
and wherein optimizing J comprises optimizing J with respect to v(t) and w.

15. The method of claim 14, wherein the step of providing input data includes specifying $F(x(t), v(t), t_0, t)$, $t_0$, $t_f$, the state equation, and $G(x(t_f), v(t_f), w, t_f)$.

16. The method of claim 14, wherein optimizing J includes optimizing J subject to a constraint that relates x(t), v(t), w, and t.

17. The method of claim 14, wherein optimizing J includes performing a normalized time substitution.

18. A computer system for optimizing a useful objective function, comprising:
a memory device;
a computer code located on the memory device;
a computer processor for executing the computer code;
the useful objective function J coupled to the computer code, wherein the computer code includes a static/dynamic control program for performing an optimization of J with respect to a dynamic control vector v(t) and a static parameter vector w, and wherein t denotes time;
input data for the static/dynamic control program; and
an output device for receiving a result from the static/dynamic control program.

19. The computer system of claim 18, wherein the input data is located on the memory device.

20. The computer system of claim 18, further comprising a second memory device, wherein the input data is located on the second memory device.

21. The computer system of claim 18, wherein the optimization of J includes a minimization of J.

22. The computer system of claim 18, wherein the optimization of J includes a maximization of J.

23. The computer system of claim 18, wherein the optimization of J includes a simultaneous optimization of a spacecraft trajectory and a spacecraft design.

24. The computer system of claim 18, wherein $$J = \int_{t_0}^{t_N} F(x(t), v(t), w, t)dt + \sum_{i=1}^{N} G(x(t_i), u_i, w, t_i, i),$$

wherein N is a positive integer,
wherein x(t) satisfies a state equation,
wherein for each positive integer i from 1 to N inclusive:
$v(t)=f(u_i, w, t, i)$ for t in a range of $t_{i-1}$ to $t_i$, and
$u_i$ is a dynamic control vector that is constant in the range $t-1$, to $t_i$,
and wherein optimizing J comprises optimizing J with respect to $u_1, \ldots, u_N$, and w.

25. The computer system of claim 24, wherein optimizing J includes optimizing J subject to a constraint that relates x(t), v(t), w, and t.

26. The computer system of claim 18 wherein $$J = \int_{t_0}^{t_f} F(x(t), v(t), w, t)dt + G(x(t_f), v(t_f), w, t_f)$$

wherein x(t) satisfies a state equation,
wherein v(t) is continuous for t in a range of $t_0$ to $t_f$,
and wherein optimizing J comprises optimizing J with respect to v(t) and w.

27. The computer system of claim 26, wherein optimizing J includes optimizing J subject to a constraint that relates x(t), v(t), w, and t.

28. A computer system for optimizing a useful objective function, comprising:
a memory means for storing data on a memory device;
a computer code, located on the memory device, for optimizing the useful objective function J with respect to a dynamic control vector v(t) and a static parameter vector w, wherein t denotes time;
a processor means for executing the computer code;
an input means for transferring input data to the static/dynamic control program; and
an output means for receiving a result from the static/dynamic control program.

* * * * *